United States Patent [19]

Stewart

[11] Patent Number: 5,321,612

[45] Date of Patent: Jun. 14, 1994

[54] METHOD FOR EXPLORING FOR HYDROCARBONS UTILIZING THREE DIMENSIONAL MODELING OF THERMAL ANOMALIES

[75] Inventor: Charles H. Stewart, Houston, Tex.

[73] Assignee: Swift Energy Company, Houston, Tex.

[21] Appl. No.: 661,902

[22] Filed: Feb. 26, 1991

[51] Int. Cl.$^5$ .............................................. G01V 1/00
[52] U.S. Cl. ..................................... 364/420; 374/136
[58] Field of Search ....................... 364/420, 421, 422; 374/136, 137; 73/154; 250/253

[56] References Cited

U.S. PATENT DOCUMENTS

| | | |
|---|---|---|
| 1,901,431 | 4/1933 | Bond . |
| 2,301,326 | 11/1942 | Reistle .................................. 73/154 |
| 2,403,704 | 7/1946 | Blau ....................................... 73/154 |
| 3,153,147 | 10/1964 | Bradley et al. . |
| 3,181,629 | 5/1965 | Birman ................................ 374/136 |
| 3,217,550 | 11/1965 | Birman ................................... 73/154 |
| 3,344,669 | 10/1967 | Roedder . |
| 3,410,136 | 11/1968 | Johns et al. ......................... 374/136 |
| 3,613,501 | 10/1971 | Sanders . |
| 3,714,832 | 2/1973 | Howell et al. . |
| 3,745,822 | 7/1973 | Pierce et al. .......................... 73/154 |
| 3,808,889 | 5/1974 | Rawson et al. ....................... 73/154 |
| 3,874,232 | 4/1975 | Hardison ............................... 73/154 |
| 3,892,128 | 7/1975 | Smith .................................... 73/154 |
| 3,934,476 | 1/1976 | Lamb, II . |
| 4,003,250 | 1/1977 | Poppendick et al. . |
| 4,092,863 | 6/1978 | Turner . |
| 4,100,482 | 6/1978 | Yamashita et al. . |
| 4,120,199 | 10/1978 | Mufti .................................... 73/154 |
| 4,381,544 | 4/1983 | Stamm ................................ 364/420 |
| 4,445,788 | 5/1984 | Twersky et al. .................... 374/142 |
| 4,476,716 | 10/1984 | Fons ..................................... 73/154 |
| 4,581,531 | 4/1986 | Dion .................................... 250/253 |
| 4,672,545 | 6/1987 | Lin et al. ............................ 364/421 |
| 4,676,664 | 6/1987 | Anderson et al. ................. 374/136 |
| 4,698,759 | 10/1987 | Eliason et al. ...................... 364/420 |
| 4,707,787 | 11/1987 | Savit et al. ......................... 364/420 |
| 4,800,539 | 1/1989 | Corn et al. ............................ 367/72 |
| 4,811,220 | 3/1989 | McEuen .............................. 364/420 |
| 4,814,711 | 3/1989 | Olsen et al. ......................... 324/331 |
| 4,821,164 | 4/1989 | Swanson ............................. 364/420 |
| 4,852,004 | 7/1989 | Manin ................................. 364/421 |
| 4,855,912 | 8/1989 | Banavar et al. .................... 364/422 |
| 4,864,127 | 9/1989 | Brame ................................ 250/253 |
| 4,882,763 | 11/1989 | Buchan et al. ........................ 382/1 |
| 4,991,095 | 2/1991 | Swanson ............................. 364/421 |

FOREIGN PATENT DOCUMENTS 1210508 8/1986 Canada .

OTHER PUBLICATIONS

Reeves, John R., "El Dorado Oil Field, Butler County, Kans., " Mar., 1927 *Structure of Typical American Oil Fields*, pp. 160–167.

Van Orstrand, C. E., "Temperature of the Earth in Relation to Oil Location," Nov., 1939, papers presented in Symposium, pp. 1014–1033.

(List continued on next page.)

*Primary Examiner*—Roy N. Envall, Jr.
*Assistant Examiner*—J. L. Hazard
*Attorney, Agent, or Firm*—John Wade Carpenter

[57] ABSTRACT

A method for exploring and finding a subterranean hydrocarbon reservoir by modeling of temperature and/or thermal anomalies within a geologic volume of the earth's crust. The geologic volume is subdivided into a plurality of laterally disposed and aligned, and vertically disposed and aligned, volumetric cells. Geologic properties are assigned for each of the volumetric cells, and a normal gradient temperature is determined and generated for the geologic volume. An x, y, z temperature is assigned for each volumetric cell based on the normal gradient temperature of the geologic volume. A hypothetical hydrocarbon reservoir is disposed in the geologic volume by varying the geologic properties of some of the plurality of volumetric cells; and a true x, y, z temperature is computed for each volumetric cell caused by the hypothetical hydrocarbon reservoir. A true hydrocarbon reservoir in the geologic volume is determined from the true x, y, z temperature of each volumetric cell.

29 Claims, 35 Drawing Sheets

OTHER PUBLICATIONS

Guyod, Hubert, "Temperature Well Logging, Part I", Oct. 21, 1946 The Oil Weekly pp. 35-39.

Guyod, Hubert "Temperature Well Logging, Part III," Nov. 4, 1946, The Oil Weekly, pp. 32-39.

Laskey, Bernard H. "Surface Alteration Utilized in Structural Mapping-A Function of Earth Temperature," Nov., 1956, World Oil pp. 123-127.

Laskey, Bernard H. "Earth heat flow criteria may indicate porosity traps ," Apr., 1967, World Oil pp. 92-106.

Sealy, DiJesse Q, "A geomicrobiological method of prospecting for petroleum", Apr. 8, 1974, The Oil and Gas Journal pp. 142-146.

Ball, Stanton M. "Exploration Application of Temperatures Recorded on Log Headings-An Up-the-Odds Method of Hydrocarbon-Charged Porosity Prediction," Aug., 1982, The American Association of Petroleum Geologists Bulletin, V66, No. 8, pp. 1108-1123.

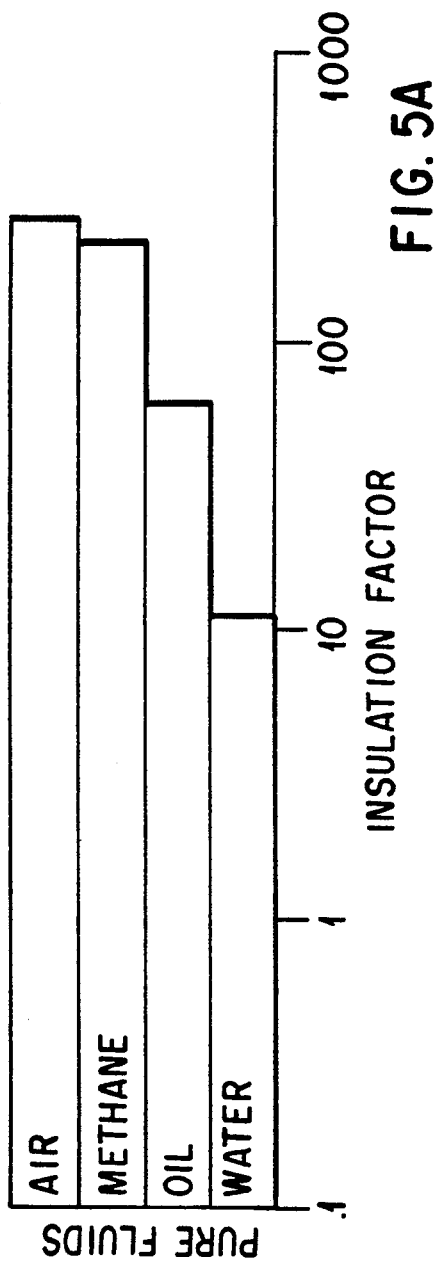
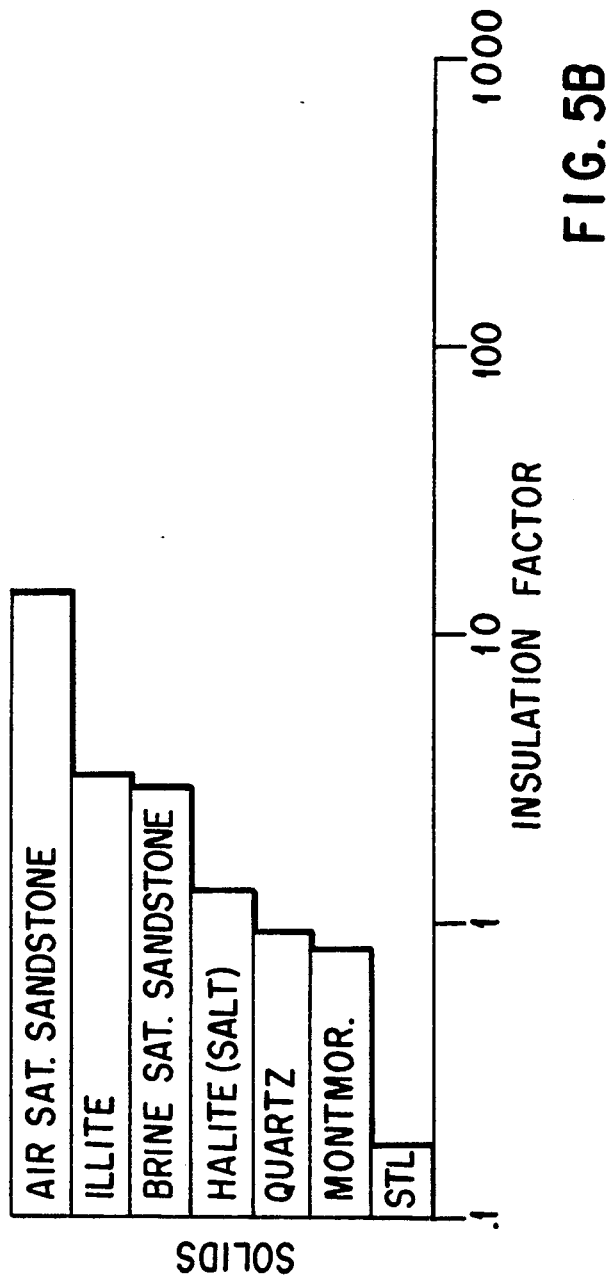

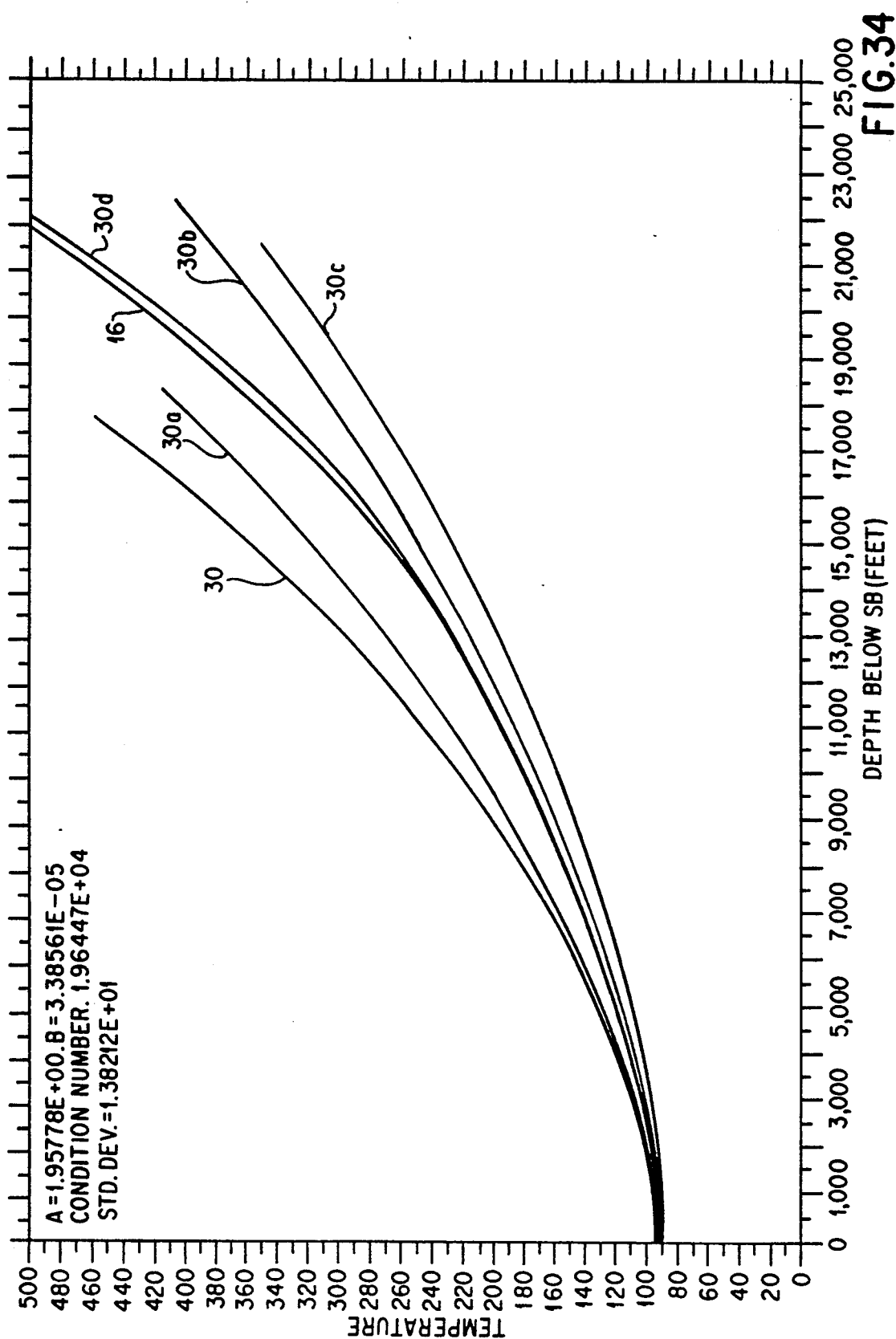

METHOD FOR EXPLORING FOR HYDROCARBONS UTILIZING THREE DIMENSIONAL MODELING OF THERMAL ANOMALIES

BACKGROUND OF THE INVENTION

1. Field of the Invention

This invention is related to exploring and finding hydrocarbons in a subterranean reservoir. More specifically, this invention provides for a method for exploring and finding a subterranean hydrocarbon reservoir by modeling of temperature and/or thermal anomalies within a geologic volume of the earth's crust.

2. Description of the Prior Art

Much has been published concerning the exploration and the finding of hydrocarbons in a subterranean reservoir. Representative publications include, but far from limited to, the following: U.S. Pat. No. 4,698,759 to Eliason et al; U.S. Pat. No. 4,676,664 to Anderson et al; U.S. Pat. No. 4,120,199 to Mufti; U.S. Pat. No. 4,672,545 to Lin et al; U.S. Pat. No. 4,855,912 to Banavar et al; U.S. Pat. No. 1,901,431 to Bond; U.S. Pat. No. 3,181,629 to Birman; U.S. Pat. No. 3,808,889 to Rawson et al; U.S. Pat. No. 4,003,250 to Poppendiek et al; U.S. Pat. No. 3,344,669 to Roedder; U.S. Pat. No. 2,301,326 to Reistle, Jr.; U.S. Pat. No. 2,403,704 to Blau; U.S. Pat. No. 3,217,550 to Birman; and "Exploration Application of Temperatures Recorded on Log Headings—An Up-the-Odds Method of Hydrocarbon-Charged Porosity Prediction" by Stanton M. Ball, The American Association of Petroleum Geologists Bulletin V.66, No. 8 (August 1982), pgs. 1108-1123. All of these publications are fully incorporated herein by reference thereto.

U.S Pat. No. 4,698,759 to Eliason et al. discloses a quantitative method of geologic structural analysis of digital terrain data for implementation on a computer U.S. Pat. No. 4,676,664 to Anderson et al. discloses a method and a system for measuring the sea floor temperature gradient several meters into the formation at each of an array of measurement sites, and using these gradients to explore for and characterize hydrocarbon deposits. Mufti U.S. Pat. No. 4,120,199 proposes taking thermal gradient measurements in a borehole which does not penetrate a hydrocarbon deposit, and using them as an indication of the proximity of hydrocarbon deposits. The Mufti patent suggests that it may be practical in some cases to drill a number of shallow test holes in an area to be explored simply for the purpose of mapping temperature gradients from measurements taken in the 50 to 100 foot depth region and that even shallower boreholes can be used when a set of readings can be made in such a short time period that seasonal changes can be ignored. The Lin et al. U.S. Pat. No. 4,672,545 teaches converting seismic data obtained at known points to synthesized seismic traces obtainable at arbitrarily selected points. Two dimensional seismic data in the Lin et al. patent are converted to three dimensional data with the aid of a programmed computer to permit generation of arbitrary views of a particular geologic structure as well as a mathematical representation of the structure. U.S. Pat. No. 4,855,912 to Banavar et al. discloses investigating earth formations surrounding a borehole by selectively heating a region of the formations, and measuring the thermal response to obtain useful information concerning the characteristic length scales of the pores in the heated region. The thermal response is obtained indirectly by measuring the electrical conductivity response. U.S. Pat. No. 1,901,431 to Bond discloses a method and apparatus for accurately determining rock temperatures in a well. U.S. Pat. No. 3,181,629 to Birman teaches the use of subsurface temperature measurements in earth prospecting. Rawson et al. in U.S. Pat. No. 3,808,889 discloses a heat flow transducer for use in measuring the geothermal heat flow in the earth. Likewise U.S. Pat. No. 4,003,250 to Poppendiek et al. also discloses a heat flow transducer. U.S. Pat. No. 3,344,669 to Roedder relates to heat sensing instruments which are operative to indicate and measure relevant characteristics of thermal gradients, and heat sensitive control devices adapted to function in response to variations in such characteristics of thermal gradient. U.S. Pat. No. 2,301,326 to Reistle, Jr. is directed to a method for determining the temperature at a series of points, or the temperature gradient, of a flowing well, and from the results obtained determining the position in the bore hole at which the oil components and gaseous components produced by the well enter the bore hole. U.S Pat. No. 2,403,704 to Blau discloses a method for prospecting for oil by determination of subsurface thermal properties. The Birman U.S. Pat. No. 3,217,550 relates to methods of geophysical prospecting which permit the detection and location beneath the earth's surface of a body of mineral, fluid, or rock mass possessed of anomalous thermal characteristics as well the detection of depth variations of such body from point to point over a given surface ore. Stanton M. Ball in "Exploration Application of Temperatures Recorded on Log Headings—An Up-the-Odds Method of Hydrocarbon-Charged Porosity Production" teaches an analytical technique for defining temperature anomalies called "hotspots" which are hydrocarbon temperature anomalies. Ball more specifically teaches that hydrocarbon fluids insulate more and their temperatures are elevated more easily than contiguous waters. Hydrocarbon reservoirs whose heat flow effects are not obscured by the anisotropic effects of adjacent water reservoirs, may cause definable temperature anomalies. The technique formulated by Ball more specifically involves the following steps: (1) calculation of geothermal gradient values, (2) creation of a geothermal gradient field areally, (3) vector analysis or contouring of created data, and (4) temperature anomaly definition.

Thus, temperature anomalies in connection with hydrocarbon reservoirs have long been recognized. However, the complexities of heat flow under the surface of the earth and the resulting temperature distribution have prevented widespread success in utilizing thermal data to locate hydrocarbon accumulations. Even the most elementary conclusions as to what features of thermal data should be examined in order to get an indication of associated hydrocarbons were widely debated with no generally acceptable conclusions possible Some authors have espoused the view that hot temperature anomalies occur over hydrocarbon reservoirs. Other authors, such as Fons in U.S. Pat. No. 4,476,716 incorporated herein by reference thereto, discloses that hydrocarbons accumulations can be located by the presence of a cool temperature anomaly above the hydrocarbon accumulation(s). The Fon's method seeks cool anomalies over a hydrocarbon accumulation and defines an anomaly as any observed temperature which differs significantly from the average observed temperature behavior in the immediate vicinity of the anomaly.

This technique has proven statistically to be a reliable method of locating hydrocarbon reservoirs on the Texas Gulf coast, but in other provinces, the technique has been less successful than desired.

There are many factors that influence and cause temperature anomalies in the crust of the earth. Meyer, H. J. et al., in "The Relationship of Geothermal Anomalies To Oil And Gas Accumulation in The Rocky Mountain Area", Am. Assn. Petl. Geol. Bulletin, 1983 concludes that upward fluid movement at depth was an important factor. Other factors include, but are not limited to, the following: variation in heat flow within the earth; reduced thermal conductivity of hydrocarbon bearing reservoir rock as compared to similar rock bearing only formation water; and variation in thermal conductivity within the crust of the earth separate or apart from those variations caused by hydrocarbon reservoirs.

Of the factors, the reduced thermal conductivity of hydrocarbon bearing reservoir rock as compared to similar rock bearing only formation water is of the highest interest. It is known that the heat or thermal conductivity of a material depends upon the conductivity of the solid particles, the geometry of the solid particles, and the conductivity of any fluids comprised between the solid particles. The heat conductivity of quartz is greater than that of calcite, while the latter is greater than that of the usual silicates. In heterogeneous substances the heat conductivity increases with compactness. For instance, igneous and metamorphic rocks are usually better conductors than sediments. The nature of the fluids present in the pores is also an important factor because if the material is dry and very porous, the heat conductivity is considerably less than if the pores contain water (sediments). This is due to the fact that air is a much poorer heat conductor than water. Oil and natural gas are also poor conductors; therefore, the heat conductivity of petroleum-bearing reservoirs should be smaller than that of the same reservoirs when they contain only water. The reduced thermal or heat conductivity of hydrocarbon bearing reservoir rock as compared to similar rock bearing only air and/or formation water relates directly to the presence or absence of hydrocarbons within the pores of the rock. If the effects of hydrocarbon accumulations in hydrocarbon bearing reservoir rock could be modeled, and those effects isolated from the various other factors influencing temperature or thermal anomalies by the employment of the model, then the location of hydrocarbon accumulations of hydrocarbon accumulations by their influence upon the observed temperatures and/or heat flow emanating from the crust of the earth becomes practical.

Much effort has been extended into modeling, including the modeling geological structures as an aid to exploring and finding hydrocarbons and other subterranean substances. U.S. Pat. No. 4,821,164 incorporated herein by reference thereto, to Swanson discloses modeling of geologic volumes of the earth's crust. The patent more particularly discloses a system for developing a model of a geologic volume by locating positions of observations within the model which corresponds to known positions of observation in the geologic volume, and thereafter extrapolating from or interpolating between such positions of observations. The model is composed of a plurality of small incremental volumetric elements configured to resemble corresponding incremental volumetric elements in the geologic volume. Swanson further discloses that modeling may be performed in several ways, as for example, by making maps or sections of volumes directly from the information. Generally speaking, a map is a two-dimensional projection on a horizontal planar surface of a representation of features of the volume modeled. A section, on the other hand, is normally a graphic representation of the volume projected on a vertical plane cutting the volume. Another way to model as disclosed by Swanson is to systematically store the information in computers, and thereafter recover the information as desired. Recovery of the stored information in some instances may involve feeding the information to plotters which automatically plot the data in map or section form. In general, then, the art of modeling a geologic volume in a first aspect resides in building a model of the volume by assembling known data as well as extrapolated and interpolated data throughout the modeled volume. Once the model is built, displays such as maps, cross-sections, and statistical information result from the model. Modeling the earth's crust, including map and section making, involves complex geological and geophysical relationships and many types of data and observations. Of particular interest in the present invention are geological volumes of sedimentary rocks or deposits since almost all oil and gas, many mineral deposits, and most ground water normally occur in sedimentary deposits—typically in porous reservoirs such as clastic (sandstones), secreted, and/or precipitated deposits.

There has been considerable effort extended in the oil and gas industry towards modeling of fluid or liquid flow in porous media by attempting to relate fluid or liquid flow to pressure gradients and rock properties. There are many analogies between the flow of a fluid or liquid through a permeable medium, the flow of electricity through a conductor and the flow of heat by conduction (as opposed to convection and radiation) through a solid body. In particular, the mathematical solutions of the problems involved in these three branches of physics are identical and many formulas obtained for one of them can be used for the others by simply translating each symbol into its proper analogue. The fundamental law of heat conduction is Fourier's law (i.e. $dQ/dt = kA\ dT/dx$ where Q is amount of heat flowing in differential time dt, k is proportionality factor known as heat or thermal conductivity of the medium, A is path cross section, and $dT/dx$ is the rate of change of temperature, T, with respect to the length of path, x). Fourier's law is analogous to D'Arcy's law in hydrodynamics and to Ohm's law in electricity. D'Arcy's law is $dQ/dt = kA\ dP/dx$ where $dQ/dt$ is fluid output or input per unit time, k is permeability, A is path cross section, and $dP/dx$ is the rate of change of pressure, P, with respect to the path length, x. Ohm's law is $dQ/dt = CA\ dV/dx$ where $dQ/dt$ is current intensity or change in current per unit time, C is electrical conductivity, A is path cross section, and $dV/dx$ is the rate of change of potential or voltage, V, with respect to path length, x.

The flow of heat within the crust of the earth obeys a partial differential equation or diffusivity equation that is identical in form to the equation for fluid flow. For example, the partial differential equation or diffusivity equation in radial form for fluid flow is:

$$k\left(\frac{\partial^2 p}{\partial x^2} + \frac{\partial^2 p}{\partial y^2} + \frac{\partial^2 p}{\partial z^2}\right) = c_t \phi \frac{\partial p}{\partial t}.$$

where p is pressure, $\phi$ is porosity, k is permeability, x and y and z are respectively length in x, y, and z direction, t is time and $C_t$ is system compressibility. For incompressible fluid flow $C_t$ becomes O so the equation reduces to:

$$k\left(\frac{\partial^2 p}{\partial x^2} + \frac{\partial^2 p}{\partial y^2} + \frac{\partial^2 p}{\partial z^2}\right) = 0$$

For pseudo steady-state compressible liquid flow in bounded systems, $\partial p/\partial t$ is a constant, i.e., the pressure is falling everywhere at the same rate A, and $$\frac{\partial^2 p}{\partial r^2} + \frac{1}{r}\frac{\partial p}{\partial r} = \frac{A}{\eta}$$

The diffusivity equation for the flow of heat is $$k\left(\frac{\partial^2 \theta}{\partial x^2} + \frac{\partial^2 \theta}{\partial y^2} + \frac{\partial^2 \theta}{\partial z^2}\right) = c\tau\frac{\partial \theta}{\partial t}.$$

while $\theta$ (x, y, z,t) represents the temperature at any point in space at time t, and it is assumed that heat flows in the direction of decreasing temperature and that the rate (in calories per second) across any infinitesimal square body of mass or matter is proportioned to the area of the square body of mass or matter; and k is a constant in calories per centimeter per degree per second, $\rho$ is the density of the mass or matter in grams per cubic centimeter and c is the specific heat in calories per gram per degree. For steady-state flow of heat becomes O and the equation reduces to:

$$\frac{\partial^2 \theta}{\partial x^2} + \frac{\partial^2 \theta}{\partial y^2} + \frac{\partial^2 \theta}{\partial z^2} = 0.$$

Many different techniques have been developed which permit solving the basic diffusivity equation on a computer for three dimensional and time varying flow. One method known as line successive over relaxation (LSOR) is extremely reliable but normally requires many, many computations in order to successfully converge to reach the correct desired solution. Another technique known as Newton-Rapson, generalized iterative technique for solving for the roots of algebraic equations, greatly increases the speed for convergence. For fluids and heat flow, most flow is in one direction or in one plane, such as in the horizontal direction or horizontal plane which involves in general, two coordinates. If vertical flow is also present, the problem then is three dimensional and the effort required to reach convergence on a computer is correspondingly increased. If LSOR is employed in all three dimensions, the computer time (and cost) required is extremely high.

In view of the known prior art for modeling subterranean hydrocarbon reservoirs and for solving the diffusivity equation on a computer, it is believed that a need exists to find a way to explore and find a subterranean hydrocarbon reservoir by modeling of temperature and/or thermal anomalies within a geologic volume of the earth's crust which would include a cost effective and accurate method for solving a heat flow diffusivity equation.

Important aspects of the present invention are directed to meeting these needs.

SUMMARY OF THE INVENTION

The present invention takes advantage of the special properties of the LSOR and Newton-Rapson techniques but capitalizes upon a property unique to heat flow, which does not exist for fluid flow. For fluids, if vertical flow exists it is usually of the same order of magnitude or smaller than the horizontal flow. In heat flow the vertical flow is normally much greater than the horizontal flow. The present invention takes advantage of the unique vertical dominance of the heat flow model. Because the heat flow in the horizontal (2 dimensions) is much smaller than the heat flow in the vertical direction, it is not necessary to treat all three directions equally. By using the most rigorous method only in the vertical direction, one can obtain final results in all three directions, which are acceptable, much faster. In practice this optimizing of techniques has resulted in reducing the time required to reach a desired level of accuracy by a factor of 10.

Broadly, the present invention accomplishes its desired objects by providing a computer implemented process for exploring for hydrocarbons which utilizes temperatures determined in a geologic volume comprising the steps of:

(a) providing a geologic volume to a computer means;

(b) subdividing the geologic volume in the computer means into a plurality of laterally disposed, laterally aligned and vertically disposed, vertically aligned volumetric cells;

(c) assigning geologic properties for each of the volumetric cells;

(d) determining a normal gradient temperature for the geologic volume;

(e) assigning an x, y, z temperature for each volumetric cell based on the normal gradient temperature of the geologic volume;

(f) disposing a hypothetical hydrocarbon reservoir in the geologic volume by varying the geologic properties of some of the plurality of volumetric cells;

(g) computing with the computer means the true x, y, z temperature for each volumetric cell caused by the hypothetical hydrocarbon reservoir; and (h) determining a true hydrocarbon reservoir in the geologic volume from the true x, y, z temperature of each volumetric cell.

The process additionally includes assigning a heat flux value to each volumetric cell, and determining a thermal conductivity value for each volumetric cell prior to disposing a hypothetical hydrocarbon reservoir in the geologic volume. Determining a thermal conductivity value for each volumetric cell comprises determining a normal gradient temperature for each volumetric cell from the normal gradient temperature for the geologic volume, and dividing the heat flux of each volumetric cell by the normal gradient temperature for each volumetric cell. An observed temperature is known or determined for at least one volumetric cell prior to determining a true hydrocarbon reservoir in the geologic volume from the true x, y, z temperature of each volumetric cell. The true hydrocarbon reservoir in the geologic volume from the true x, y, z temperature of each volumetric cell is determined by comparing the true x, y, z temperature for the at least one volumetric cell with the observed temperature for the at least one volumetric cell. If the true x, y, z temperature for the at least one volumetric cell is the same (within a given margin of error) as the observed temperature for the at least one volumetric cell, then the hypothetical hydrocarbon reservoir was disposed at a correct location in the geologic volume and the hypothetical hydrocarbon reservoir becomes or is the true hydrocarbon reservoir. If the true x, y, z temperature for the at least one volumetric cell is different (within a given margin of error) from the observed temperature for the at least one volumetric cell, then the hypothetical hydrocarbon reservoir was not disposed at a correct or suitable location. The hypothetical hydrocarbon reservoir is then redisposed in the geologic volume such as by again varying the geologic properties of some of the plurality of volumetric cells; and the process is again repeated to determine if the true x, y, z temperature for the at least one volumetric cell is the same or different (within a given margin of error) as the observed temperature for the at least one volumetric cell. The process is repeated as many times as necessary until the true x, y, z temperature for the at least one volumetric cell is the same (within a given margin of error) as the observed temperature for the at least one volumetric cell.

In another aspect of the present invention, there is provided in an improved computer-implemented process for exploring for hydrocarbons in a geologic volume which has been subdivided into a plurality of volumetric cells and wherein geologic properties have been assigned for each of the volumetric cells, the improvement comprising the steps of:

(a) determining a normal gradient temperature for the geologic volume;

(b) assigning an x, y, z temperature for each volumetric cell based on the normal gradient temperature of the geologic volume;

(c) disposing a hypothetical hydrocarbon reservoir in the geologic volume;

(d) computing with a computer means a true x, y, z temperature for each volumetric cell caused by disposing the hypothetical hydrocarbon reservoir in the geologic volume; and (d) determining a true hydrocarbon reservoir in the geologic volume from the true x, y, z temperature of each volumetric cell.

The present invention further provides a computer-implemented process for exploring for hydrocarbons comprising the steps of:

(a) providing a geologic volume to a computer means from a geographic area that is to be investigated and where thermal anomalies are to be modeled for determining if a subterranean hydrocarbon reservoir exist underneath the geographic area;

(b) subdividing the geologic volume in the computer means into a plurality volumetric cells;

(c) assigning geologic properties for each of the volumetric cells;

(d) determining a gradient temperature for the geologic volume;

(e) assigning an x, y, z temperature for each volumetric cell based on the normal gradient temperature of the geological volume;

(f) disposing a hypothetical hydrocarbon reservoir in the geologic volume;

(g) computing with the computer means a true x, y, z temperature for each volumetric cell caused by disposing the hypothetical hydrocarbon reservoir in the geologic volume; and (h) determining a subterranean hydrocarbon reservoir in the geologic volume from the true x, y, z temperature of each volumetric cell.

The present invention further broadly accomplishes its desired objects by providing a computer-implemented process for collecting and processing data relating to exploring for hydrocarbons comprising the steps of:

(a) providing a geologic volume to a computer means;

(b) subdividing the geologic volume in the computer means into a plurality volumetric cells;

(c) assigning geologic properties for each of the volumetric cells;

(d) determining a normal gradient temperature for the geologic volume;

(e) assigning an x, y, z temperature for each volumetric cell based on the normal gradient temperature of the geologic volume;

(f) disposing a hypothetical hydrocarbon reservoir in the geologic volume;

(g) computing with the computer means a true x, y, z temperature for each volumetric cell caused by disposing the hypothetical hydrocarbon reservoir in the geologic volume; and (h) determining a subterranean hydrocarbon reservoir in the geologic volume from the true x, y, z temperature of each volumetric cell.

It is therefore an object of the present invention to provide a method for exploring and finding a subterranean hydrocarbon reservoir by modeling of the temperature and/or thermal anomalies within a geologic volume of the earth's crust.

These, together with the various ancillary objects and features which will become apparent to those skilled in the art as the following description proceeds, are attained by this novel method for exploring and finding a subterranean hydrocarbon reservoir by modeling of temperature and/or thermal anomalies within a geologic volume of the earth's crust, a preferred embodiment being shown with reference to the accompanying drawings, by way of example only, wherein;

BRIEF DESCRIPTION OF THE DRAWINGS

FIGS. 5A & 5B are schematic diagrams of the thermal insulation of various substances;

FIG. 34 is a series of temperature vs depth curves plotted next to a normal gradient temperature vs. depth curve.

DETAILED DESCRIPTION OF THE INVENTION

Figure 1:
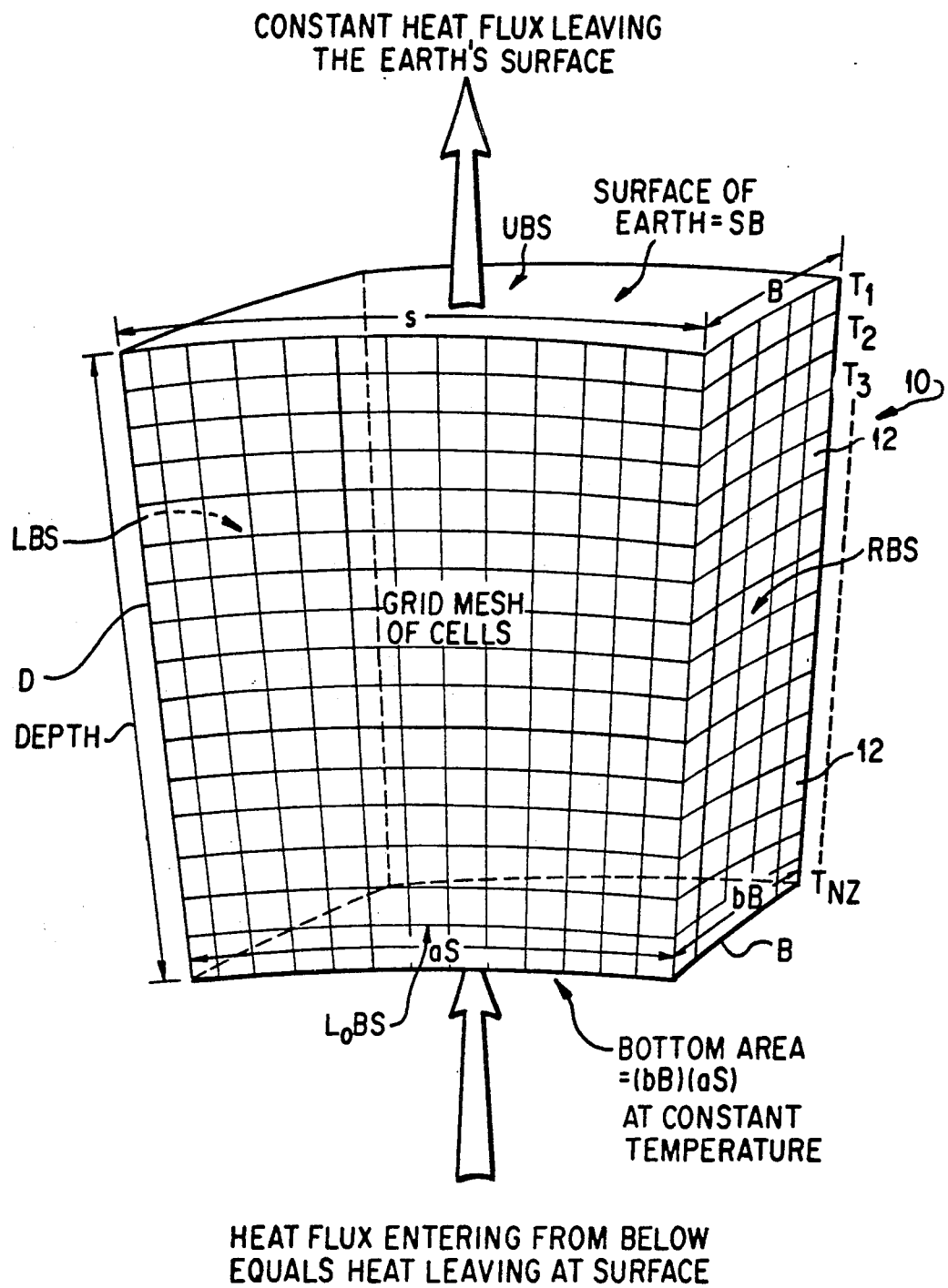
FIG. 1 is a perspective view of a geologic volume of the earth's crust.

Referring in detail now to the drawings, wherein similar parts of the invention are identified by like reference numerals, a geologic volume, generally illustrated as 10, is selected or otherwise provided from or in the earth's crust. As will be more fully discussed below, the geologic volume 10 will be selected from an area (such as Jackson County, Tex. which is used in the Example below) that is to be investigated and where temperature and/or thermal anomalies are to be modeled for determining if a subterranean hydrocarbon reservoir exist. The geologic volume 10 has a depth D extending from the surface S of the earth down to a selected base B. The geologic volume 10 also has vertical bounding surfaces LBS and RBS and may be any geologic volume, but will normally be discovered or determined to be an abstruse or complex relationship of rock layers which may extend thousands of feet underneath the surface SB of the earth to the earth's mantle. The surface SB of the earth defines an upper bounding surface UBS and the base B defines a lower bounding surface LoBS.

Typically, any particular geologic volume 10 may involve numerous superimposed layers or arrays of sediments, which were originally deposited on a horizontal or a slanting depositional surface and were subsequently geologically modified such as by being faulted, overturned, tilted, folded, pierced, eroded, weathered, or otherwise geologically modified as well known to artisans possessing ordinary skill in the art. Thus, the geologic volume 10 may include geologic features such as anticlines, faults, stratigraphic traps and salt domes. The geologic volume 10 is preferably of the type having sedimentary rocks or deposits, because essentially all of oil and gas and many mineral deposits, generally occurs in sedimentary rocks or deposits, typically in porous reservoirs such as classic (sandstones), secreted and/or precipitated geologic deposits. Such geologic deposits generally exist in layers (strata, beds) formed over periods of eons of geological time by various physical, chemical and/or biological processes. The geologic deposits may have been formed by the precipitation or dropping of sediments from rivers and/or streams at their deltas. The geologic deposits may have also been formed by wave and marine action, by tidal action, by secretions from living organisms, or by any other mechanisms. After the geologic deposits have been formed, they may have been modified by weathering, erosion, burial and structural movement. Typically, the geologic deposits or geologic strata has porosity and permeability which enable them to hold and/or transport fluids such as oil, gas, or any other matter which may be of economic importance.

Figure 2:
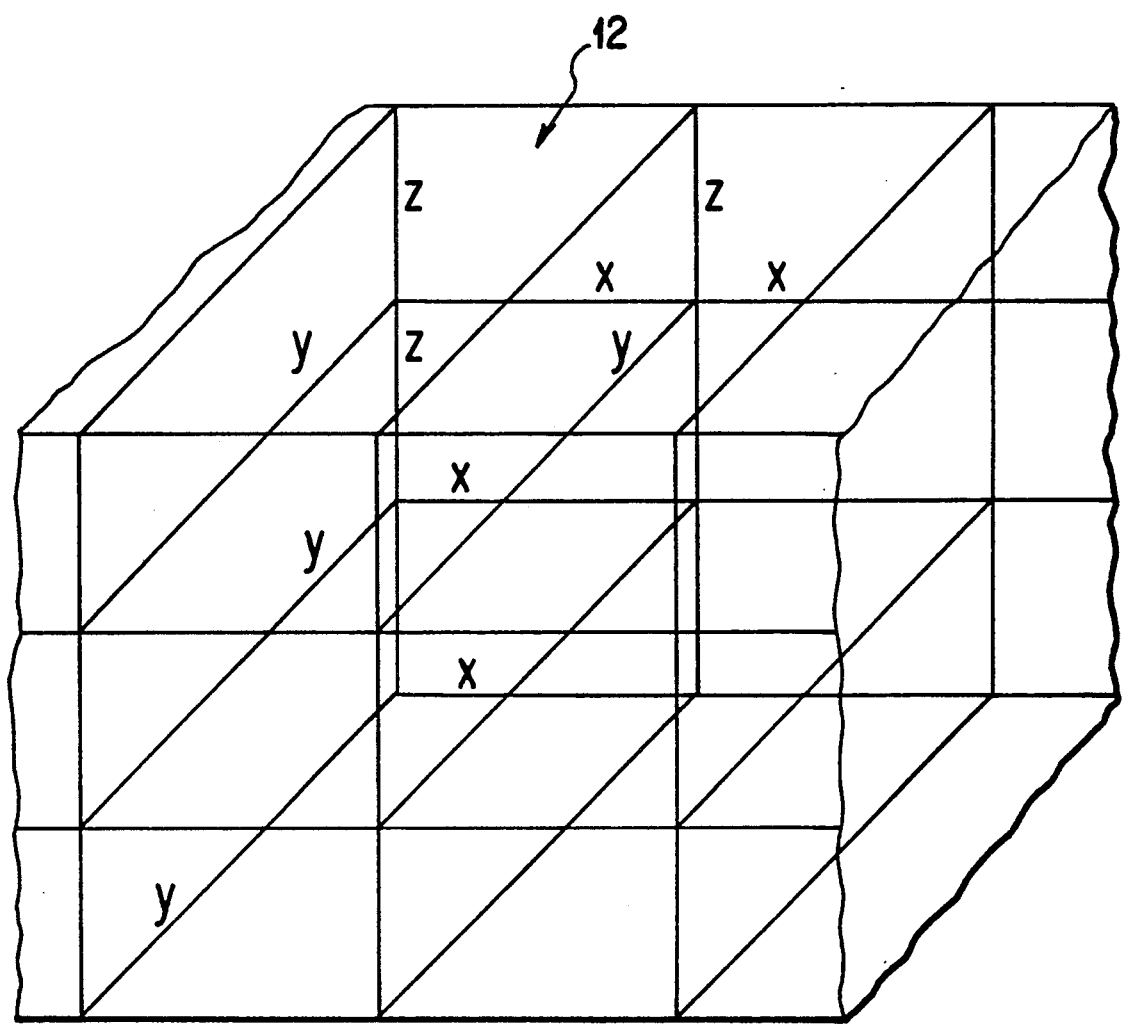
FIG. 2 is a perspective view of a plurality of volumetric cells from the geologic volume.
Figure 3:
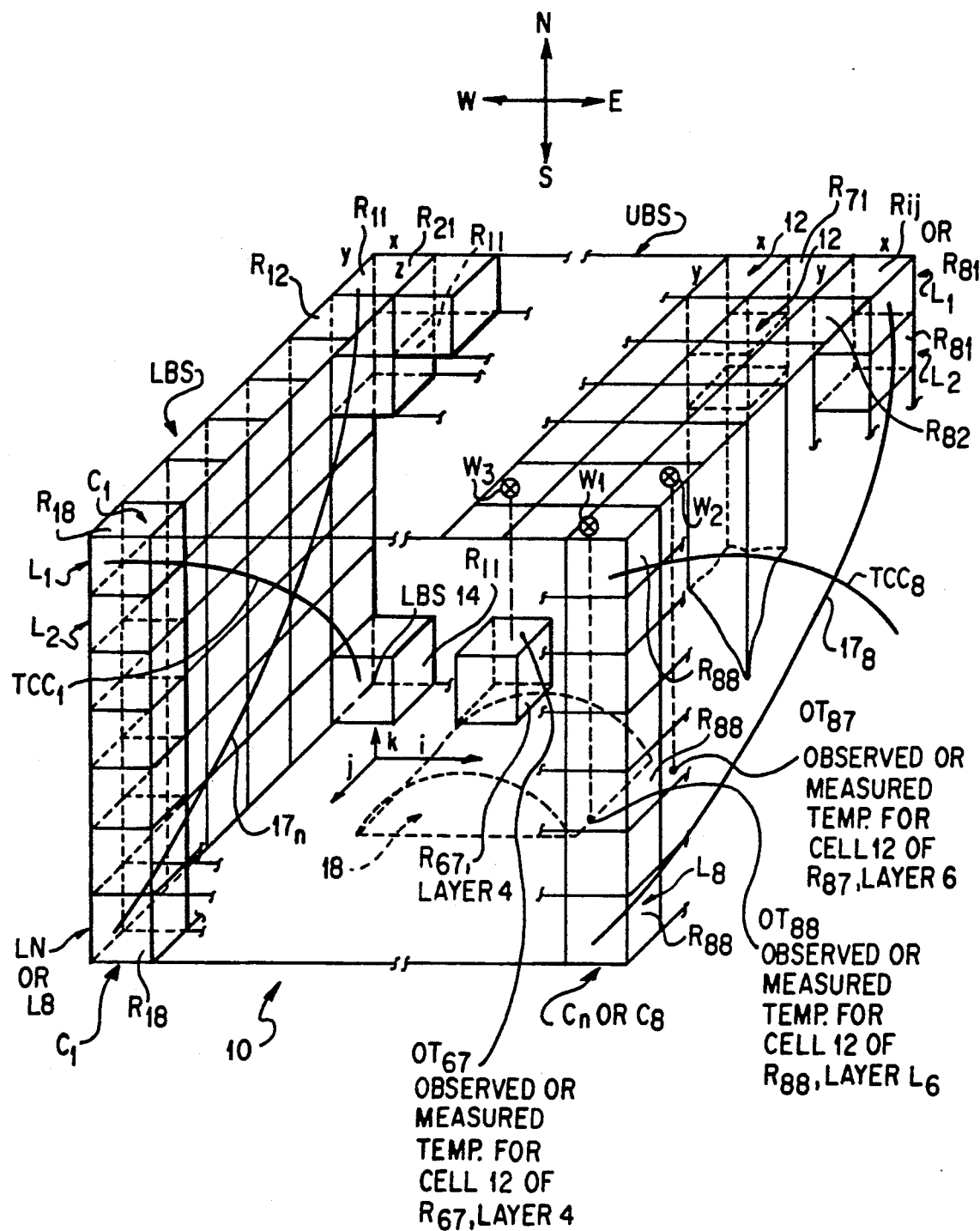
FIG. 3 is a partial perspective view of the geologic volume with an upper bounding surface and a left bounding surface gridded.

The geologic volume 10 is subdivided or is otherwise divided into a plurality of small incremental volumetric elements or cells 12. The volumetric cells 12 form geologic subvolumes into which geologic layers and/or array of the volumetric cells 12 are geometrically defined and placed accordingly to the or anticipated stratigraphic style or layering of strata or pattern or structural condition. The volumetric cells 12 may be of any geometric shape, such as parallelepipids (or cubes) or hexahedron (having four vertical corner edges which may vary in length), or tetrahedron, rhomboids, trapezoids or trianguloids. The volumetric cells 12 with respect to each other may be layered or arrayed in any sequence such as horizontal, vertical, or sloping/slanting. Any particular elemental cell 12 may be identified by a user with an i, j, k locator number. Preferably, for purposes of illustrating the invention only, the volumetric cells 12 are hexahedron having an x-length, a y-length, and a z-length, all of which are assigned by the user; and are arranged to be postured laterally or horizontally disposed and/or aligned and vertically disposed and/or aligned as best shown in FIG. 2. Preferably, 1330 feet is assigned for the x-length and the y-length, and 10 feet is assigned for the z-length. However, it is to be understood that the lengths (i.e. x-, y-, and z-lengths) may be any length such as from 2 to 3,000 feet. Preferably further if desired and for purposes of illustrating the invention only, the volumetric cells 12 may also be identified and arranged by layers $L_l$ starting from $L_1$ representing all cells 12 in the first layer L or layer one (1) from the surface of the earth SB (and bordering the surface of the earth SB) and extending down or ranging to $L_N$ representing all cells 12 in the Nth layer or layer N down from the surface of the earth SB (see FIG. 3). Thus as best shown in FIG. 3 by way of example only wherein the geologic volume 10 is defined as a cube having eight (8) cells 12 along any particular boundary or edge, there are eight (8) layers (i.e. N equals 8) and $L_8$ represents all cells in the 8th layer down from the surface of the earth SB. All cells 12 located at a fixed or constant depth (i.e. all cells 12 in any particular layer $L_1$ through $L_N$) may be further identified and arranged by rows $R_{ij}$ where "i" is the number of cell 12 in the i or x direction and "j" is the number of cell 12 in the j or y direction. Referencing FIG. 3 and for any particular layer $L_1$ through $L_N$ or $L_8$: $R_{11}$ would identify the cell 12 in the northwest corner for any particular layer $L_1$ through $L_N$ or $L_8$; $R_{81}$ would identify the cell 12 in the northeast corner for any particular layer $L_1$ through $L_N$ or $L_8$; $R_{18}$ would identify the cell 12 in the south west corner for any particular layer $L_1$ through $L_N$ or $L_8$; and $R_{88}$ would identify the cell 12 in the southeast corner for any particular layer $L_1$ through $L_N$ or $L_8$. $R_{11}, R_{21}, R_{31} \ldots R_{81}$ would represent all cells 12 in the northern most boundary of layer $L_1$ or layer $L_2$ or any other layer such as layer $L_8$, and $R_{18}, R_{28}, R_{38} \ldots R_{88}$ would represent all cells 12 in the southern most boundary of any layer $L_1$ through $L_8$. Similarly $R_{11}, R_{12} \ldots R_{18}$ and $R_{81}, R_{82} \ldots R_{88}$ would represent all cells 12 in the western most boundary and the eastern most boundary respectively of any particular layer $L_1$ through $L_N$ or $L_8$ in the geologic volume 10. Intermediate cells 12 (e.g. $R_{22}, R_{32} \ldots R_{82}; R_{23}, R_{33} \ldots R_{83}$; and $R_{28}, R_{38} \ldots R_{88}$) may be conveniently identified accordingly. Preferably yet further, if desired and for purposes of illustrating the invention only and further referencing FIG. 3, the volumetric cells 12 may also be further identified and arranged by columns C, starting from $C_1$ representing all cells 12 in the first column (i.e. vertical column) from or of the western most boundary or edge (identified as "LBS" below) of all layers $L_1$ through $L_N$ or $L_8$ in FIG. 3, extending over or ranging to $C_N$ or $C_8$ representing all cells 12 in the eastern most boundary or edge of all layers $L_1$ through $L_N$ or $L_8$ (again see FIG. 3). Thus, $C_1$ would contain all cells 12 identified as $R_{11}, R_{12}, R_{13}, R_{14}, R_{15}, R_{16}, R_{17}$ and $R_{18}$ in all layers $L_1$ through $L_8$. Similarly, $C_8$ would contain all cells 12 identified as $R_{81}, R_{82}, R_{83}, R_{84}, R_{85}, R_{86}, R_{87}$ and $R_{88}$ in all layers $L_1$ through $L_8$. Intermediate columns between $C_1$ and $C_8$ may be conveniently identified as $C_2, C_3, C_4, C_5, C_6$ and $C_7$ and each respectively would contain some of the cells 12 from the intermediate rows $R_{ij}$ (e.g. $C_2$ would consist of all cells 12 identified as $R_{21}, R_{22}, R_{23}, R_{24}, R_{25}, R_{26}, R_{27}$ and $R_{28}$ in all layers $L_1$ through $L_8$.

Alternatively, the upper bounding surface UBS (i.e. earth surface SB) and the vertical bounding surface LBS or RBS may be gridded. As best shown in FIG. 3, the left bounding surface LBS and the upper bounding surface UBS have been selected to be gridded for illustration purposes only. The bounding surfaces UBS and LBS are preferably gridded with values determined from a bench mark, such as elevation data from the earth surface SB, and with grid spacing preferably equal in the x and y direction (i.e. the x-length and the y-length are equal) and with the z-direction (i.e. the z-length) having a distance or length less than the x and y direction. The grid spacing is specified by the user and determinations of elevation data below a sea level datum are made from available data, such as (and usually) well and/or seismic data. The grid intersection of the gridded surfaces when extended, extrapolated or interpolated, both horizontally and vertically define and form the elemental cells 12 or bounded subvolumes (see FIG. 3). The shape and attitude of the elemental cells 12 formed by intersection of the grid lines projected or extrapolated off the grid surfaces may be described mathematically. The data for numbering the grid, calculations for the vertically disposed gridded surface are typically and preferably determined from "tops" of critical horizons as indicated by well logs or seismic data, and from the left bounding surface LBS. As previously indicated, the grid spacing on the upper bounding surface UBS or the horizontal gridded surface (i.e. the earth's surface SB) is usually specified by the user and typically is such that grid spacing is equal in the x and y direction. Any particular elemental cell 12 is identified by the user with an i, j, k locator number from an edge of the left bounding surface LBS such as a corner of the left bounding surface edge LBS 14 (see FIG. 3). Software can be developed that quite accurately makes the calculation for describing the volume of any elemental cell 12 and/or for extending from or descending any of the bounding surfaces of the elemental cell 12. The elemental cells 12 form an array, a structural sequence or block and preferably will approximately parallel the strata boundaries and/or any depositioned geologic surfaces including unconformilites, diasterms, fault planes and surfaces of intrusive of diapiric masses.

Figure 4:
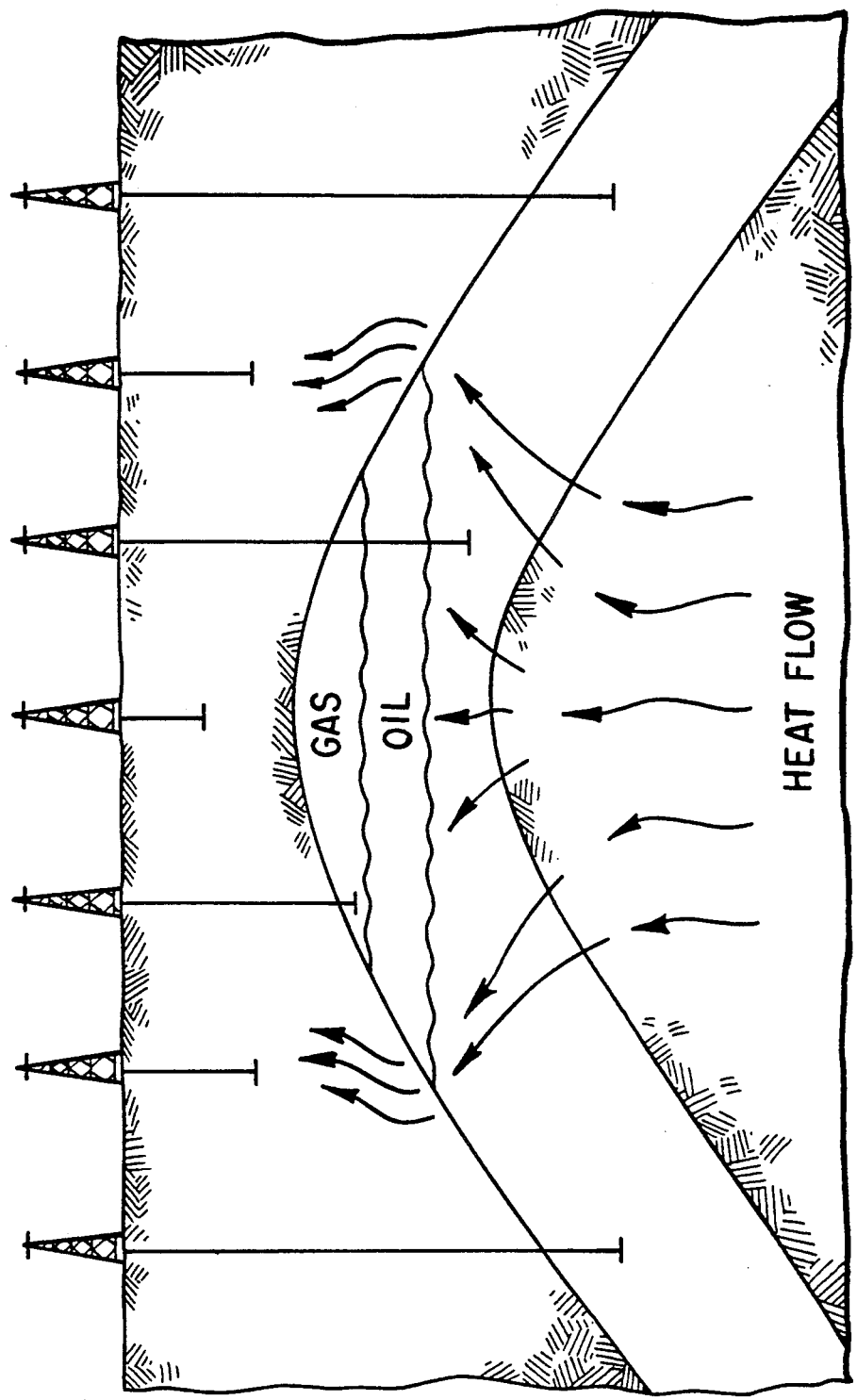
FIG. 4 is a schematic view of subsurface heat flows where hydrocarbons are present.
Figure 10:
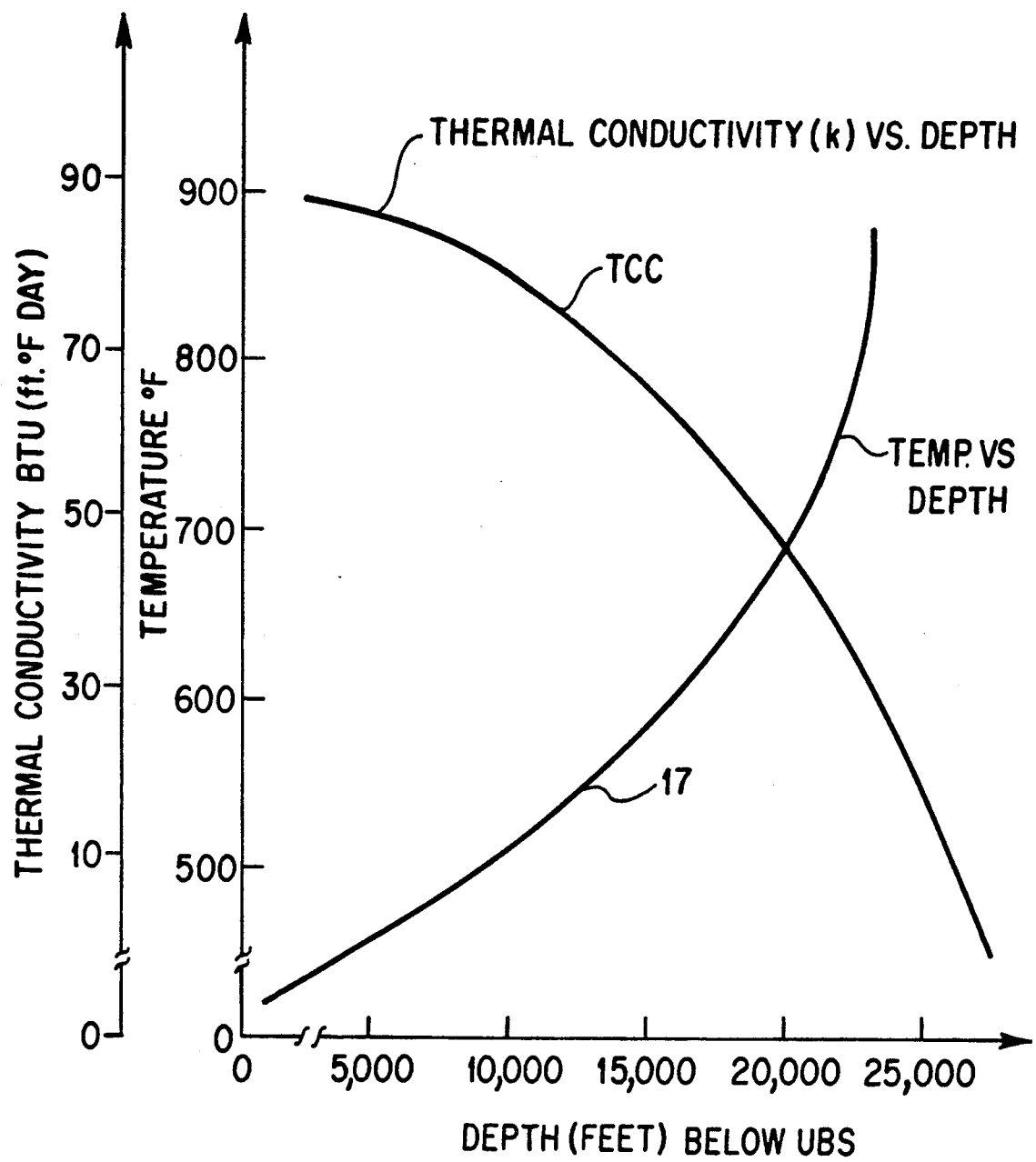
FIG. 10 is a graph of thermal conductivity vs. depth (TCC) and temperature vs. depth curve 17.

For purpose of illustrating the present invention and as previously indicated, the geologic volume 10 comprises a plurality of hexahedron geometric shaped cells 12 by being subdivided into any array of a plurality of horizontally, laterally aligned and disposed elemental cells 12 which are also aligned vertically in superimposed column formation with other elemental cells 12 as best shown in FIGS. 1 and 3. The volumetric cells 12, more specifically the hexahedron volumetric cells 12, may possess any geologic properties such as porosity, fluid saturation (e.g. gas saturation or $S_g$, oil saturation or $S_o$, and water saturation or $S_w$), and thermal conductivity (k). However, initially it is assumed that each volumetric cell 12 has essentially and generally the same or identical geologic properties with no oil and/or gas in any volumetric cell 12. It should be understood that the thermal conductivity (k) of each cell 12 will vary and will be assigned a value depending on depth of each cell 12 from the surface SB of the earth. Typically, the deeper an individual cell 12 is from the upper bounding surface UBS or the surface SB of the earth, the smaller a thermal conductivity (k) value will be assigned to the cell 12. Stated alternatively, thermal conductivity (k) values decrease with depth. Referring now to FIG. 10, there is seen a normal temperature gradient curve 17 for no particular formation/geologic volume 10 in general but is exemplary of the fact that formation temperature or cell 12 temperature increase with depth. There is also seen in FIG. 10 a thermal conductivity curve TCC for no particular formation/geologic volume 10 but is presented to exemplify in general the fact that formation thermal conductivity (k) values or cell 12 thermal conductivity (k) values decrease with depth. Actual values of thermal conductivity (k) for any particular cell 12 are determined by dividing a heat flux, which will be further described below to possess a value of from about 0.1 to about 5.0 BTU/(ft.$^2$.Day) and which is the same at any depth and for all cells 12, by a known temperature gradient (°F./ft) at a particular depth of each cell 12. Thus, recapitulating, the geologic volume 10 is initially essentially homogeneous and has the same porosity, and water saturation ($S_w$) throughout the volumetric structure, but with a varying thermal conductivity (k) for each cell 12 at different depths. Cells 12 at a given or same depth or in the same layer $L_N$ will initially have the same thermal conductivity (k). Stated alternatively, initially each volumetric cell 12 has the same porosity, and the same water saturation, and all cells 12 in the same layer $L_N$ or at the same depth in the geologic volume 10 initially has the same thermal conductivity (k). No volumetric cell 12 has any gas and/or oil (i.e. there is no $S_g$ and/or $S_o$). Crude oil and natural gas (methane) exhibit thermal insulating characteristics which create both vertical and horizontal temperature anomalies surrounding hydrocarbon deposits. Vertically, heat flowing from the center of the earth tends to cause areas below a pool or reservoir of hydrocarbons to be abnormally warm while the areas directly above are abnormally cool (see U.S. Pat. No. 4,476,716 to Fons, incorporated herein by reference thereto). Horizontally, areas adjacent to a reservoir at the same horizon should be warmer then their surroundings as heat flows around the reservoir toward the surface SB of the earth (see FIG. 4). Because oil and gas are insulators as best shown in FIG. 5, subsurface temperature abnormalities can be used to infer the presence of hydrocarbons. The thermal conductivities of oil, gas ($CH_4$) and water at one atmosphere and 20° C. are 0.15 W/m-°C., 0.063 W/m-°C., and 0.602 W/m-°C., respectively. When these fluids are present in a porous media, the thermal conductivity of the media is directly dependent on the relative quantity of the fluids. Thus, in porous formations, the thermal conductivity of the fluid filling the rock has an effect upon the thermal conductivity of the system as a whole. Both crude oil and natural gas have significantly lower thermal conductivities than salt water. Consequently, the presence or absence of hydrocarbons has a profound effect upon the thermal conductivity of materials within a particular geologic formation.

After the geologic volume 10 has been subdivided into the hexahedron volumetric cells 12, a normal gradient temperature is found or determined for the initially assumed homogeneous geologic volume 10. The determination of the normal gradient temperature for the initially assumed homogeneous geologic volume 10 may be determined by any suitable means, such as by forming a graph by plotting known temperature vs. depth from a comparable area or geologic volume, preferably in the same area that is being investigated (such as Jackson County, Tex. which is used in the Example below) and where it is known that there is no oil and/or gas (i.e. there is no $S_o$ and/or $S_g$), since, as was previously stated, the geologic volume 10 is initially assumed to be homogeneous. Alternatively, the temperatures for the initially assumed homogeneous geologic volume 10 can be discovered from known data available from prior well and seismic data from the area where the geologic volume 10 has been selected and from where there is no $S_o$ and/or $S_g$. Thus, ideally, the normal temperature vs. depth for the initially assumed geologic volume 10 is to be from any area and geologic volume that is essentially a replica or duplicate of the geologic volume 10 and having the same or identical geologic properties (i.e. by way of example only, having the same thermal conductivity (k) at any particular depth with thermal conductivity (k) valves varying and/or decreasing with depth, the same porosity, and the same water saturation ($S_w$), or any same geologic properties). Regardless of how temperatures vs. depth for the homogeneous volume 10 are obtained, the available temperatures are plotted against known depths to produce the curve 17 (see FIG. 10 or FIG. 16). The curve 17 may be a straight line or a curve. The formula $T = 10^{(A+BZ)}$ may be used to find a normal gradient temperature where T=temperature in °F.; A is a constant derived from field measurement and having a value ranging from about 1.5 to about 2.0, preferably about 1.75; B is a constant derived from field measurement and having a value ranging from about $3 \times 10^{-5}$ to about $4.0 \times 10^{-5}$, preferably about $3.50 \times 10^{-5}$; and Z is depth in ft. The curve 17 assumes that all cells 12 at any particular depth or in the same layer $L_n$ (see FIG. 3) has the same temperature, or an average temperature for all cells 12 in each layer $L_n$ is used as the temperatures for the depth of each layer $L_n$. This is particularly true since the geologic volume 10 is initially assumed to be homogeneous. Alternatively, if cells 12 at any particular depth or in the same layer $L_n$ have different temperatures and the use of an average temperature for all cells 12 in each layer $L_n$ is undesirable, a single curve 17 may be formulated for each column $C_n$ of cells 12. The initially assumed homogeneous geologic volume 10 would then have or contain a plurality of curves $17_n$ determined therefor with n being the column number and ranging from 1 to the number of columns in the geologic volume 10, which in FIG. 3 would be 8 since it assumed that there are 8 columns in the geologic volume 10. Because the geologic volume 10 is initially assumed to be homogeneous, all curves $17_n$ for each column $C_n$ should be identified. Continuing to refer to FIG. 3, the curve $17_1$ is a normal gradient temperature curve for all cells 12 in the first column $C_1$. Similarly, the curve $17_8$ represents a normal gradient temperature curve for all cells 12 in the eight column $C_8$. Normal gradient temperature curves $17_2, 17_3 \ldots 17_7$ for all cells 12 in columns $C_2, C_3 \ldots C_7$ may be formulated similarly. Any particular curve $17_{1 \text{ through } n}$ assumes that all cells 12 located at any same particular depth in any column $C_n$ (e.g. cells 12 identified as $R_{11}, R_{12} \ldots R_{18}$ in column $C_1$) have the same temperature, or an average temperature for such cells 12 at a same depth in any column $C_n$ is employed. Because the geologic volume 10 is initially assumed to be homogeneous, if a plurality of curves $17_n$ are determined for the columns $C_n$, then each curve $17_{1 \text{ through } n}$ from the plurality of curves $17_n$ should be the same (i.e. have the same normal gradient temperature) as a single curve 17 for the entire geologic volume 10. Alternatively, instead of formulating a single curve 17 for the entire geologic volume 10 or a plurality of curves $17_n$ for the columns $C_n$, a normal gradient temperature for each single cell 12 may be formulated. In a preferred embodiment of the invention, only a single curve 17 for the entire geologic volume 10 is to be employed since the volume 10 is initially assumed to be homogeneous.

After a normal gradient temperature curve 17 (or optionally a plurality of curves $17_n$ for the columns $C_n$, or a normal gradient temperature for each single cell 12) has been determined or formulated for the geologic volume 10, a thermal conductivity (k) vs. depth curve TCC (see FIG. 10) is found or formulated for the initially assumed homogeneous geologic volume 10. The determination of the curve TCC may be determined by any suitable means, such as by forming a graph or the curve TCC by plotting known thermal conductivity vs. depth from a comparable area or geologic volume, preferably (as was seen for determining the normal gradient temperature) in the same area that is being investigated (such as Jackson County, Tex. which is used in the Example below) and where it is known that there is no oil and/or gas (i.e. there is no $S_o$ and/or $S_g$) since, as has been indicated, the geologic volume 10 is initially assumed to be homogeneous. Alternatively, the thermal conductivity (k) values can be discovered from known data available from prior well and seismic data from the area where the geologic volume 10 has been selected and from where there is no $S_o$ and/or $S_g$. Thus, as was seen and stated for determining the normal gradient temperature, ideally the thermal conductivity (k) values vs. depth for the initially assumed geologic volume 10 is to be from any area and geologic volume that is essentially a replica or duplicate of the geologic volume 10 and having the same or identical geologic properties (i.e. by way of example only, the same porosity, the same water saturation ($S_w$), or any same geologic properties). Regardless of how thermal conductivity (k) values vs. depth for the homogeneous volume 10 are obtained, the available thermal conductivity (k) values are plotted against known depths to produce the curve TCC (see FIG. 10). The curve TCC may be a straight line or a curve. The formula $U = T\log_{10}B$ may be used to find a normal gradient thermal conductivity where U=thermal conductivity in BTU/(ft. °F. Day); T is formation (or rock) temperature in °F.; and B is a constant derived from field measurement and, as previously mentioned, has a value ranging from about $3.0 \times 10^{-5}$ to about $4.0 \times 10^{-5}$, preferably about $3.5 \times 10^{-5}$. The curve TCC assumes that all cells 12 at any particular depth or in the same layer $L_n$ (see FIG. 3) has the same thermal conductivity (k) value, or an average thermal conductivity (k) value for all cells 12 in each layer $L_n$ is used as the thermal conductivity for the depth of each layer $L_n$. This is particularly true since the geologic volume 10 is initially assume to be homogeneous. Alternatively, if the cells 12 at any particular depth or in the same layer $L_n$ have different thermal conductivity and the use of an average thermal conductivity (k) value for all cells 12 in each layer $L_n$ is undesirable, a single cure TCC may be formulated for each column $C_n$ of cells 12. As was seen for determining a plurality of normal gradient temperature curves $17_n$, the initially assumed homogeneous geologic volume 10 would then have or contain a plurality of curves $TCC_n$ determined or formulated therefor with n being the column number and ranging from 1 to the number of columns in the geologic volume 10, which in FIG. 3 would be 8 since it is assumed that there are 8 columns in the geologic volume 10. Because the geologic volume 10 is initially assumed to be homogeneous, all curves $TCC_n$ for each column $C_n$ should be identical. Referring in detail now to FIG. 3, the curve $TCC_1$ is a normal gradient thermal conductivity curve for all cells 12 in the first column $C_1$. Similarly, the curve $TCC_8$ represents a normal gradient curve for all cells 12 in the eighth column $C_8$. Normal gradient thermal conductivity curves $TCC_2$, $TCC_3$, $TCC_4$, ... $TCC_7$ for all cells 12 in columns $C_2$, $C_3$, $C_4$ ... $C_7$ may be formulated similarly. Any particular curve $TCC_{1\ through\ n}$ assumes that all cells 12 located at any same particular depth in any column $C_n$ (e.g. cells 12 identified as $R_{11}$, $R_{12}$ ... $R_{18}$ in column $C_1$) have the same thermal conductivity (k) value or an average thermal conductivity (k) value for such cells 12 at a same depth in any column $C_n$ is utilized. Since the geologic volume 10 is initially assumed to be homogeneous, if a plurality of curves $TCC_n$ is formulated or determined for the columns $C_n$, then each curve $TCC_n$ should be the same (i.e. have an identical normal gradient thermal conductivity) as a single curve TCC for the entire geologic volume 10. Alternatively, instead of formulating a single curve TCC for the entire geologic volume 10 or a plurality of curves $TCC_n$ for the columns $C_n$, a normal gradient thermal conductivity for each single cell 12 may be formulated. Preferably only one curve TCC for the entire geologic volume 10 is to be formulated and employed because the volume 10 is initially assumed to be homogeneous.

Figure 7:
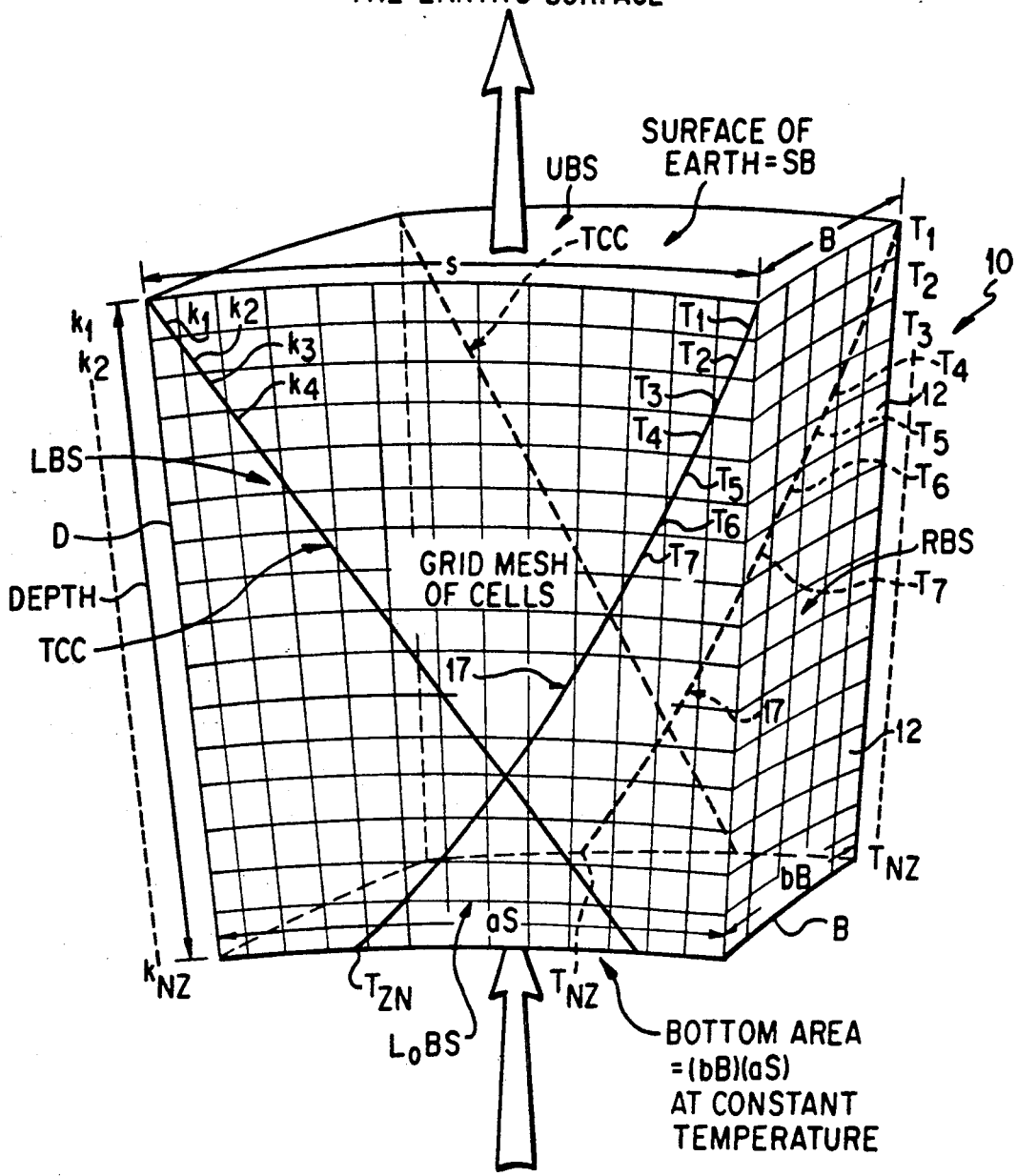
FIG. 7 is a perspective view of a geologic volume with a normal gradient temperature curve plotted therein.

The curve 17 and the curve TCC are used for initially assigning an x, y, z temperature and thermal conductivity (k) values for each volumetric cell 12. Such assignment of temperatures and thermal conductivity (k) values will depend on the z-length of each of the volumetric cells 12 because the x, y, z temperature and thermal conductivity (k) for each volumetric cell 12 typically obtained from or at the depths of the midpoint of each cell 12. Thus, the x, y, z temperature and thermal conductivity (k) for a volumetric cell 12 bordering on the surface SB of the earth and having a z-length of 40 feet is the temperature from the curve 17 at a depth of 20 feet (or one-half of 40 feet). Similarly, the x, y, z temperature and thermal conductivity (k) for a volumetric cell 12 in a second layer or row of volumetric cells 12 having a z-length of 40 feet and underneath a first layer or row of volumetric cells 12 having a z-length of 40 feet, is the temperature from the curve 17 at a depth of 60 feet, and the thermal conductivity (k) is from the curve TCC also at a depth of 60 ft. A convenient method for readily ascertaining the x, y, z temperature for each cell 12 is to plot temperature verses depth D in the geologic volume 10, or stated alternatively, the temperature curve 17 is drawn through the geologic volume 10 as best shown in FIG. 7. The temperature corresponding to the depth for the midpoint or mid-distance for each cell 12 in a particular layer can be readily discerned. Similarly, a convenient method for readily ascertaining the thermal conductivity (k) value for each cell 12 is to plot thermal conductivity verses depth D in the geologic volume 10 with the recognition that thermal conductivity decreases with depth (and with temperature); or stated alternatively, the thermal conductivity curve TCC is also drawn through the geologic volume 10 as further best shown in FIG. 7. The thermal conductivity corresponding to the depth for the midpoint or mid-distance for each cell 12 in a particular layer can be also readily discerned. Thus, referencing FIG. 7, $T_1$ and $k_l$ represents the x, y, z temperature and thermal conductivity respectively for each cell 12 in the top layer, $T_2$ and $k_2$ represents the x, y, z temperature and thermal conductivity respectively for each cell 12 in the second layer, and so on.

Figure 6:
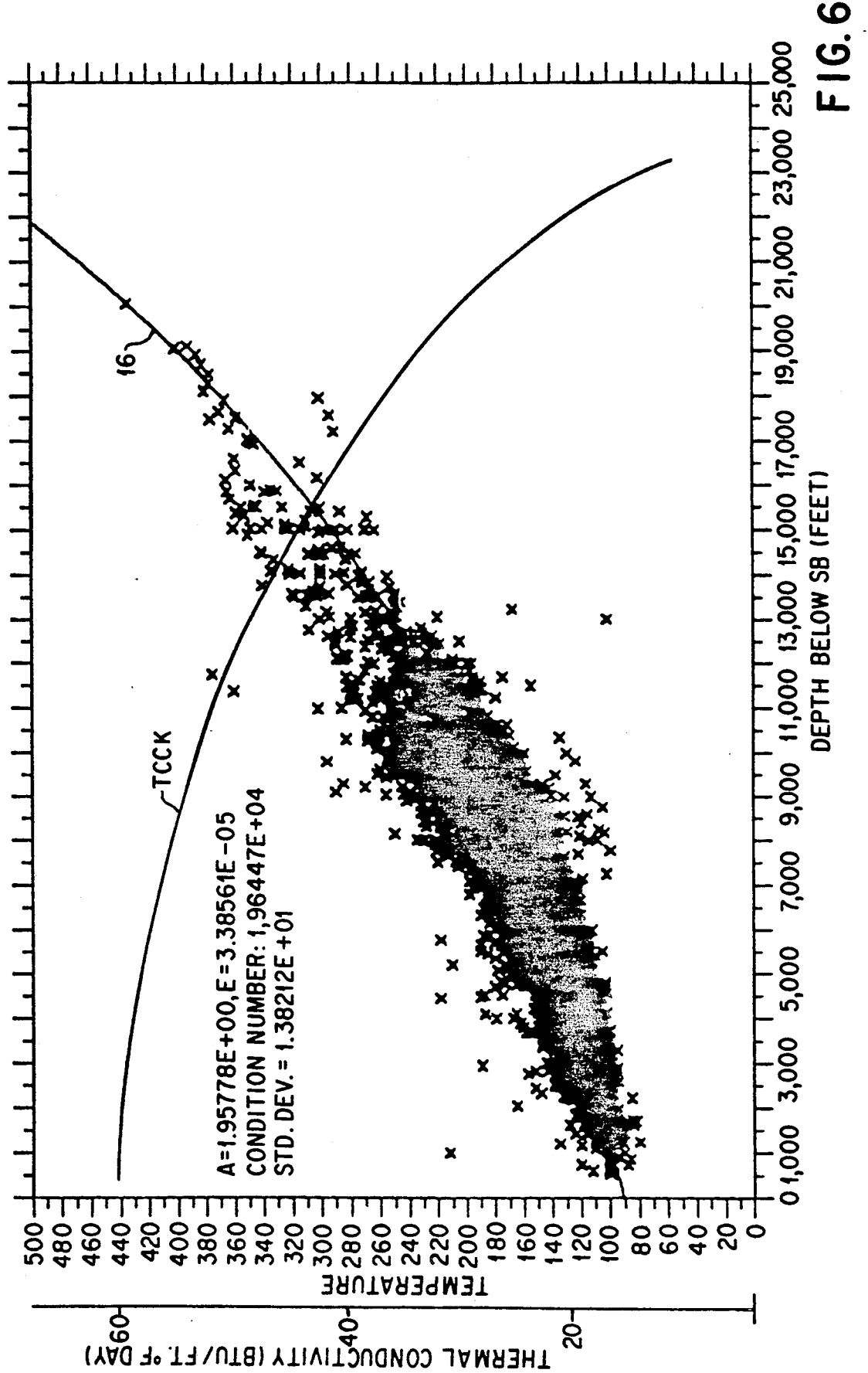
FIG. 6 is a graph of a best fit polynomial curve through a set of points of depth vs. temperature and a graph of depth vs. thermal conductivity.

An area and geologic volume is selected to be studied and/or investigated and explored for one or more subterranean hydrocarbon reservoirs. The selected area and geologic volume may be any area and geologic volume where it is suspected that there is oil and/or gas (i.e. there is $S_o$ and $S_g$) and preferably where prior well and/or seismic data has been obtained and which would include one or more measured and/or observed bottom hole temperatures. In the Example below, the area under study is in Jackson County, Tex. After the selection has been made and preferably after prior well and/or seismic data has been obtained, a determination is made of how many measured and/or observed bottom hole temperatures are available in the selected geologic volume. Such measured and/or observed bottom hole temperatures are typically available from prior wells that have been drilled. By way of example only and duplicating and/or forming the selected geologic volume into or as the geologic volume 10 with the same size and number of cells 12, etc., as the geologic volume 10 (thus the geologic volume 10 in FIG. 3 partly becomes the selected geologic volume with the exception that there is a hydrocarbon reservoir residing at a location to be discovered by the method of this invention), wells $W_1$, $W_2$, and $W_3$ (see FIG. 3) had been previously drilled into the selected geologic volume with the bottom of drilled hole being established in cell 12 of $R_{88}$, layer $L_6$; cell 12 of $R_{87}$, layer $L_6$; and cell 12 of $R_{67}$, layer $L_4$, respectively. Bottom hole temperatures recorded and/or measured at the bottom of the drilled holes (i.e. $OT_{88}$, $OT_{87}$, $OT_{67}$) for these well $W_1$, $W_2$ and $W_3$ become measured and/or observed bottom hole temperatures for the selected geologic volume, more specifically for cell 12 of $R_{88}$, layer $L_6$, cell 12 of $R_{87}$, layer $L_6$ and cell 12 of $R_{67}$, layer $L_4$. This would particularly be true if (as is preferred in a preferred embodiment of the invention) the selected geologic volume is subdivided into the same size and number of cells 12, rows $R_{ij}$, layers $L_n$ and columns $C_n$ as the initially assumed homogeneous geologic volume 10. Preferably at least one measured and/or observed temperature for at least one cell 12 is available. Ideally, a sufficient number of measured and/or observed bottom hole temperatures are available from the selected area and geologic volume such that a normal gradient temperature is found or determined for the selected area and geologic volume. The determination of the normal gradient temperature for the selected geologic volume may be determined by any suitable means, such as by forming a graph by plotting known bottom hole temperatures of known wells vs. the depth of the wells. Alternatively, as previously indicated, bottom hole temperatures can be discovered from known data available from prior well and seismic data for the selected area and geologic volume. A potential drawback of bottomhole temperatures is the inaccuracies that can be caused by the circulation of drilling fluids during the drilling process. If one is concerned with relative differences between many wells, however, inaccuracies caused by the drilling process tend to cancel each other out and where applicable, a correction method may be used to adjust bottomhole temperatures for some of these effect. Regardless of how bottom hole temperatures vs. depth of well(s) are obtained, the available bottom hole temperatures are plotted against the known depths of the wells possessing the available bottom hole temperatures. A polynomial curve having the formula $y=ax^2+bx+c$ is found or determined through he set of available points from the graph. The discovered curve $y=ax^2+bx+c$ is the polynomial curve that best fits the plotted data points and may be found by the conventional method of least squares, as specifically described in "Numerical Methods and Fortran Programming" by Daniel D. McCracken et al, copyrighted 1964 by John Wiley and Sons, Inc. (the publisher) which is incorporated by reference herein FIG. 6 represents and illustrates a "best fit" polynomial curve 16 obtained by the method of least squares through a set of points representing known bottom hole temperatures of known wells vs. the depth of the wells for a selected area and geologic volume, which in the Example below is located in Jackson County, Tex.

After an area and geologic volume has been selected to be explored for one or more subterranean hydrocarbon reservoirs, a determination may also be made of the number of measured and/or observed thermal conductivity (k) values available in the selected geologic volume. Such measured and/or observed thermal conductivity (k) values are also available from prior wells that have been drilled in the selected geologic volume. By way of example only and in a preferred embodiment of the invention, after the selected geologic volume is initially duplicated and molded into the geologic volume 10 by the selected geologic volume having the same size, the same number and size of cells 12, etc. as the geologic volume 10 (which results in the geologic volume 10 becoming the selected geologic volume with the exception that there is a hydrocarbon reservoir residing at a location to be determined), cuttings (and other bottom hole matter or information) from wells $W_1$, $W_2$ and $W_3$ (see FIG. 3) may be used to establish thermal conductivity (k) values for cell 12 of $R_{88}$, layer $L_6$, cell 12 of $R_{87}$, layer $L_6$, and cell 12 of $R_{67}$, layer $L_4$, respectively. These established thermal conductivity (k) values become measured and/or observed thermal conductivity (k) values for the selected geologic volume, more specifically for cell 12 of $R_{88}$, layer $L_6$, cell 12 of $R_{87}$, layer $L_6$ and cell 12 of $R_{67}$, layer $L_4$ of the selected geologic volume. As was indicated for determining observed bottom hole temperatures, this would particularly be true if (as is preferred in a preferred embodiment of the invention) the selected geologic volume is subdivided into the same number of cells 12, rows $R_{ij}$, layers $L_n$ and columns $C_n$ as the initially assumed homogeneous geologic volume 10. In a preferred embodiment of the invention, at least one observed thermal conductivity (k) value for at least one cell 12 is available. As was seen for observed bottom hole temperatures in the selected geologic volume, ideally a sufficient number of measured and/or observed thermal conductivity (k) values are available from the selected area and geologic volume such that a normal gradient thermal conductivity is formulated or determined for the selected area and geologic volume. As was also previously mentioned for determining observed bottom hole temperatures, the determination of the normal gradient thermal conductivity for the selected geologic volume may be determined by any suitable means, such as by forming a graph by plotting known bottom hole thermal conductivity (k) of known wells vs. the depth of the wells. Alternatively, as previously indicated, bottom hole thermal conductivity (k) can be discovered from known data available from prior well and seismic data for the selected area and geologic volume. Regardless of how bottom hole thermal conductivity (k) values vs. depth of well(s) are obtained, the available bottom hole thermal conductivities are plotted against the known depths of the wells possessing the available bottom hole thermal conductivities. A polynomial curve having the formula $y=ax^2+bx+c$ is found or determined through the set of available points from the graph. The discovered curve $y=ax^2+bx+c$ is the polynomial curve that best fits the plotted data points and may be found by the previously mentioned conventional method of least squares, specifically employed in forming the "best fit" polynomial curve 16. FIG. 6 represents and illustrates a "best fit" polynomial curve TCCK obtained by the method of least squares through a set of points representing known bottom hole thermal conductivities (k) of known wells vs. the depth of the wells for a selected area and geologic volume, which in the Example below is located in Jackson County, Tex.

The TCCK curve decreases with increase depth and decreases with an increase in temperature. If the vertical heat flux from the selected geologic volume is known or could be determined, the gradient thermal conductivity (k) values vs. depth could be determined by dividing normal gradient temperature (or any temperature at a selected depth) by the vertical heat flux. The vertical heat flux for any geologic location would possess a value ranging from about 0.1 to about 5.0 BTU/(ft$^2$.Day), more typically about 1.0 BTU/(ft$^2$.Day). This heat flux is essentially constant through a geologic volume; thus, each cell 12 would have the same heat flux.

The x, y, z temperature from curve 17 and the thermal conductivity (k) from curve TCC for each volumetric cell 12 is initially used in diffusivity heat flow equations to find a true (or more accurate) x, y, z temperature for each volumetric cell 12 in the initially assumed homogeneous geologic volume 10. As was previously indicated, heat flows down a thermal or temperature gradient in much the same way that fluid flows down a potential gradient. A temperature distribution in a solid can be adequately described by the following heat flow diffusivity equation:

$$\nabla \cdot k\nabla T = C\left(\frac{\partial T}{\partial t}\right) \quad (1)$$

where $\nabla$ is the nabla differential operator and i, j, k are unit vectors in the x, y, and z directions respectively:
  k = Heat conductivity for rock
  C = Heat capacity for rock
  T = Rock temperature
  t = Time Equation (1) is called a parabolic partial differential equation and is used to present a number of unsteady state phenomena. C (heat capacity) would range from about 10 BTU/ft$^3$.°F.) to about 100 BTU/(ft$^3$.°F.), and k (heat conductivity) would range from about 1.4 BTU/(ft.°F. Days) to about 300 BTU(ft$^3$.°F.Days). T, rock temperature, would obviously depend on the type of rock but typically would range from 35° F. to about 800° F. Time, t, may possess any suitable value, but would typically range from about 1 day or 24 hours to about 10,000 years.

If the time derivative in equation (1) is zero, equation (1) becomes the steady state equation:

$$\nabla \cdot k\nabla T = 0 \quad (2)$$

which mathematicians refer to as the elliptic case.

Figure 17:
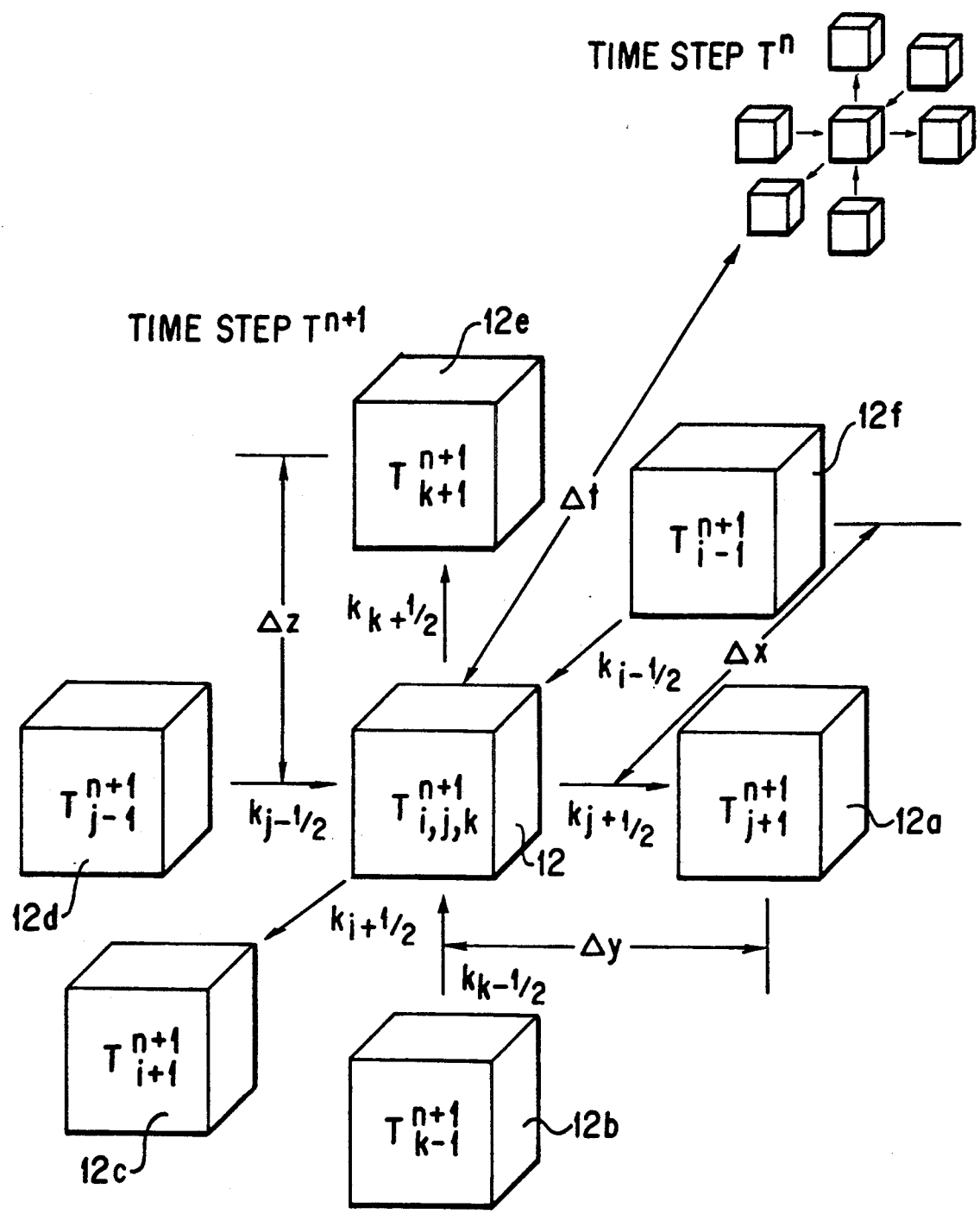
FIG. 17 is a perspective diagram of a centrally located cell with six (6) contiguous cells and illustrating time steps as heat flows to and from all of the cells.
Figure 18:
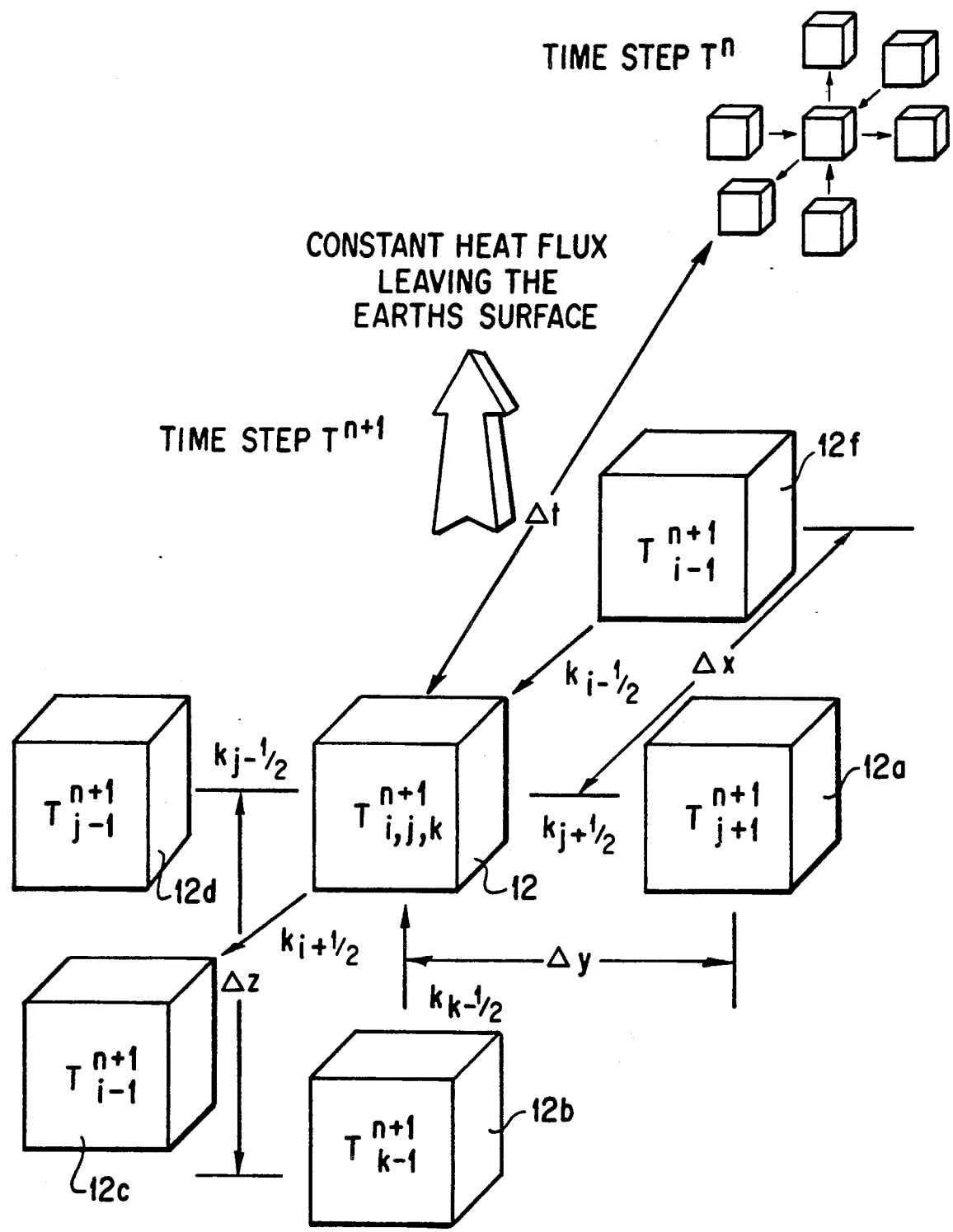
FIG. 18 is a perspective diagram of a centrally located cell on the upper bounding surface with five (5) contiguous cells.
Figure 19:
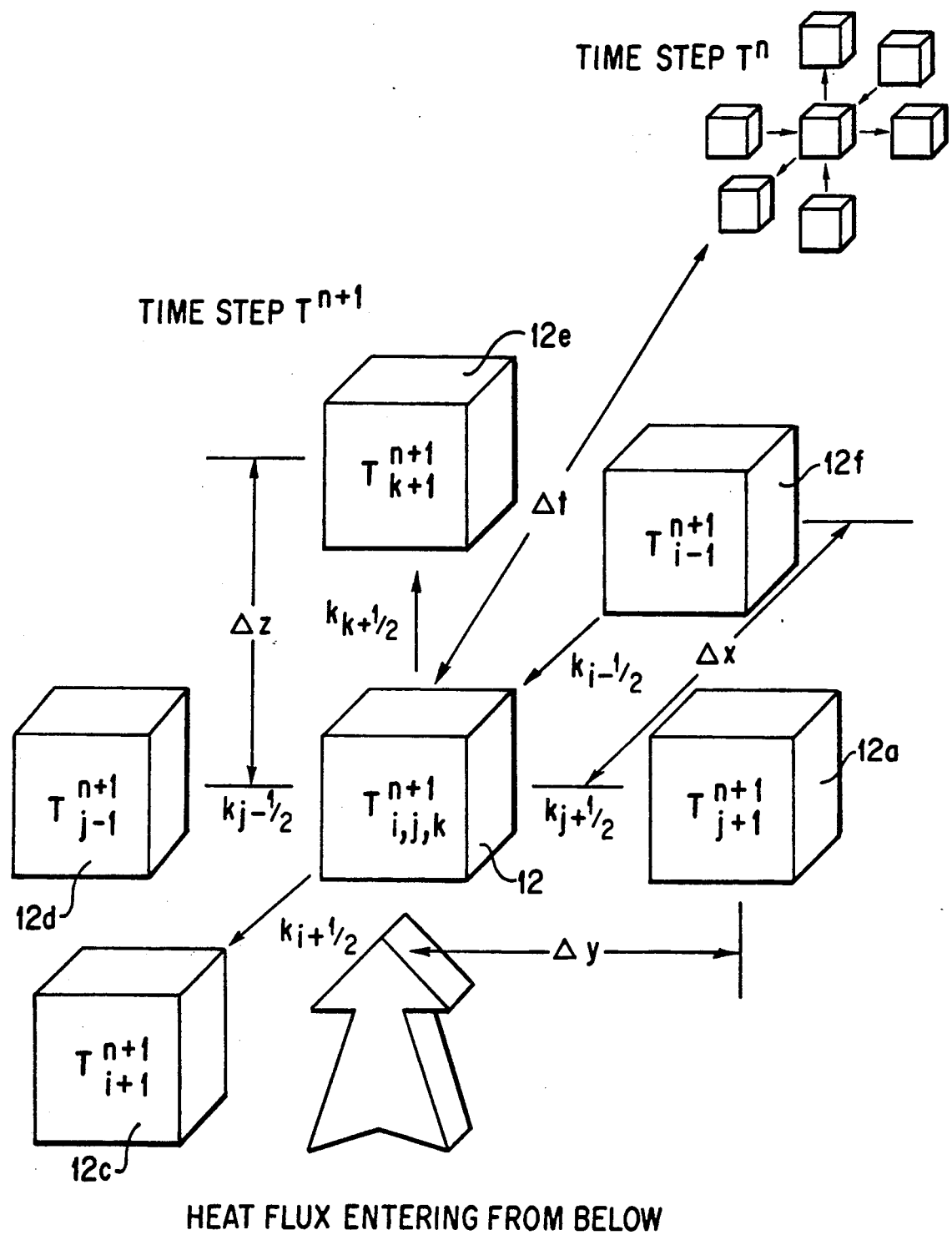
FIG. 19 is a perspective diagram of a centrally located cell on the lower bounding surface with five (5) contiguous cells.
Figure 20A:
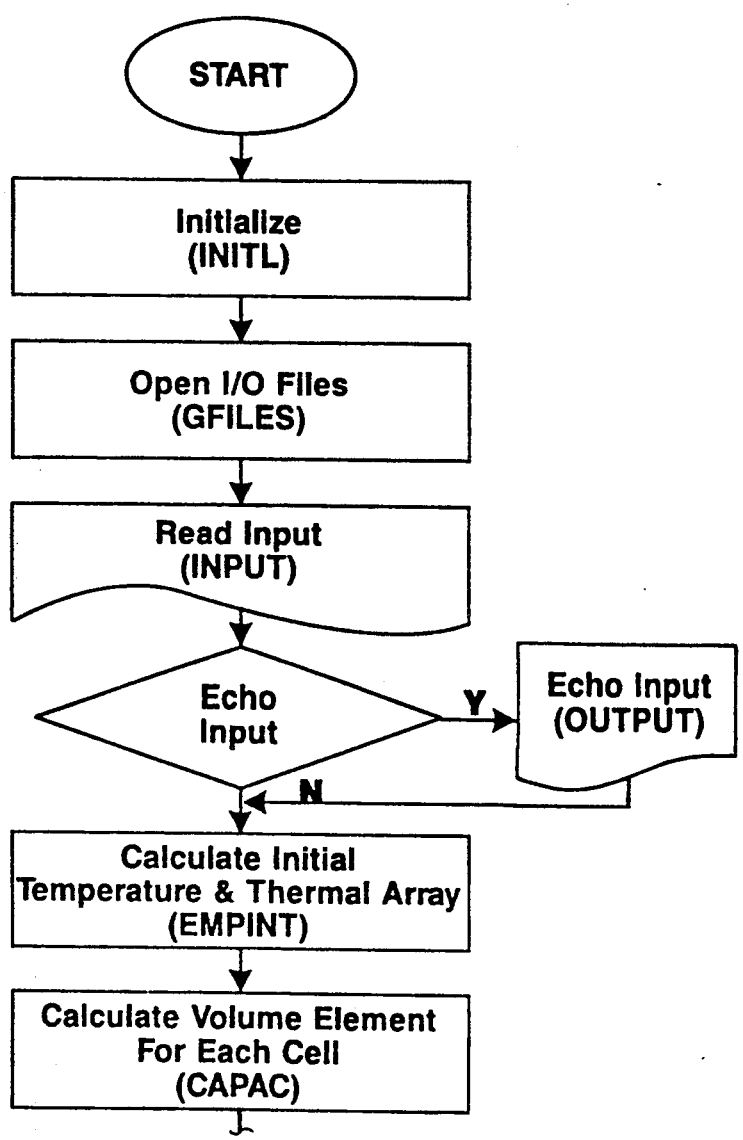
FIGS. 20A and 20B are flow diagrams for the thermal model.
Figure 20B:
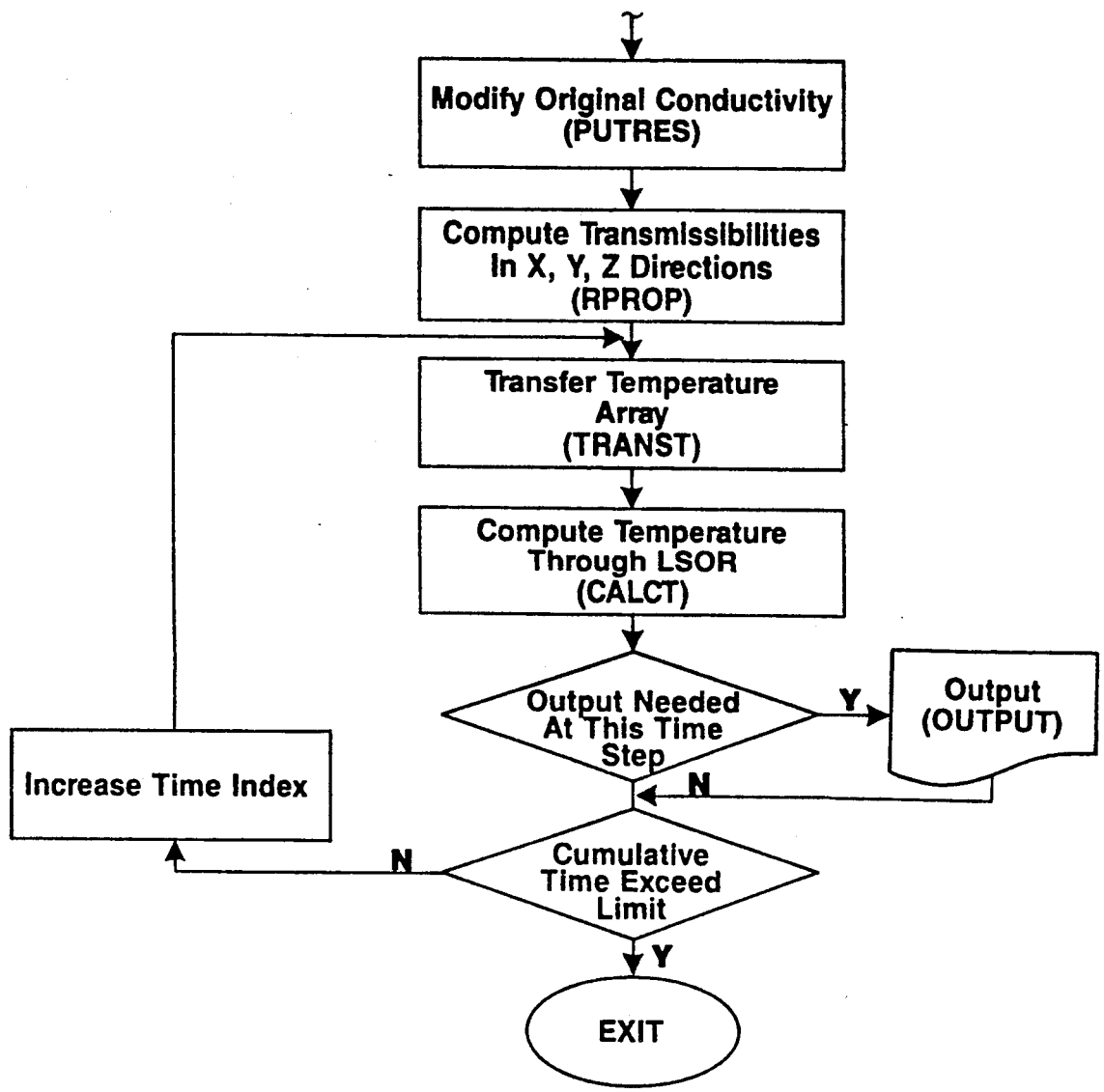
Figure 21:
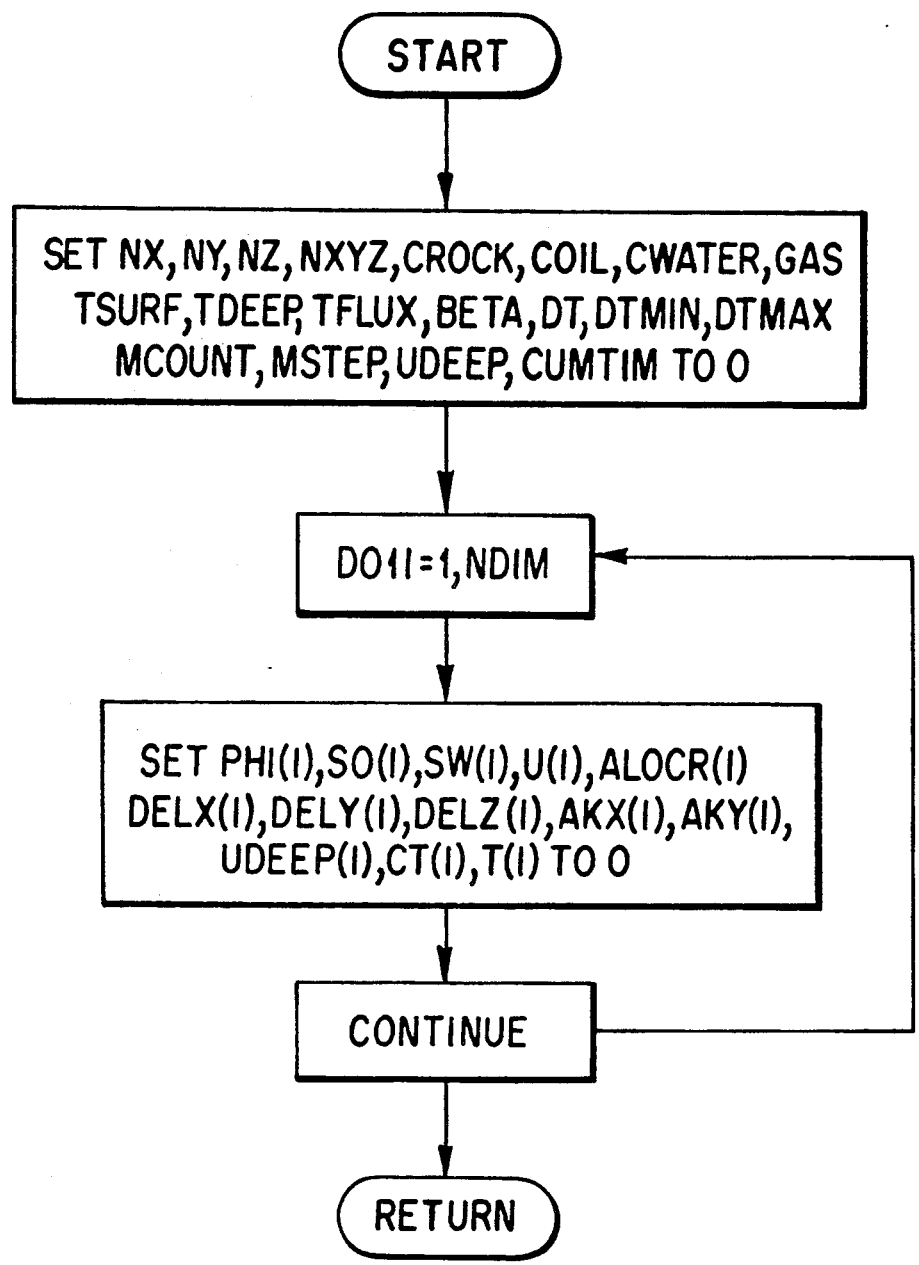
FIG. 21 is a flow diagram for INITIL.
Figure 22:
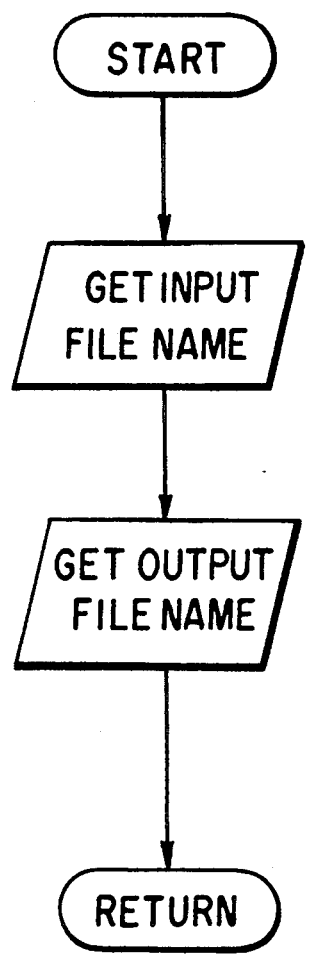
FIG. 22 is a flow diagram for GFILES.
Figure 23:
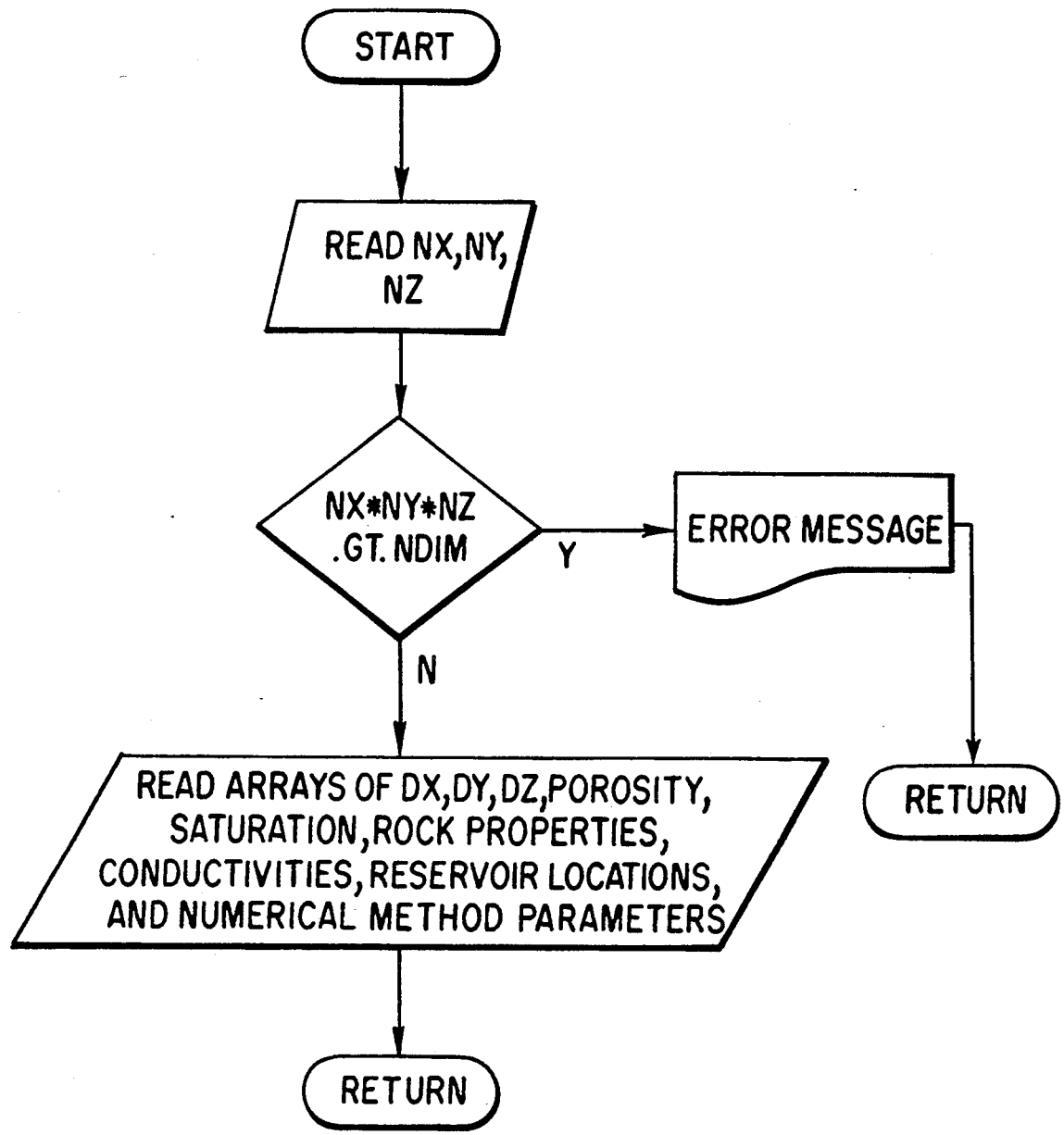
FIG. 23 is a flow diagram for INPUT.
Figure 24:
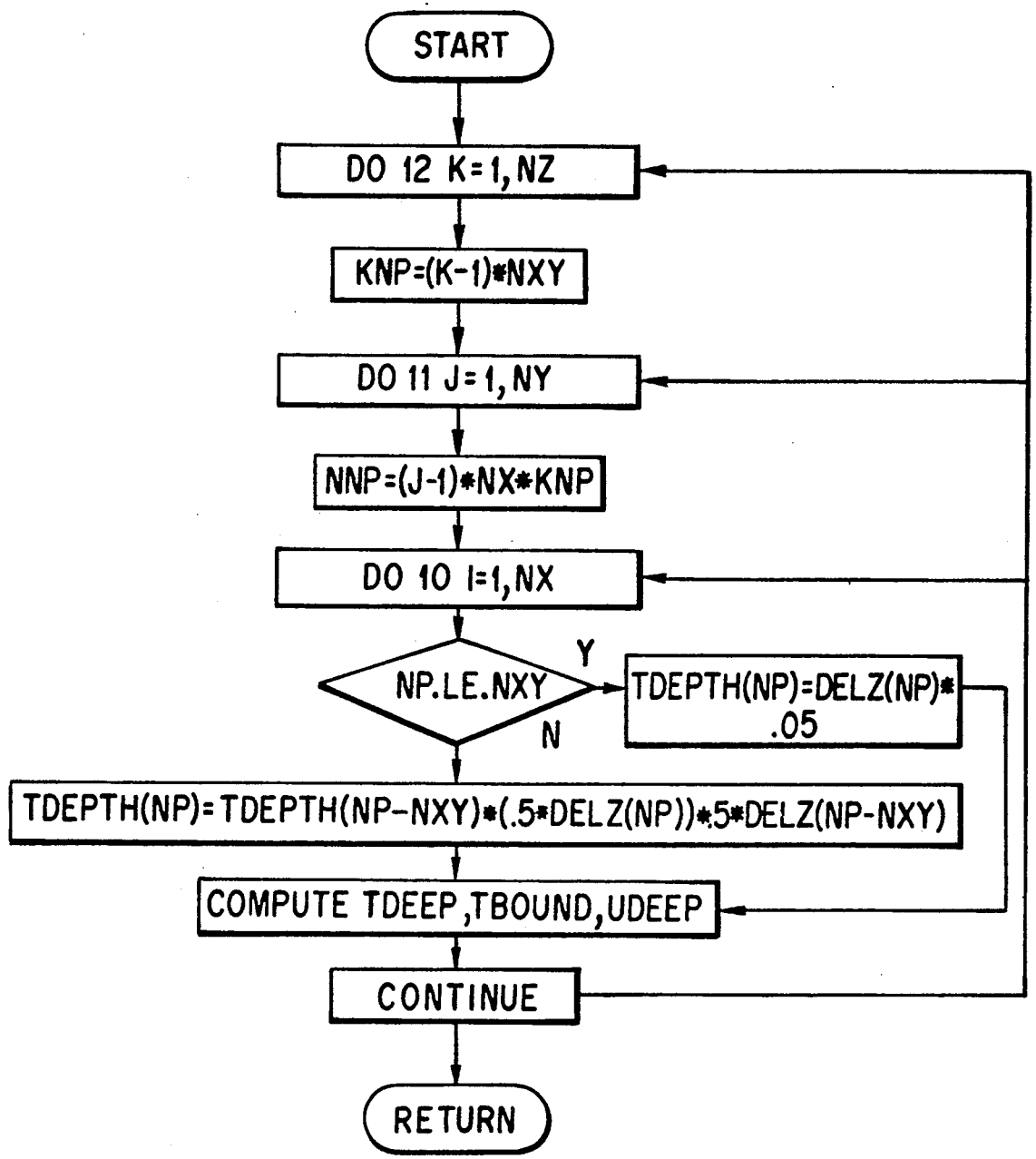
FIG. 24 is a flow diagram for EMPINT.
Figure 25:
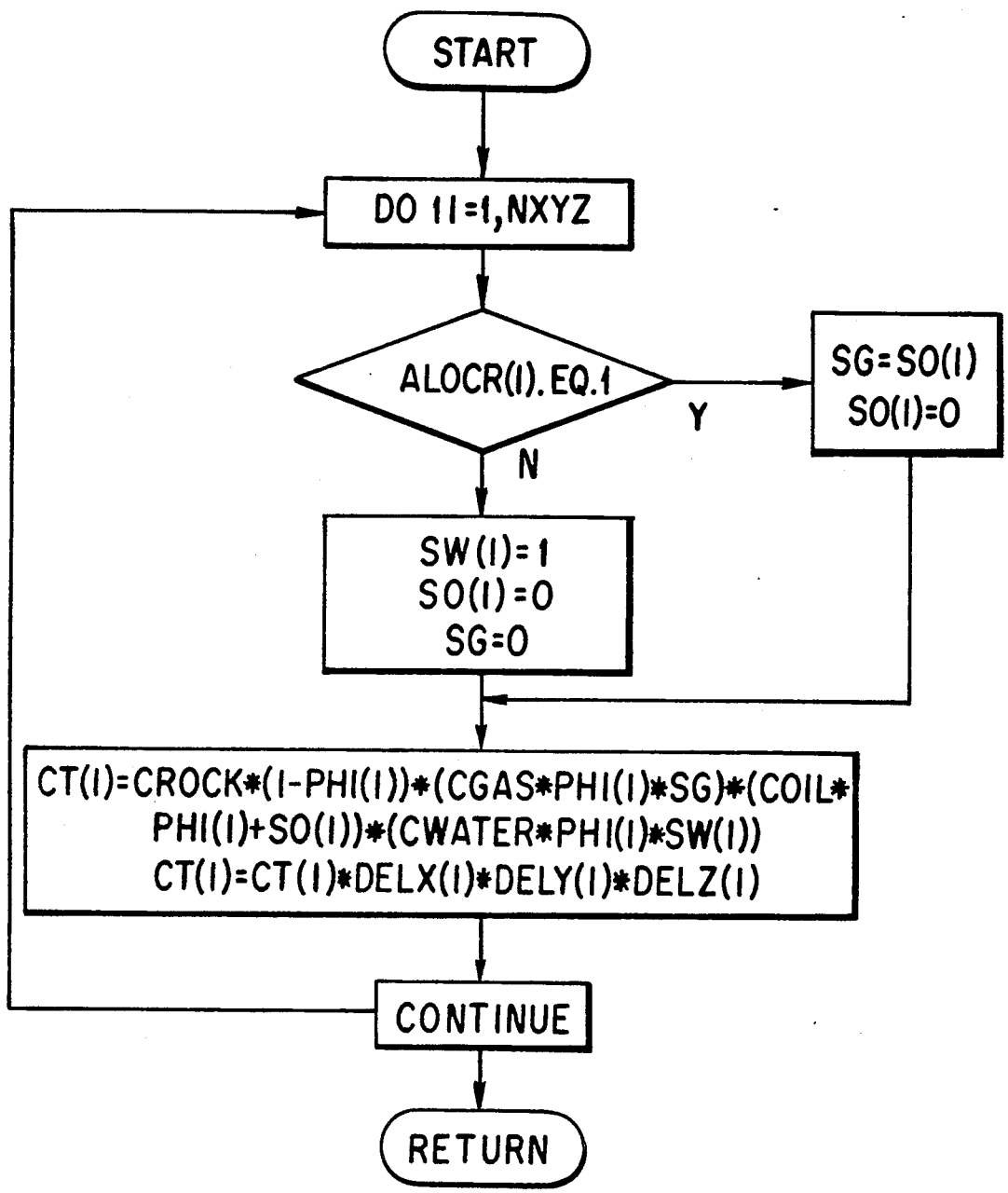
FIG. 25 is a flow diagram for CAPAC.
Figure 26:
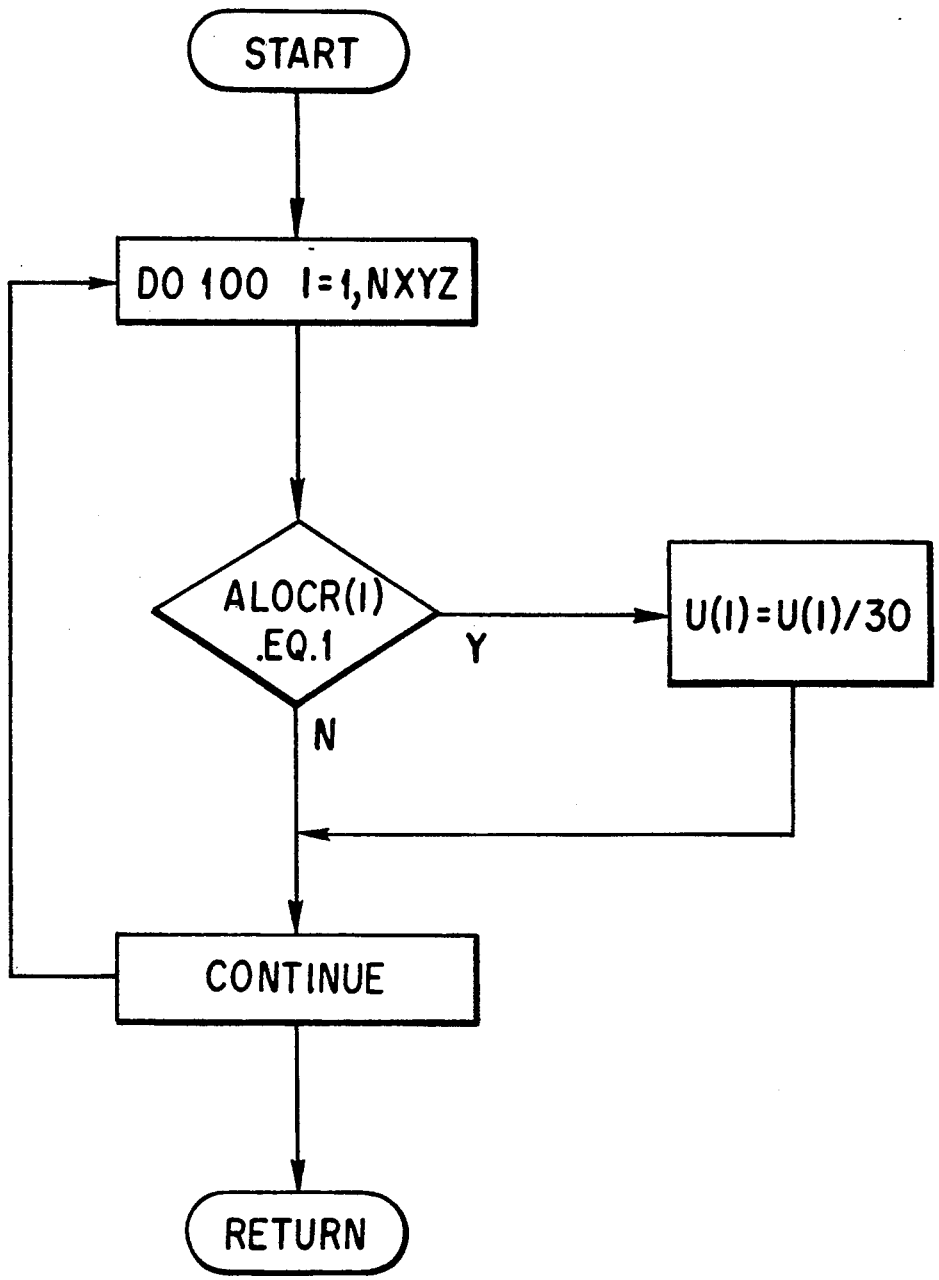
FIG. 26 is a flow diagram for PUTRES.
Figure 27:
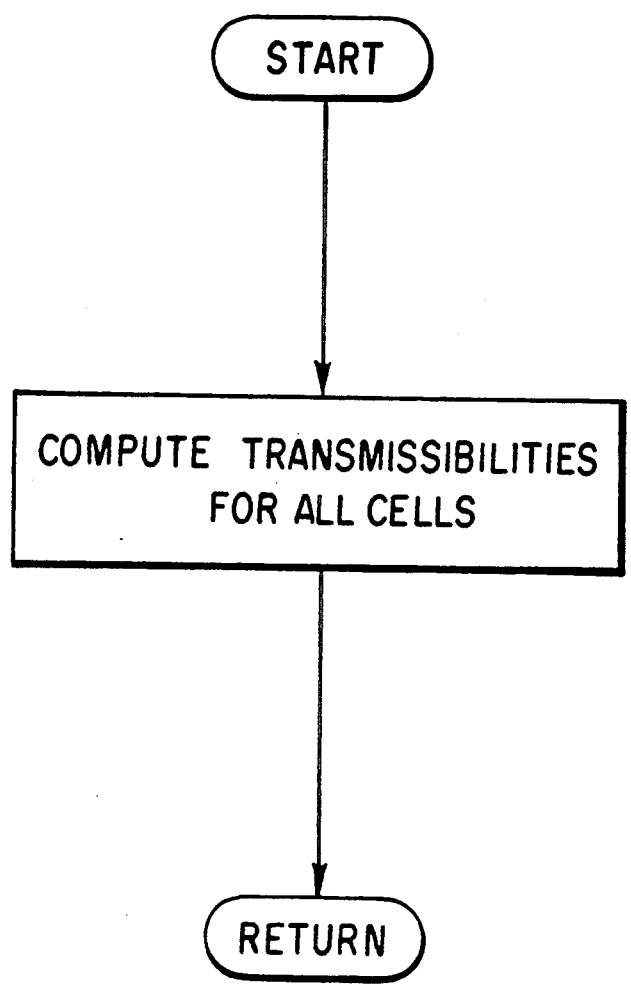
FIG. 27 is a flow diagram for RPROP.
Figure 28:
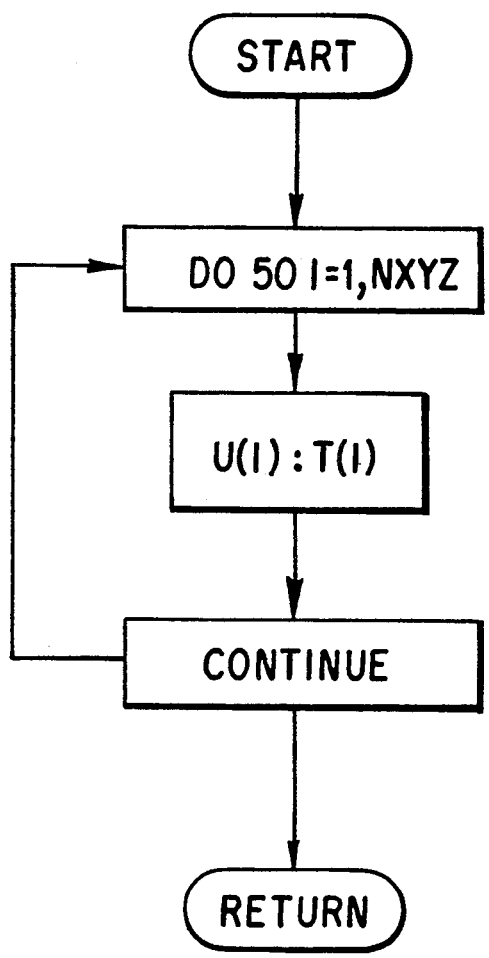
FIG. 28 is a flow diagram for TRANST.
Figure 29:
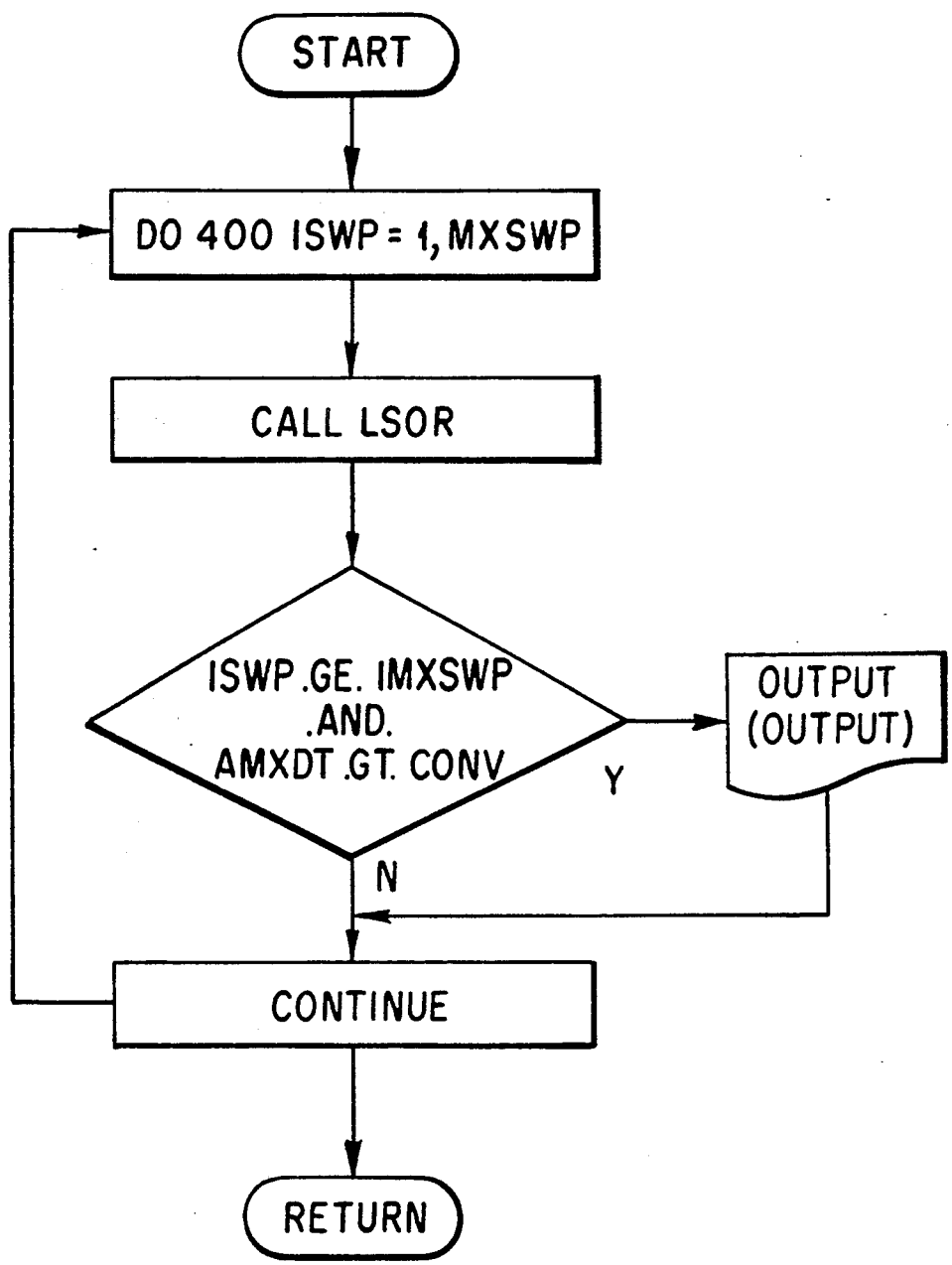
FIG. 29 is a flow diagram for CALCT.
Figure 30:
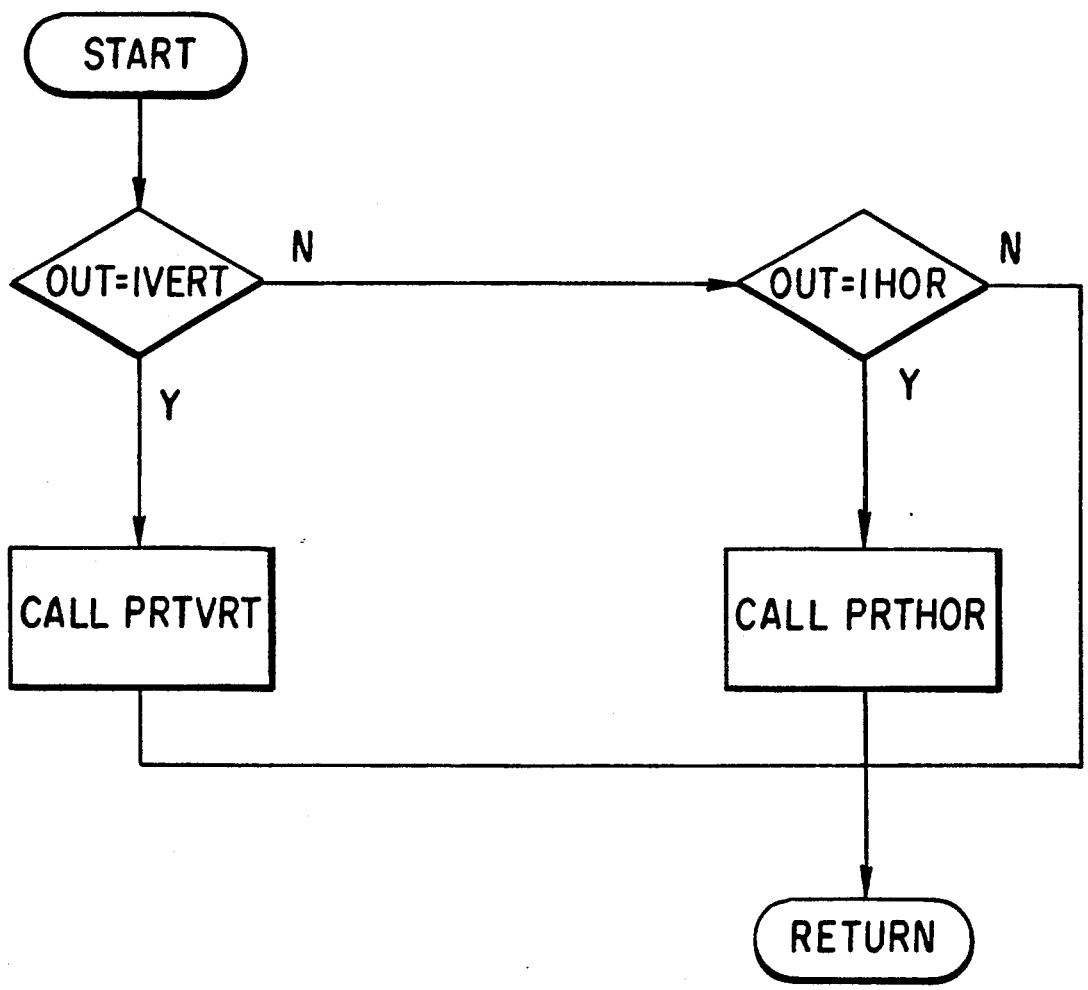
FIG. 30 is a flow diagram for OUTPUT.
Figure 31:
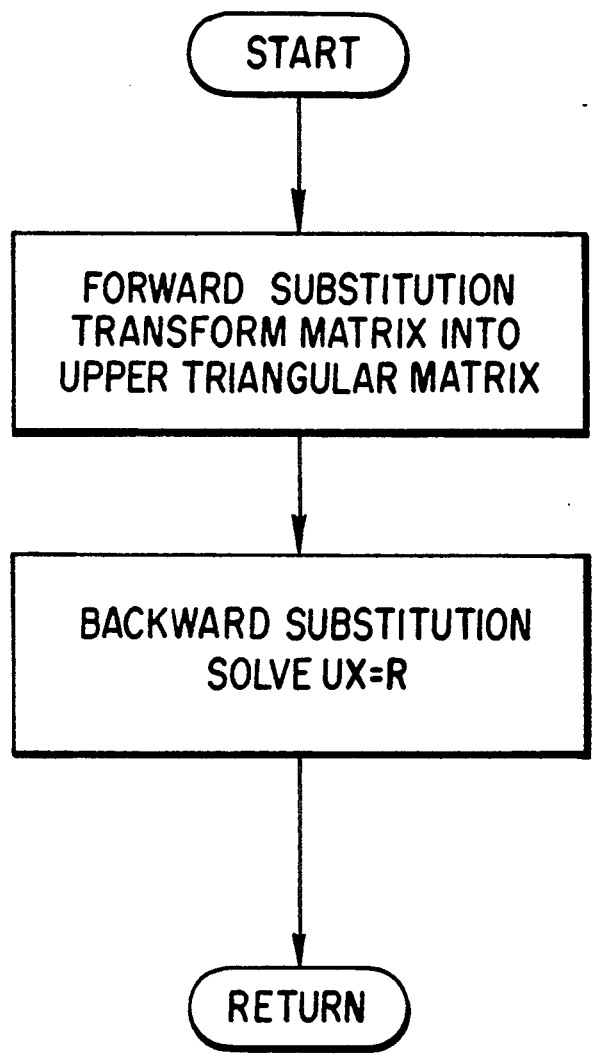
FIG. 31 is a flow diagram for THOMAS.
Figure 32:
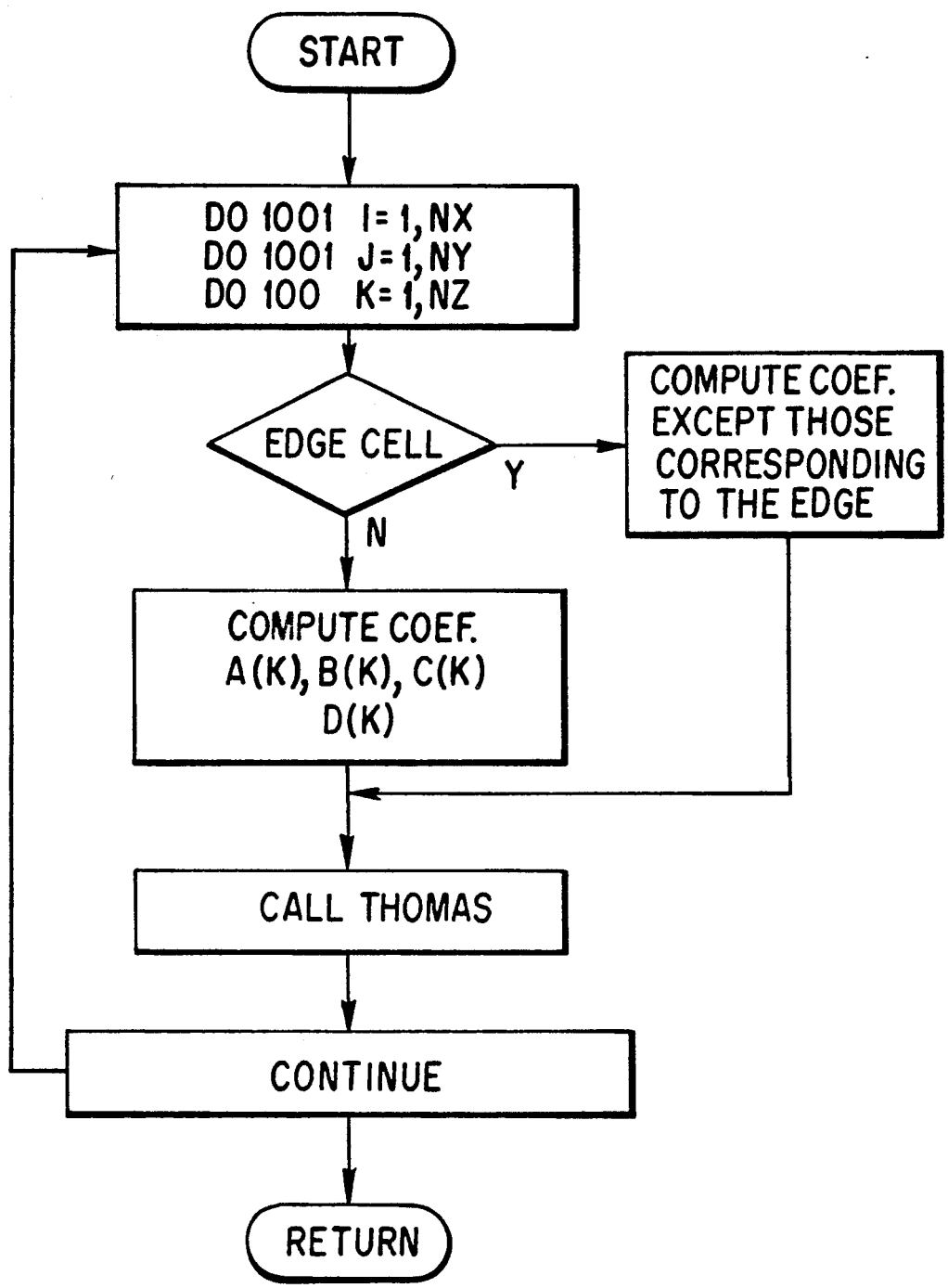
FIG. 32 is a flow diagram for LSOR.

Referring now to FIGS. 17, 18 and 19, there is seen a schematic diagram of a typical cell 12 (centrally) disposed having six (6) contiguous cells 12, identified as 12a, 12b, 12c, 12d, 12e, and 12f. Differential in temperature among all cells 12, 12a, 12b, 12c, 12d, 12e and 12f causes heat to flow with a change in time to and from all cells 12. Typical cells 12 that border the selective geologic volume would obviously only have five (5) contiguous cells 12 (e.g. if cell 12 is in the left bounding surface LBS (see FIG. 3), cell 12d would not exist). In FIG. 18, cell 12 borders in the upper bounding surface UBS; thus cell 12e is absent. Similarly, in FIG. 19, cell 12 borders in the lower bounding surface LoBS; cell 12b is omitted. The heat flux entering from below and into the lower bounding surface LoBS of the selected geologic volume equals the heat flux leaving the upper bounding surface UBS on the surface of the earth SB.

As previously indicated, a typical heat flux for the selected geologic volume and for each cell 12 contained therein is 1.0 BTU/(ft$^2$Day). The vertical LBS and RBS boundaries have no heat flow flowing into or out of them. Because typically there would be thousands (e.g. 1,000 to 100,000 and higher) of cells 12 selected by the user in a typical selected geologic volume, a computer is needed to establish steady state conditions in accordance with equation (2) above.

Figure 16:
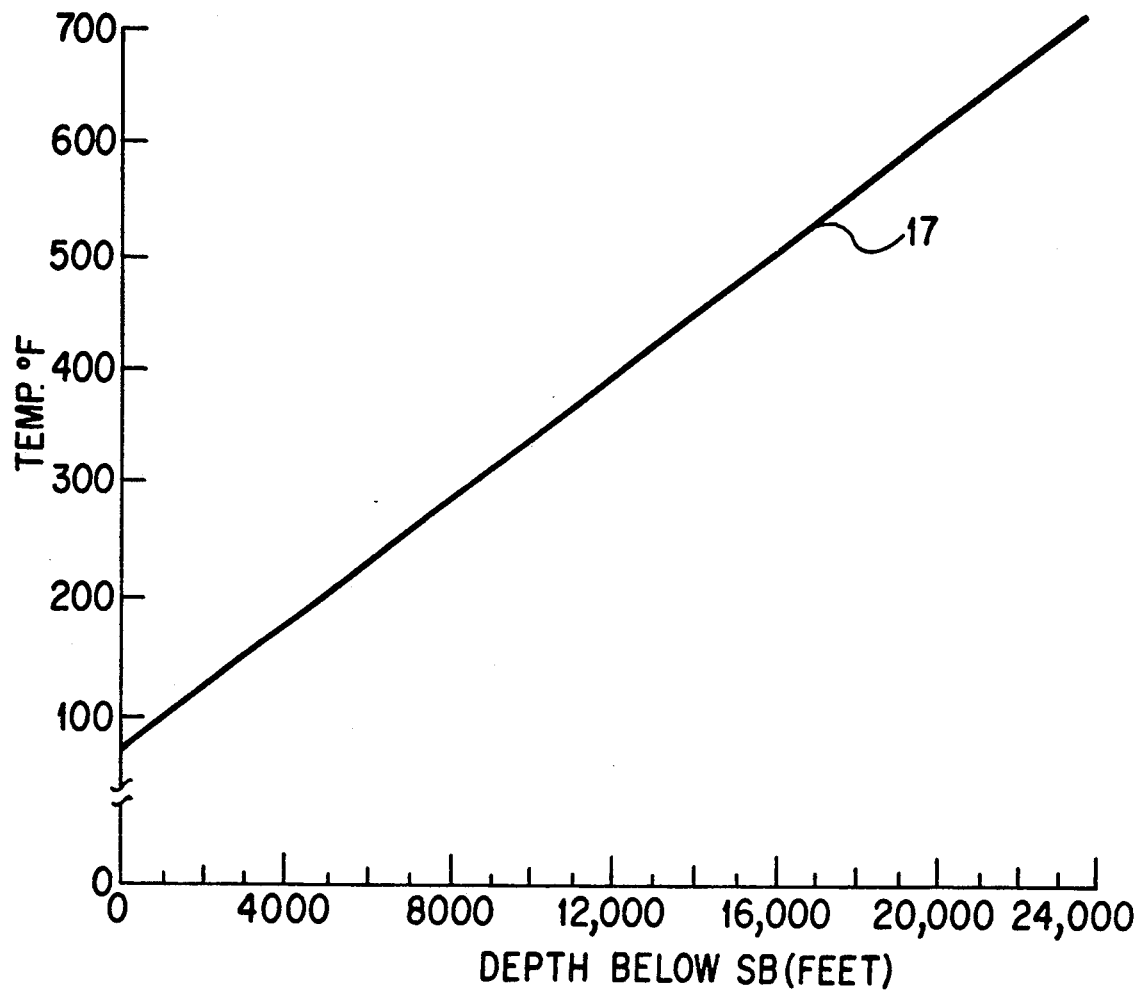
FIG. 16 is a temperature vs. depth curve for a homogeneous geologic volume 10.

Equations (1) and (2) are solved numerically on a computer by the heat flow model of the present invention in the initially assumed homogeneous geologic volume 10 domain as shown in FIGS. 1 or 7 in order to discover a more true (or more accurate) x, y, z temperature for each volumetric cell 12. As previously indicated, the x, y, z temperature from curve 17 and the thermal conductivity from the thermal conductivity curve TCC for each volumetric cell 12 is initially used in the diffusivity heat flow equations (i.e. equations (1) and (2)) to find a more true x, y, z temperature for each volumetric cell 12 in the initially assumed homogeneous geologic volume 10. The theory for solving equations (1) and (2) is discussed extensively below. The upper boundary surface UBS and the lower surface boundary LBS are open surfaces with a generally constant heat flux therethrough from the earth's interior. The upper boundary surface UBS has a suitable heat flux, such as from about 0.1 to about 5.0 BTU/(ft$^2$.day), preferably from about 0.25 to 1.25 BTU/(ft$^2$.day), more preferably about 1.0 BTU(ft$^2$.day). The vertical boundaries (e.g. left boundary surface LBS and right boundary surface RBS) in the domain of FIGS. 1 and 7 are closed surfaces to heat flow; and the temperature on the lower boundary LBS is fixed at a generally constant value, denoted in a flow diagram of a computer program, generally illustrated as 20 in FIG. 13 (and FIGS. 20-31), as THCI for temperature and at a depth, TDEEP. TDEEP is automatically calculated by the heat flow equations, for the model(s) of the present invention from the normal temperature or thermal gradient curve 17 as best shown in FIGS. 7 and 16. The normal temperature gradient curve 17 is also preferably used to initialize the temperature distribution at time zero, by back calculating the required thermal conductivity (k) for each volumetric cell 12 in the initially assumed homogeneous geologic volume 10 as a function of depth. As previously mentioned, division of the normal temperature gradient (for any cell 12) by the heat flux employed produces a thermal conductivity value (for any cell 12).

Figure 8:
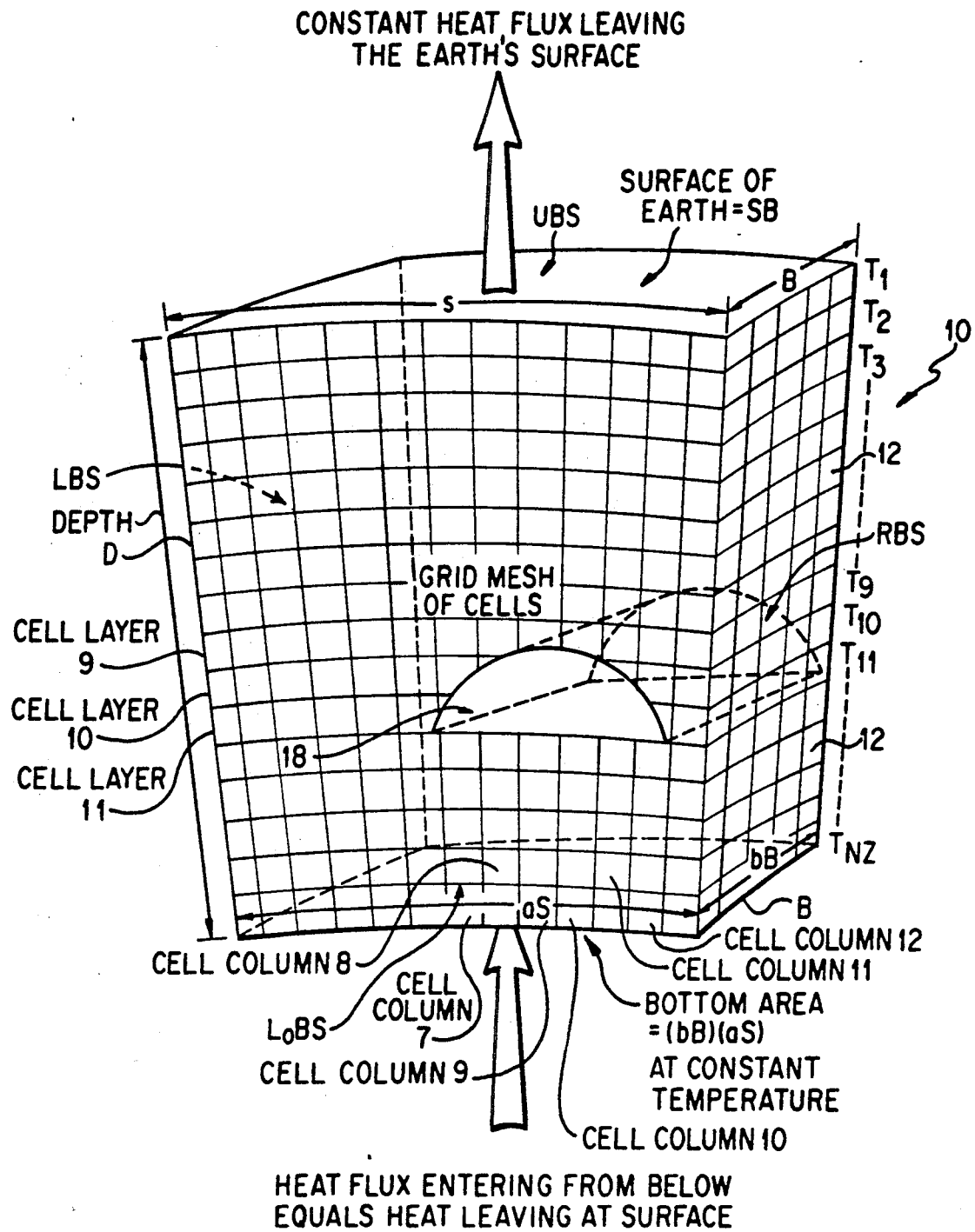
FIG. 8 is a perspective view of a geologic volume with a proposed hydrocarbon reservoir positioned therein.
Figure 9:
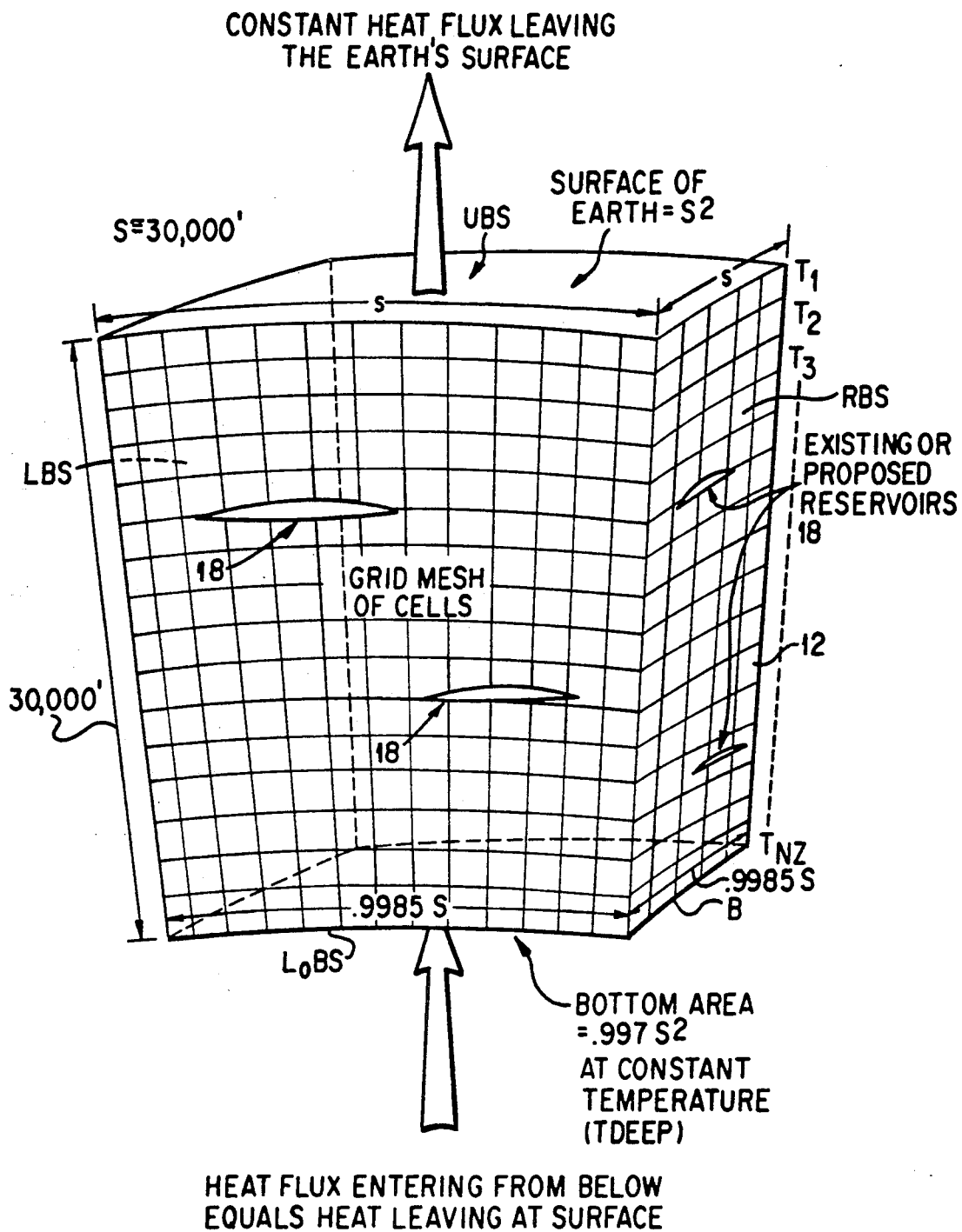
FIG. 9 is a perspective view of a geologic volume with a number of proposed hydrocarbon reservoir positioned therein.

When each volumetric cell 12 has received a more true x, y, z temperature, initially based or from the normal gradient temperature curve 17 and the thermal conductivity curve TCC for the geologic volume 10 and subsequently with the establishment of stable initial steady-state conditions, a hypothetical hydrocarbon reservoir, generally illustrated as 18 in FIGS. 3, 8, and 9 is subsequently introduced or is disposed in the geologic volume 10. The location of the hypothetical hydrocarbon reservoir 18 in the geologic volume 10 may be any suitable location but is preferable in close proximity to the location where prior well and/or seismic data and/or other geological data has or have indicated that there should be a hydrocarbon deposit. The object is to essentially duplicate the selected area and/or geologic volume in the geologic volume 10 such that the geologic volume 10 is no longer homogeneous and when the heat flow equations of the present invention are used to reestablish steady-state conditions (i.e. the introduction of a hypothetical reservoir 18 is an anomaly that disturbs the steady-state conditions of the initially assumed homogeneous geologic volume 10) and solve for x, y, z temperatures for each volumetric cell 12, the obtained x, y, z temperature for each volumetric cell 12 can be compared to the normal temperature vs. depth curve 16 obtained from the selected geologic volume/area to determine if the hypothetical hydrocarbon reservoir 18 was introduced at the correct location in the geologic volume 10. If there are not a sufficient number of measured and/or observed bottom hole temperatures available from the selected geologic volume such that a normal temperature vs. depth curve 16 could be generated, the available measured and/or observed bottom hole temperatures for or in certain cells 12 (e.g. referencing FIG. 3, $OT_{88}$ in cell 12 of $R_{88}$ and $OT_{67}$ in cells 12d $R_{67}$) of the selected geologic volume are compared with the solved (or obtained) x, y, z temperature for the same certain cells 12 after the hypothetical hydrocarbon reservoir 18 was introduced (e.g. the solved x, y, z temperature for cell 12 of $R_{88}$ and the solved x, y, z temperature for cell 12 of $R_{67}$ are respectively compared with the observed temperature ($OT_{88}$) for cell 12 of $R_{88}$ and the observed temperature ($OT_{67}$) for cell 12 of $R_{67}$). Stated alternatively, and assuming that enough measured and/or observed bottom hole temperatures were available from the selected geologic volume such that a normal temperature vs. depth curve 16 was generated, the heat flow equations (1) and (2) can solve for x, y, z temperatures (as more fully described below) for each volumetric cell 12 at reestablished steady-state conditions; and when a normal temperature vs. depth (i.e. cell depth which is typically taken at midpoint of the cells 12) curve is generated from the obtained x, y, z temperatures for each volumetric cell 12, the generated temperature vs. cell depth curve can be compared with the normal temperature vs. depth curve 16 to determine if the hypothetical hydrocarbon reservoir 18 was introduced at the location where a true hydrocarbon reservoir actually resides and is located in the selected area and/or geologic volume. If the generated temperature vs. cell depth curve can be superimposed directly on or over the normal temperature vs. depth curve 16 obtained from the selected area and/or geologic volume, then the hydrocarbon reservoir 18 was indeed positioned in the geologic volume 10 at a location where a true hydrocarbon reservoir exist in the selected geologic volume. Thus, the modified (initially assumed homogeneous) gelogic volume 10 having the hydrocarbon reservoir 18 is now a replica or duplicate of the selected geologic volume and area. If the generated temperature vs. cell depth curve can not be superimposed directly on or over the normal temperature vs. depth curve 16 obtained from the selected geologic volume (which, as previously indicated, is in Jackson County, Tex. for the Example below), then the hypothetical hydrocarbon reservoir 18 was not disposed at a location where a true hydrocarbon reservoir actually resides or exist in the selected geologic volume/area. The hypothetical hydrocarbon reservoir 18 subsequently has to be repositioned in the (initially assumed homogeneous) geologic volume 10 and another temperature vs. cell depth curve is generated and subsequently compared with the normal temperature vs. depth curve 16 obtained from the selected geologic volume/area to determine if the repositioned hypothetical hydrocarbon reservoir 18 was disposed at a location where a true hydrocarbon reservoir does indeed exist in the selected geologic volume/area. The process can be repeated as many times as necessary until one or more hypothetical hydrocarbon reservoir(s) 18 has or have been positioned in a subterranean location where one or more true and actual hydrocarbon reservoir(s) exist in the selected geologic volume/area.

The manner and/or means for positioning or disposing the hypothetical hydrocarbon reservoir 18 in the geologic volume 10 may be by any suitable manner and/or means, but is preferably accomplished by varying the certain geological properties of each cell 12 that forms part of, or is included in, the proposed hydrocarbon reservoir 18. In FIG. 8, the anticipated or hypothetical hydrocarbon reservoir 18 comprises the volumetric cells in cell layers 9–11 (or $L_9$, $L_{10}$ and $L_{11}$) and cell columns 7–12 (or $C_7$, $C_8$, $C_9$, $C_{10}$, $C_{11}$, and $C_{12}$). As was previously indicated, initially it is assumed that each volumetric cell 12 included in the geologic volume 10 has the same or identical geologic properties (i.e. same porosity, and same water saturation ($S_w$)) with no oil saturation ($S_o$) and no gas saturation ($S_g$). Thermal conductivity (k) values for volumetric cells 12 decrease with the depth of the cells 12. To simulate a hydrocarbon accumulation or reservoir 18, one or more of the identical geologic properties (i.e. porosity, and water saturation ($S_w$)) of each certain volumetric cell 12 contained in the proposed hydrocarbon reservoir 18 (i.e. cell layers 9–11 cell columns 7–12, in FIG. 8) is diminished or increased or otherwise modified or supplemented with one or more of the geologic properties selected from the group consisting of thermal conductivity (k), oil saturation ($S_o$), heat capacity for oil ($C_{oil}$), gas saturation ($S_g$), heat capacity for gas ($C_g$), and mixtures thereof; with the remaining cells 12 (i.e. those cells 12 not contained in the proposed hydrocarbon reservoir 18) possessing the geologic properties (i.e. same porosity, thermal conductivity (k), etc.) that resulted from the x, y, z temperature curve 17 and the thermal conductivity curve TCC for each volumetric cell 12 being initially employed in the diffusivity heat flow equations (1) and (2) to discover a truer x, y, z temperature for each volumetric cell 12 in the initially assumed homogeneous geologic volume 10. Preferably, to simulate a hydrocarbon accumulation or reservoir 18, the thermal conductivity (k) of each certain volumetric cell 12 contained in the proposed hydrocarbon reservoir 18 is reduced and an approximate oil saturation ($S_o$), oil heat capacity ($C_{oil}$) and gas saturation ($S_g$) and gas heat is capacity ($C_g$) are added to each certain volumetric cell 12. Thus, the thermal conductivity (k) of the certain volumetric cells 12 contained in the proposed hydrocarbon reservoir 18 is reduced and a gas saturation ($S_g$), a gas heat capacity ($C_g$), an oil saturation ($S_o$) and an oil heat capacity ($C_{oil}$) are added to simulate the hydrocarbon reservoir 18; and the residual volumetric cells 12 each remain undisturbed, each possessing the same geologic properties obtained after discovering a more true and more accurate x, y, z temperature for the respective volumetric cells 12 in the initially assumed homogeneous geologic volume 10. The model problem is to subsequently redistribute the temperatures of and/or from each of the certain volumetric cells 12 according to equations (1) or (2) to discover the true x, y, z temperature for each volumetric cell 12 in the geologic volume 10. Typically, the thermal conductivity (k) of the proposed or existing hydrocarbon reservoir 18 is reduced from one twentieth (1/20) to one thirtieth (1/30) of water filled pore volumes. The gas saturation ($S_g$) will preferably have a value of from about 0.2 to about 0.9, typically around 0.3 depending on the oil saturation ($S_o$) which will vary from about 0.2 to about 0.9, more typically around 0.7. The heat capacity for the oil ($C_{oil}$) can vary from about 25 BTU/(ft$^3$°F.) to about 35 BTU/(ft$^3$°F.), preferably around 30 BTU/(ft$^3$°F.). The heat capacity for the gas ($C_g$) will have a value of from about 10.0 BTU/(ft$^3$°F.) to about 25.0 BTU/(ft$^3$°F.), more preferably around 15.0 BTU/(ft$^3$°F.).

In redistributing the temperatures of and/or from each of the certain volumetric cells 12 according to the diffusivity heat flow equations (1) and/or (2) to obtain the true x, y, z temperature for each volumetric cell 12 in the geologic volume 10 after a proposed hydrocarbon reservoir 18 has been introduced therein, equations (1) and (2) are solved numerically on a computer by the heat flow model of the present invention in the geologic volume domain as shown in FIGS. 8 and 9. The theory for solving equations (1) and (2) is discussed in detail hereafter. As was previously provided and indicated for solving equations (1) and (2) in the initially assumed homogeneous geologic volume 10 domain as is illustrated in FIGS. 1 or 7, the upper boundary surface UBS and the lower surface boundary LBS are open surfaces with a generally constant heat flux flow therethrough from the earth's interior. The upper boundary surface UBS has a suitable heat flux, such as from about 0.1 to about 5.0 BTU(ft$^2$day), more preferably about 1.0 BTU(ft$^2$day). The vertical boundaries (e.g. left boundary surface LBS and right boundary surface RBS) in the domain of FIGS. 8 and 9 are closed surfaces to heat flow; and the temperature on the lower boundary LBS is fixed at a generally constant value, denoted for a flow diagram of a computer program, generally illustrated as 20 in FIG. 10 (see FIGS. 20 through 31 for flow diagrams of subroutines), as THCI for temperature and at a depth, TDEEP. TDEEP is automatically calculated by the heat flow equations, for the model(s) of the present invention from the normal temperature or thermal gradient curve 16 provided by the user for the area, as best shown in FIG. 6. The normal temperature gradient 16 is also used to initialize the temperature distribution at time zero, by back calculating the required thermal conductivity (k) for each volumetric cell 12 as a function of depth.

In the theory to solve equations (1) and (2) and to implement the solution technique to equations (1) and (2) for both discovering a more accurate x, y, z temperature off of or from curve 17 for each volumetric cell 12 in the initially assumed homogeneous geologic volume 10 and/or redistributing the x, y, z temperature throughout the entire geologic volume 10 having a proposed hydrocarbon reservoir 18 to find the true x, y, z temperature for each volumetric cell 12 in the geologic volume 10 containing a hypothetical hydrocarbon reservoir 18, the geometry of FIGS. 1 and 7 or FIGS. 8 and 9 is replaced with an ordinary orthogonal x, y, z space neglecting the fact that surface areas diminish along with rays through the center of the earth. However, for depths of the magnitude used in initial applications of the model of the present invention, the geometric errors are negligible. For instance, in the data set included in the Example below, the total depth of investigation is less than 30,000 feet. By simple trigonometric arguments, it can be shown that the lower surface area (i.e. (bB)(aS)) has diminished to 99.7% of the upper surface area (i.e. SB) over the 30,000 feet. If the two areas are considered equal as in an orthogonal coordinate system, only a 0.3% geometric error is induced. If the model of the present invention is used for much greater depths, a program modification would be in order to account for the diminishing area and volume as the earth's center is approached.

The nomenclature for the variables, superscripts, and subscripts employed in the solution technique to (and in the theory to solve) equations (1) and (2) are as follows:

Variables $K$ = Heat conductivity [BTU/(ft °F.Day)]
$T$ = Temperature(F.°)
$C$ = Heat capacity [BTU/(ft$^3$°F.)]
$t$ = Time (delays)
$x$ = Horizontal space dimension (Feet)
$y$ = Horizontal space dimension (Feet)
$z$ = Vertical space dimension (Feet)
$\Delta X$ = Grid block x direction size (Feet)
$\Delta Y$ = Grid block y direction size (Feet)
$\Delta Z$ = Grid block z direction size (Feet)
$C_r = \Delta X \Delta Y \Delta Z \, C_{eff}$
$C_{eff}$ = Volumetrically weighted effective cell heat capacity
$C_{rock}$ = Rock heat capacity
$C_{oil}$ = Oil heat capacity
$C_g$ = Gas heat capacity
$C_{wtr}$ = Water heat capacity
$\theta$ = Rock porosity
$F(T)$ = Newton-Rapson function to be driven to zero by iteration
$\delta T$ = Temperature increment
$\omega$ = Over-relaxation factor Superscripts $n$ = Time level
$l$ = Iteration level Subscripts $i$ = Space index in x direction
$j$ = Space index in y direction
$k$ = Space index in z direction
NX = No. of cells in x direction
NY = No. of cells in y direction
NZ = No. of cells in z direction
NXY = NX$\phi$NY
NXYZ = NX$\phi$NY$\phi$NZ Heat conductivity, K, will typically vary from about 0.1 to about 10, preferably around 0.5 to about 1.5. T will vary from about 50° F. to about 350° F. with 175° F. to 225° F. being more typical. Heat capacity, C, will usually range from about 0.05 to about 0.5 with 0.5 to 1.5 being more typical. The space dimension (x, y and z) will vary from about 30 to 500, more typically 40 to 60. Grid block direction size (x, y and z direction size) will generally range from 20 to 100, more typically 40 to 60. $C_{rock}$ will range from 0.01 to 0.5, more typically around 0.02 to 0.03. $C_{oil}$ and $C_g$ both typically vary from 0.001 to 0.10, more typically from 0.04 to 0.06. $C_{wtr}$ will vary from 0.01 to 1.5, more preferably from 0.6 to 0.8. Rock porosity, $\phi$, will typically vary from 0 to about 30%, more typically 15 to 20%. Temperature increment(s) is from 1° F. to about 30° F., usually 8° F. to 12° F. Time level, n, will vary from 0 to 1,000, and iteration level, l, will vary from 0 to 10. The number of cells in the x direction (NX), the y direction (NY) and the z direction (WZ) will all vary from 50 to 500.

In solving equation (2), equation (2) may be expressed in finite difference form as:

$$\Delta k \Delta T = C_T \left( \frac{\delta T}{\Delta t} \right) \quad (3)$$

where:

$\delta T = T^{n+1} - T^n$
(Temperature difference between $n + 1$ and $n$)

$\Delta t$ = Time increment between $T^{n+1}$ and $T^n = t^{n+1} - t^n$ $C_T = \Delta X \Delta Y \Delta Z \, C_{eff}$ $C_{eff} = [C_{rock}(1 - \theta) + C_{oil}S_o + C_g S_g + C_{wtr}S_w]$ $$\Delta k \Delta T = \Delta Y \Delta Z \left[ K_{i+\frac{1}{2}} \left( \frac{T_{i+1}^{n+1} - T_i^{n+1}}{\Delta X} \right) - K_{i-\frac{1}{2}} \left( \frac{T_i^{n+1} - T_{i-1}^{n+1}}{\Delta X} \right) \right] + \Delta X \Delta Z \left[ K_{j+\frac{1}{2}} \left( \frac{T_{j+1}^{n+1} - T_j^{n+1}}{\Delta Y} \right) - K_{j-\frac{1}{2}} \left( \frac{T_j^{n+1} - T_{j-1}^{n+1}}{\Delta Y} \right) \right] + \Delta X \Delta Y \left[ K_{k+\frac{1}{2}} \left( \frac{T_{k+1}^{n+1} - T_k^{n+1}}{\Delta Z} \right) - K_{k-\frac{1}{2}} \left( \frac{T_k^{n+1} - T_{k-1}^{n+1}}{\Delta Z} \right) \right]$$

The notations used here are taken from Coats in the reservoir simulation technology (see Coats, K. H. el al.: "Simulation of Three-Dimensional, Two-phase Flow in Oil and Gas Reservoirs", Soc. Pet. Eng. J., Dec., 1967: 377–388, incorporated herein by reference thereto). In discovering a more accurate x, y, z temperature for each volumetric cell 12 in the initially assumed homogeneous geologic volume 10 (not containing a proposed hydrocarbon reservoir 18) through the use of x, y, z temperature from curve 17 for each volumetric cell 12, there is no $S_o$ and/or $S_g$; thus $S_o$ and/or $S_g$ are given a value of zero. Subscripting abbreviation convention is as follows:

$\Delta X \Delta Y \equiv \Delta X_{i,j,k} \, \Delta Y_{i,j,k}$ and where the following can be written:

$K_{i+\frac{1}{2}} \equiv K_{i+\frac{1}{2},j,k}$ $K_{j+\frac{1}{2}} \equiv K_{i,j+\frac{1}{2},k}$ $T_{j+1}^{n+1} \equiv T_{i,j+1,k}^{n+1}$, etc.

It is desired to solve equation (3) by Newton-Rapson iteration, let:

$$F(T) = \Delta K \Delta T - \frac{C_T}{\Delta t} \delta T$$

The procedure is to drive F(T) to zero by iteration. Let l denote iteration level, then:

$$F^l(T) = \Delta K \Delta T^l - \frac{C_T}{\Delta t}(T^l - T^n)$$

At the limit $l \to n+1$ when $F(T) \to 0$. The Newton-Rapson procedure comes directly from the Taylor series truncated at two terms:

$$F^{l+1}(T) = F^l(T) + \left( \frac{dF^l}{dT} \right) \delta T$$

Substituting gives:

$$F^{l+1}(T) = \Delta K \Delta T^l - \frac{C_T}{\Delta t}(T^l - T^n) + \frac{d}{dT}\left[ \Delta K \Delta T^l - \frac{C_T}{\Delta t}(T^l - T^n) \right] \delta T \quad (4)$$

An equation like (4) is written for each node or volumetric cell 12 in the integration grid, and when the implied total derivative $$\frac{dF(T)}{dT}$$

is expanded into its partial derivatives:

$$\frac{dF}{dT} = \frac{\partial F}{\partial T_1} + \frac{\partial F}{\partial T_2} + \frac{\partial F}{\partial T_3} + \cdots + \frac{\partial F}{\partial T_N}$$

N=total number of nodes or volumetric cells 12 and the implied differentiation of the F's is accomplished, a matrix equation develops where the unknown vector is $\delta T_l$, $\xi = 1$, N. For every point in the grid, an equation is generated with the general interior equation having seven entries in the coefficient matrix. Formally the matrix equation is written:

$$\begin{bmatrix} \frac{\partial F_1}{\partial T_1} & \frac{\partial F_1}{\partial T_2} & \frac{\partial F_1}{\partial T_3} & \cdots & \frac{\partial F_1}{\partial T_N} \\ \frac{\partial F_2}{\partial T_1} & \frac{\partial F_2}{\partial T_2} & \frac{\partial F_2}{\partial T_3} & \cdots & \frac{\partial F_2}{\partial T_N} \\ \cdot & \cdot & \cdot & \cdots & \cdot \\ \cdot & \cdot & \cdot & \cdots & \cdot \\ \frac{\partial F_N}{\partial T_1} & \frac{\partial F_N}{\partial T_2} & \frac{\partial F_N}{\partial T_3} & \cdots & \frac{\partial F_N}{\partial T_N} \end{bmatrix}^l \begin{bmatrix} \delta T_1 \\ \delta T_2 \\ \cdot \\ \cdot \\ \delta T_N \end{bmatrix}^{l+1} = - \begin{bmatrix} F_1 \\ F_2 \\ \cdot \\ \cdot \\ F_N \end{bmatrix}^l \quad (5)$$

In matrix notation equation (5) becomes:

$$J(F^l)\delta T^{l+1} = F \quad (6)$$

where J(F) is called the Jacobian of F, $\delta T$ is the solution vector, and the vector $F^l$ is called the residual at iteration l.

Symbolically:

$$\delta T^{l+1} = J^{-1}(F^l) F^l \quad (7)$$

then:

$$T^{l+1} = T^l + \omega \delta T^{l+1} \quad (8)$$

where $\omega$ is a relaxation factor.

The matrix inverse indicated in equation (7) is only feasible for a small number of nodes or volumetric cells 12. For practical problems, such as the example below that employs 17,000 nodes or cells 12, an iterative solution is necessary. Therefore, equation (6) is solved using a Line Successive Over-Relaxation method (LSOR), preferably a vertical "Z" direction LSOR. Around this iterative LSOR procedure, an outer Newton-Rapson iteration is performed to speed up convergence to steady-state (elliptic) conditions.

In the LSOR procedure, the following nomenclatures are employed:

Blood Faced Variables

J=Jacobian matrix of Newton-Rapson variable F.

X=Solution vector of time corrections each iteration

R=Residual vector at iteration level l

Jacobian Matrix J Elements

A=Diagonal submatrix of J of order NZ with elements a

B=Tridiagonal submatrix of J of order NZ with elements b

C=Diagonal submatrix of J of order NZ with elements c

U=Diagonal submatrix of J of order NZ with elements u

L=Diagonal submatrix of J of order NZ with elements l

Solution vector X and Residual R

X=Column subvector of X of order NZ with elements z

R=Column subvector of R of order NZ with elements r

The Jacobian matrix of the Newton-Rapson J has seven diagonals for the three-dimensional space, and the matrix Equation (6) from above may be replaced with the generic form:

$$NX = R$$

where $N = J(F^l)$ is the septa-diagonal Jacobian matrix.

$X = \delta T^{l+1}$ is the solution vector of temperature corrections for the $(l+1)^{th}$ iteration.

$R = F$ is the residual vector at iteration l.

It is important to consider the direction in which the line over-relaxation method is oriented. From a strictly mathematical point of view the best direction to orient the LSOR algorithm would be along the direction with the fewest grid or volumetric cells 12, thus minimizing the linear algebra required. Another consideration is the required storage as determined by the matrix bandwidth. However, because of the highly anisotropic nature of heat flow out of the earth, most of the flow is vertical, with very small components in the horizontal plane. It is very advantageous to orient the LSOR in the vertical direction where most of the heat flow "action" is situated. By so doing, an iterative solution technique such as the LSOR with all its savings in computer time and storage, can be implemented with much of the characteristics of stability and accuracy of a fully implicit direct solution.

With a vertically oriented LSOR, matrix N would be a partitioned matrix of order NXY composed of submatrices of order NZ and would appear as:

$$= \begin{bmatrix} B_1 & C_1 & & U_1 & & 0 \\ A_2 & B_2 & C_2 & & U_2 & \\ & A_3 & B_3 & C_3 & 0 & U_3 \\ L_{\xi+1} & & 0 & & & \\ & L_{\xi+2} & & & \cdot & \\ & & L_{\xi+3} & & & \\ 0 & & & L_{NXY} & A_{NXY} & B_{NXY} \end{bmatrix} \begin{bmatrix} X_1 \\ X_2 \\ X_3 \\ \cdot \\ \cdot \\ X_{NXY} \end{bmatrix}$$

where the structure of the submatrix B is tridiagonal or order NZ and A,C,L and U are diagonal submatrices of order NZ, i.e. the submatrices appear as:

$$A = \begin{bmatrix} a_{1,1} & & & & 0 \\ & a_{2,2} & & & \\ & & a_{3,3} & & \\ & & & \ddots & \\ 0 & & & & a_{\xi,\xi} \end{bmatrix}$$

$$B = \begin{bmatrix} b_{1,1} & b_{1,2} & & & 0 \\ b_{2,1} & b_{2,2} & b_{2,3} & & \\ & b_{3,2} & b_{3,3} & b_{3,4} & \\ & & & \ddots & \\ 0 & & & b_{\xi-1,\xi} & b_{\xi,\xi} \end{bmatrix}$$

$$C = \begin{bmatrix} c_{1,1} & & & & 0 \\ & c_{2,2} & & & \\ & & c_{3,3} & & \\ & & & \ddots & \\ 0 & & & & c_{\xi,\xi} \end{bmatrix}$$

$$U = \begin{bmatrix} u_{1,1} & & & & 0 \\ & u_{2,2} & & & \\ & & u_{3,3} & & \\ & & & \ddots & \\ 0 & & & & u_{\xi,\xi} \end{bmatrix}$$

$$L = \begin{bmatrix} l_{1,1} & & & & 0 \\ & l_{2,2} & & & \\ & & l_{3,3} & & \\ & & & \ddots & \\ 0 & & & & l_{\xi,\xi} \end{bmatrix}$$

where $\xi = NZ$

The solution and residual vectors are partitioned into subvectors:

$$X = \begin{bmatrix} X_1 \\ X_2 \\ X_3 \\ \cdot \\ \cdot \\ \cdot \\ X_{NXY} \end{bmatrix} \text{ where } X_i = \begin{bmatrix} x_1 \\ x_2 \\ x_3 \\ \cdot \\ \cdot \\ \cdot \\ x_{NZ} \end{bmatrix}, i = 1, NXY$$

$$R = \begin{bmatrix} R_1 \\ R_2 \\ R_3 \\ \cdot \\ \cdot \\ \cdot \\ R_{NXY} \end{bmatrix} \text{ and } R_i = \begin{bmatrix} r_1 \\ r_2 \\ r_3 \\ \cdot \\ \cdot \\ \cdot \\ r_{NZ} \end{bmatrix}, i = 1, NXY$$

The LSOR solution procedure should begin at some steady state initial condition. The first iteration progresses through the solution:

Step 1: Solve $$(B_1 C_1 0 \ldots 0 U_1) \cdot \begin{bmatrix} X_1^{j+1} \\ X_2^{j} \\ \cdot \\ \cdot \\ \cdot \\ X_{NX+1}^{j} \end{bmatrix} = R_1^{j}$$

$$\therefore X_1^{j+1} = B_1^{-1}[R_1 - C_1 X_2^{j} - U_1 X_{NX+1}^{j}]$$

Step 2: Solve the second set of equations $$(A_2 B_2 C_2 0 \ldots 0 U_2) \cdot \begin{bmatrix} X_1^{j+1} \\ X_2^{j+1} \\ X_3^{j} \\ \cdot \\ \cdot \\ \cdot \\ X_{NX+2}^{j} \end{bmatrix} = R_2^{j}$$

$$\therefore X_2^{j+1} = B_2^{-1}[R_2^{j} - A_2 X_1^{j+i} - C_2 X_3^{j} - U_2 X_{NX+2}^{j}]$$

Step 3: Once more $$(A_3 B_3 C_3 0 \ldots 0 U_3) \cdot \begin{bmatrix} X_2^{j+1} \\ X_3^{j+1} \\ X_4^{j} \\ \cdot \\ \cdot \\ \cdot \\ X_{NX+3}^{j} \end{bmatrix} = R_3^{j}$$

$$\therefore X_3^{j+1} = B_3^{-1}[R_3^{j} - A_3 X_2^{j+i} - C_3 X_4^{j} - U_3 X_{NX+3}^{j}]$$

Finally, progressing to the last column in the grid:

$$\therefore X_{NXY}^{j+1} = B_{NXY}^{-1}[R_{NXY}^{j} - A_{NXY} X_{NX \cdot Y-1}^{j+1} - L_{NXY} X_{NXY-(NX+1)}^{j+1}]$$

This constitutes one iteration of the LSOR procedure. The temperature matrix is corrected according to the $\delta T^{j+1}$'s, and the residuals are re-evaluated to get $R_i^{j+1}$, $i = 1, 2, \ldots, NXY$, and the iteration proceeds until sufficiently low residuals are attained according to the convergence criteria. The B's are tridiagonal matrices and are solved by Gaussian elimination wit the Thomas algorithm as shown in the subroutine THOMAS which will be identified below.

A theoretical choice of the relaxation factor can be made for very simple flow domains. However, for practical problems, this factor can be determined only by direct experimentation. The object is to choose a convergence limit, either a maximum tolerable residual ($-F^j$) or a minimum size correction of temperature $\delta T^{j+1}$, and then for various sizes of $\omega$ run the model to convergence. The best $\omega$ occurs when the minimum number of iterations is necessary for convergence.

Figure 11:
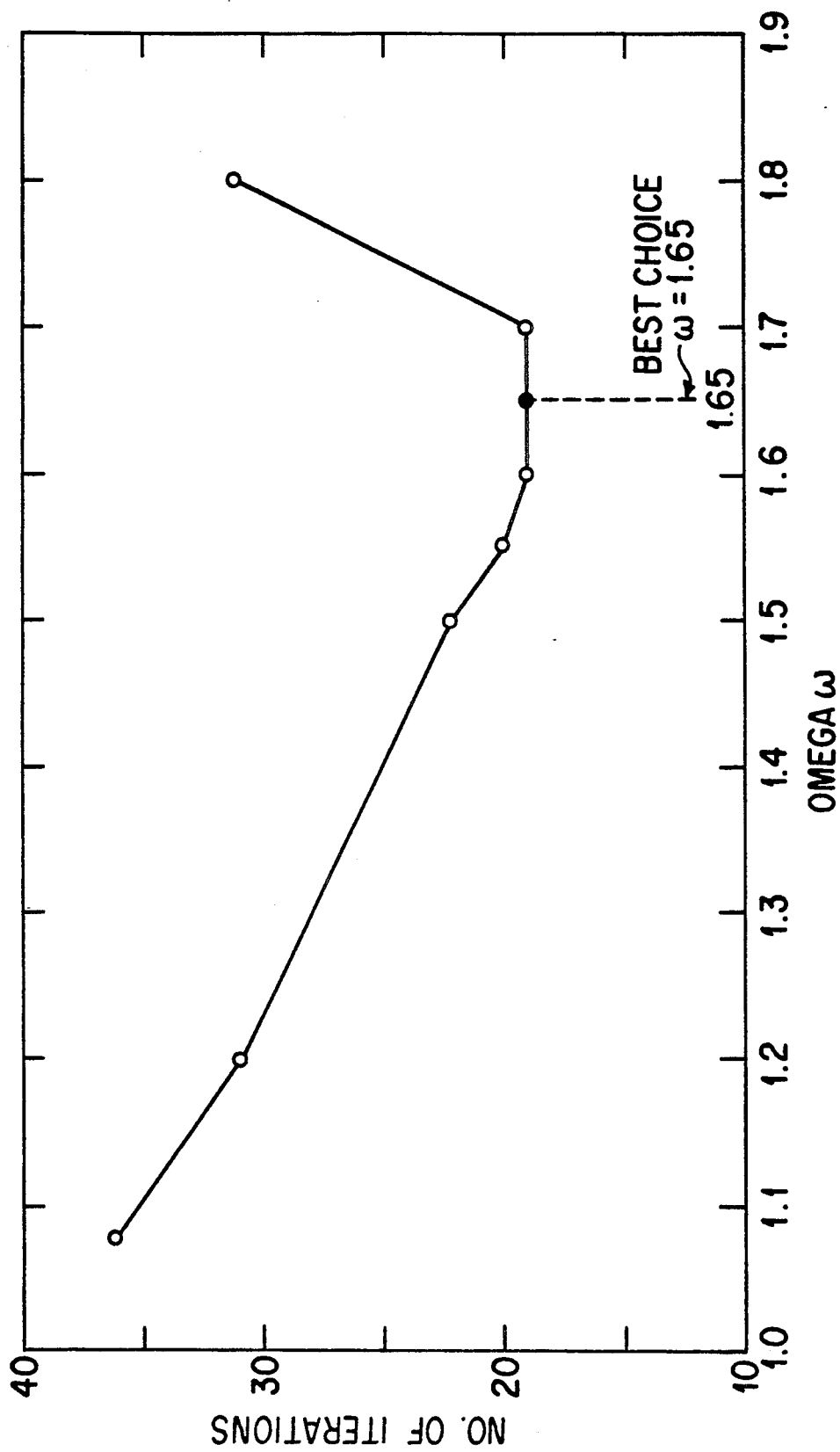
FIG. 11 is a schematic graph for the determination of best over relaxation factor omega ω for steady state (elliptic) case.
Figure 12:
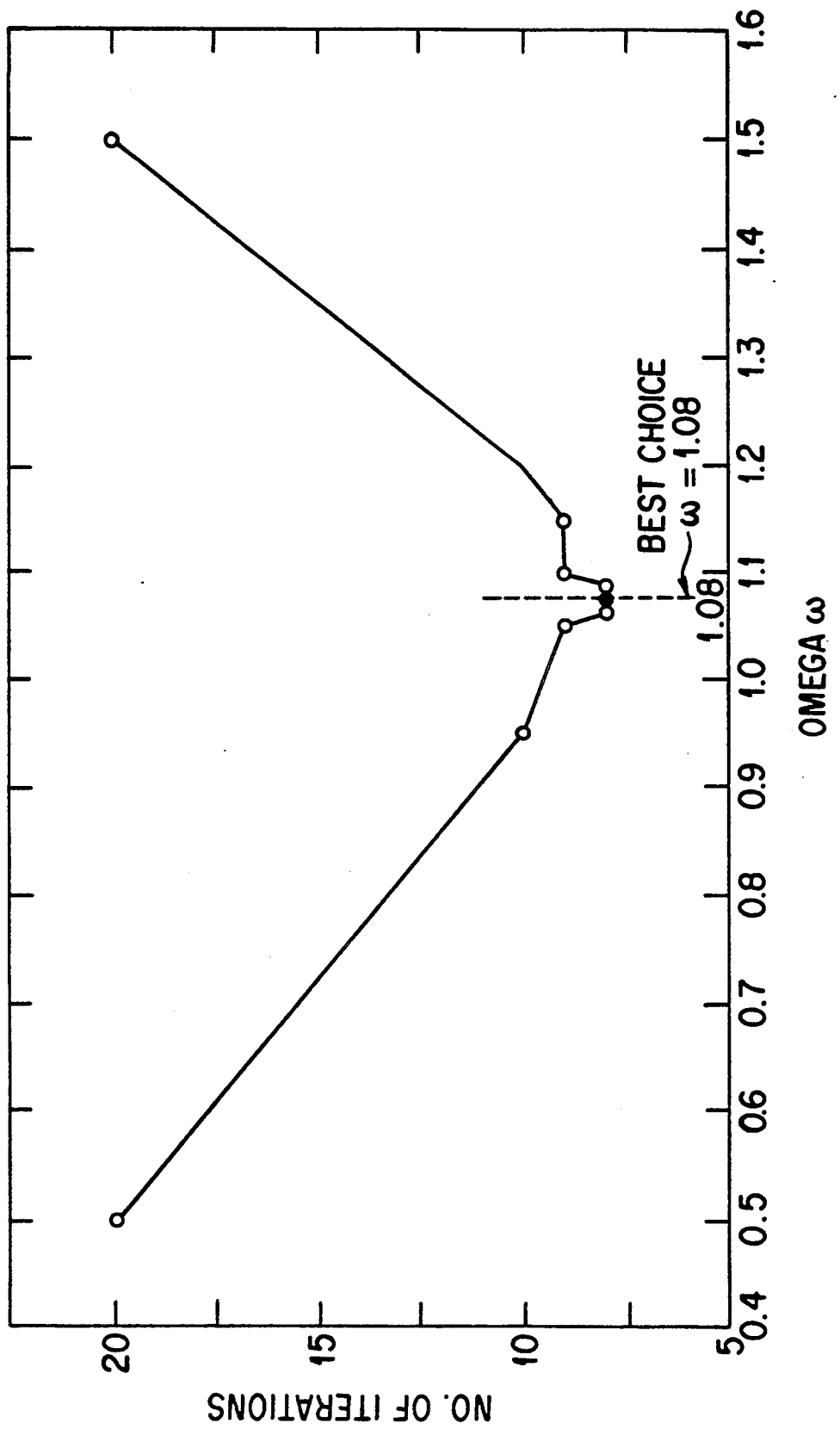
FIG. 12 is a schematic graph for the determination of best over relaxation factor omega ω for unsteady state (parabolic) case.

FIGS. 11 and 12 illustrate the direct experimentation for the data set forth in the example below for the elliptic and parabolic problems respectively. As best shown in FIG. 11, for the elliptic problem $\omega \approx 1.65$; and for the parabolic problem $\omega \approx 1.08$ (see FIG. 12).

Figure 13:
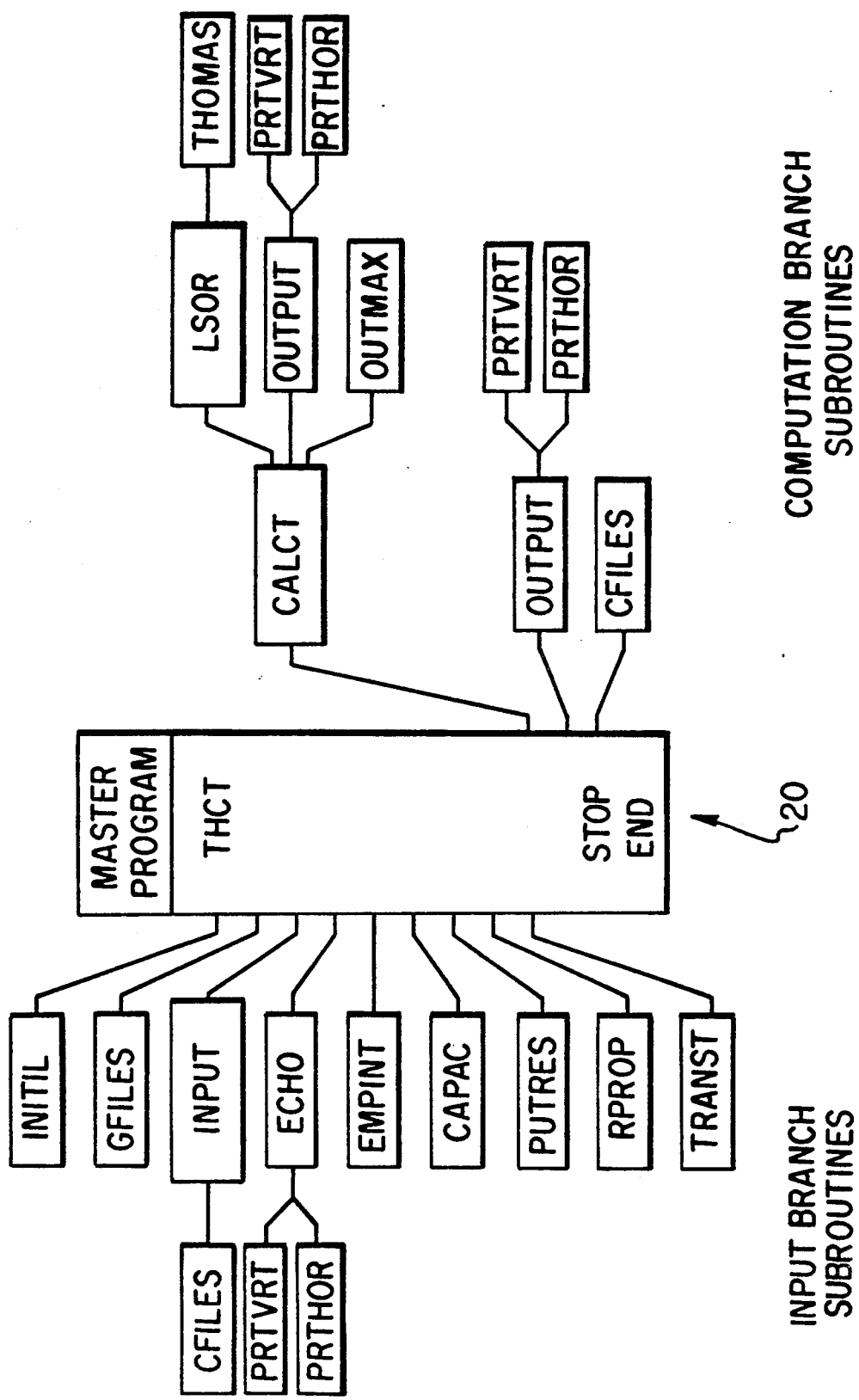
FIG. 13 is a schematic flow diagram of thermal model.

Referring in detail now to FIG. 13 and to FIGS. 20 to 32 which illustrates and depicts the computer schematic flow diagram for the thermal model employed in the present invention, there is seen the main or master program THCT which controls the entire computation, calling the appropriate subroutines and making logical decisions as needed. The calculation makes a normal termination in this program, and the final action is a call to subroutine CFILES where all open files are explicitly closed. The subroutines are as follows: CALCT; CAPAC; CFILES; ECHO; EMPRINT; GFILES; INITIL; INPUT; LSOR; OUTMAX; OUTPUT; PRTHOR; PRTVRT; PUTRES; RPROP; THOMAS; and TRANST. Subroutine CALT controls the iteration procedure through the LSOR algorithm. The logical check for convergence is made in this subroutine in the statement on line IMOP8700: IF (AMAXDT.LE.CONV) GO TO 500. AMAXDT is the maximum temperature change for this iteration, and CONV is the allowable tolerance established for this run. The program returns control to THCT at statement 500. At each iteration or sweep, the program writes the maximum temperature change and the location of the maximum MI, MJ and MK to the terminal and the output file (unit 16). An abnormal program termination occurs in this subroutine if the maximum number of sweeps is attempted (IMXSIVP) without convergence, and the appropriate message is recorded on the terminal and the output file. Subroutine CAPAC calculates the volume element CT(1) for each cell 12 of the grid, $$CT = \frac{\Delta X \Delta Y \Delta Z C_{eff}}{\Delta t}.$$

Subroutine CFILES closes all active files, i.e.
 CLOSE (15)
 CLOSE (16)
 CLOSE (17)
 CLOSE (18).
Subroutine ECHO outputs various input data arrays as follows:
 ALOCR (the array denoting the position of reservoir blocks);
 PHI (the porosity array);
 SO (oil saturation array);
 SW (water saturation array);

U (the conductivity array);
UINIT (the initial conductivity array);
CT (the heat capacity array);
T (the initial temperature array);
AKX (the x direction transmissibility array);
AKY (the y direction transmissibility array); and
AKZ (the z direction transmissibility array).

Subroutine EMPRINT calculates initial temperature and thermal conductivity arrays using formulae derived from the actual temperature gradient measurements in the field:

$$T = 10^{(A+BZ)}$$

$$U = T \log_{10} B$$

where A and B are derived from field measurements and are hard-coded into the program subroutine and Z is the depth to the center of the cell. Subroutine GFILES defines and opens required files for execution. Files required are 15, 16, 17 and 18. Subroutine INITIL zeroes out the common block areas at initialization. Subroutine INPUT is the main subroutine bringing in data for setting up a problem. If the product of NX, NY and NZ (NXYZ) is greater than the maximum array dimension, NDIM, the program aborts. The message "MAXIMUM NUMBER OF GRID BLOCKS EXCEEDED" is posted on the terminal and all active files formally closed by a call to CFILES. Subroutine LSOR is the subroutine which computes the coefficients for the 1SOR procedure. The coefficients are calculated for nine different options depending upon the position of the "line" (vertical column) that is currently being computed.

Figure 14:
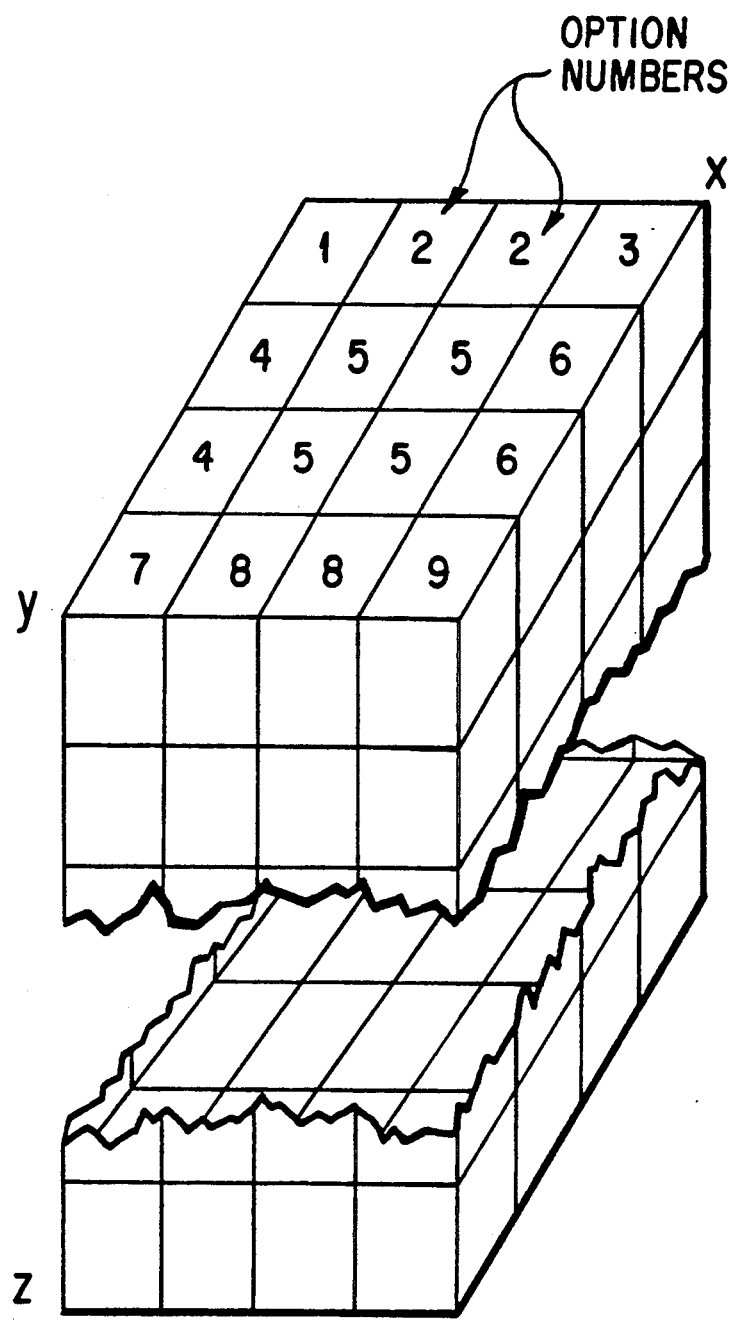
FIG. 14 is a three-dimensional grid showing column option numbers.

The options are best shown in FIG. 14. Each line or vertical column is updated independently using the most recent values of the surrounding temperatures in the coefficient calculation. Therefore, each columnar calculation is a one-dimensional formulation and generates a tridiagonal coefficient matrix. The Thomas algorithm which will be identified below is used for each line solution. As a sweep through the X-Y plane, column by column is completed, the maximum temperature change is searched for and returned as AMAXDT along with its location in the grid as MI, MJ and MK (see FIG. 14). This subroutine also calls subroutine THOMAS.

Subroutine OUTMAX outputs the maximum temperature change in the grid. The subroutine is called from CALCT with AMAXDT=DELTMX. The write statement is made to the terminal and to the output file 16 as follows:
WRITE (*, 6100) NSTEP, CUMTIM, DELTMX, MI, MJ, MK where NSTEP is the number of the time steps, where appropriate in the parabolic case;
CUMTIM is cumulative time for the parabolic case;
DELTMX is the maximum temperature change; and
MI, MJ, MK is the position vector of DELTMX.
Subroutine OUTPUT is normally called at the end of a calculation from the main program THCT or from the control subroutine CALCT when convergence is not reached after iterating IMXSWP, a maximum number of times. The output subroutine writes the arrays:
U, conductivity or TDIFF;
T, temperature at time step, NSTEP;
AKX, x direction transmissibility;
AKY, y direction transmissibility;
AKZ, z direction transmissibility; and
TDIFF, calculated minus normal temperature gradient.

Figure 15:
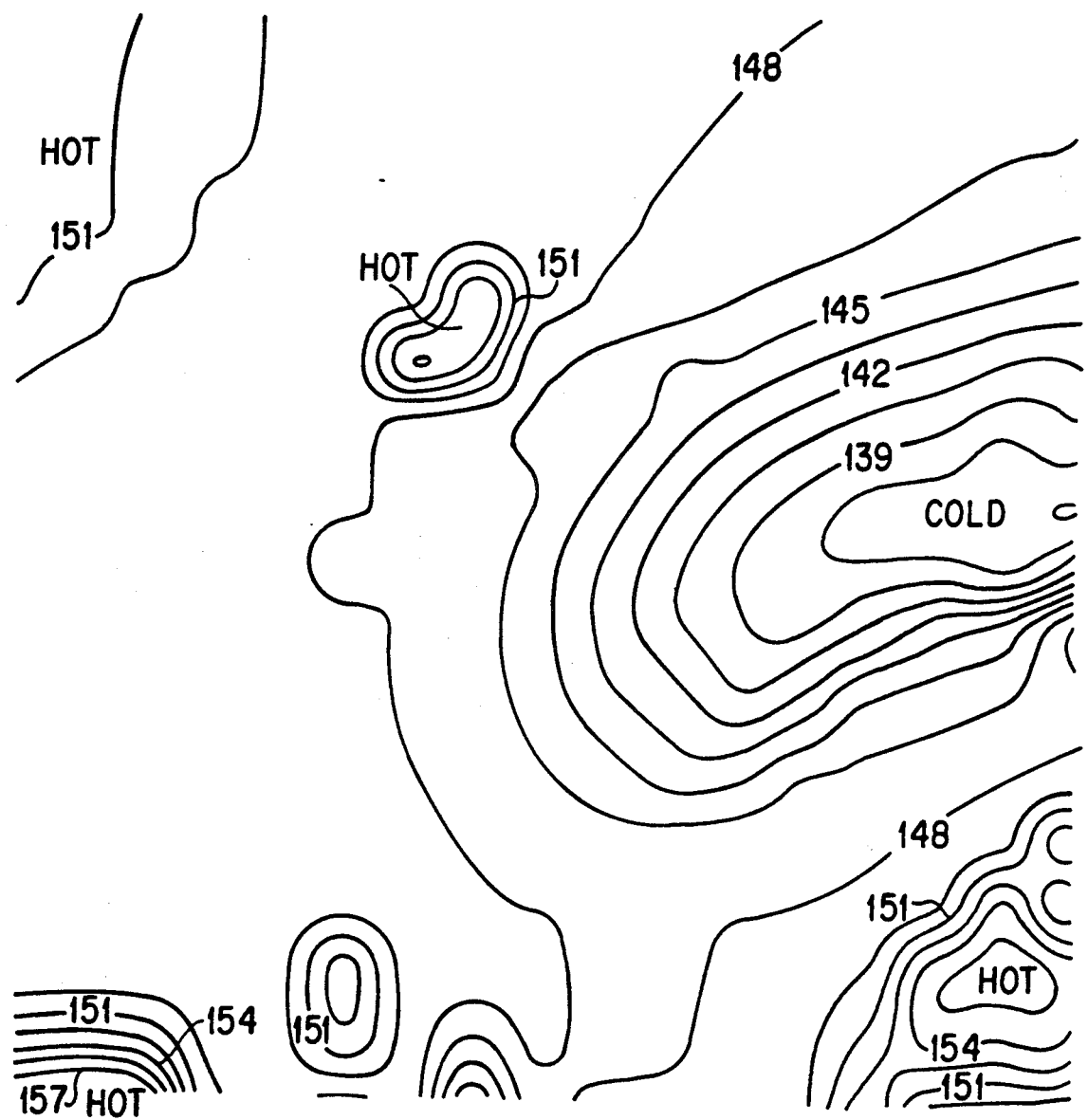
FIG. 15 is a temperature contour of Jackson County.

It should be noted that output also writes the temperature array T to unit 17 in a format suitable to be directly used by a post-processor contouring package (see FIG. 15 which is a contour of temperatures at 6000 feet of temperature distribution at 3,800,00 days). Subroutine PRTHOR is a general print subroutine that prints a three-dimensional matrix by horizontal planes; i.e. X, Y planes. It writes to file 16. Subroutine PRTVRT is a general print subroutine that prints a three-dimensional matrix by vertical planes; i.e. X, Z planes. It writes to file 16. Subroutine PUTRES modifies the original conductivity array by reducing the U array by division by 30, to simulate the insulating effect of hydrocarbons. The location of reservoirs is indicated by the array ALOCR (I). The logical statement below controls:

IF (ALOCR (I).EQ.1)U(I) = U(I)/30, i.e.,

IF ALOCR (I)=1, then a hydrocarbon reservoir exists. Subroutine RPROP computes the transmissibilities in the X, Y and Z directions. The transmissibilities are functions of the cell. For instance, for the X direction transmissibility AKX:

$$AKX(I) = \frac{(2*U(I + 1)*U(I))}{(U(I + 1) + U(I))} * \frac{(DELZ(I)*DELY(I))}{(.5*DELX(I + 1)*DELX(I))}$$

Note that AKX and AKY can be modified with the factor BETA.

However, usually BETA=1. Subroutine THOMAS is code for the Thomas algorithm. The algorithm is a direct method to solve a one-dimensional flow problem by a forward elimination transforming a tridiagonal matrix to upward triangular, followed by back substitution for the answers. Subroutine TRANST is called at the end of an iteration sequence after convergence has been attained. Its purpose is simply to transfer the iteration of temperature U(I) into array, T(I), i.e.:

$$T(I) = U^{I+1}(I), I=1, NXYZ$$

The structure of the batch data file for the thermal simulator of this invention is formatted data entries for each item of information, led by an alphanumeric title describing the values. Values are read from file 15, and the descriptive titles are read over with the dummy read statements, READ (15, 1000), where format 1000 is an A50 field. Vector and array data are read with three options depending upon the value assigned to the variable MINP and are defined as follows:
MINP=IMULT (numeric equivalent=0) means that a unique value of each element of the vector or array is supplied.
MINP=ISING (numeric equivalent=1) means that all elements of the vector or array are given a single specified value.
MINP=ICALC (numeric equivalent=2) means that the elements of the vector or array are computed.

An example of the data file with the appropriate read formats is shown on the following Table I:

TABLE I

| DATA ITEM/FORTRAN SYMBOL(S) | FORMAT |
|---|---|
| 1  ENTER GRID SIZE: X Y Z:/ | (A50) |
| NX NY NZ PROBLEM TITLE | (5I3, A40) |
| 2  ENTER TYPE OF DATA INPUT FOR GRID BLOCK SIZE:/ | (A50) |
| MINP' | (I5) |
| 3  ENTER X-DIRECTION GRIDBLOCK DIMENSION(S):/ | (A50) |
| DX(1) DX(2) DX(3) DX(4) DX(5) | (5F10.3) |
| 4  ENTER Y-DIRECTION GRIDBLOCK DIMENSION(S):/ | (A50) |
| DY(1) DY(2) DY(3) DY(4) DY(5) | (5F10.3) |
| 5  ENTER Z-DIRECTION GRIDBLOCK DIMENSION(S):/ | (A50) |
| DZ(1) DZ(2) DZ(3) DZ(4) DZ(5) | (5F10.3) |
| 6  ENTER TYPE OF DATA INPUT FOR POROSITY ARRAY:/ | (A50) |
| MINP | (I5) |
| 7  ENTER POROSITY ARRAY:/ | (A50) |
| PIIII OR PIII(I) | (5F6.3) |
| 8  ENTER TYPE OF DATA INPUT FOR OIL SATURATION:/ | (A50) |
| MINP | (I5) |
| 9  ENTER OIL SATURATION ARRAY:/ | (A50) |
| SOI OR SO(I) | (5F6.3) |
| 10  ENTER TYPE OF DATA INPUT FOR WATER SATURATION ARRAY:/ | (A50) |
| MINP | (I5) |
| 11  ENTER WATER SATURATION ARRAY:/ | (A50) |
| SWI OR SW(I) | (5F6.3) |
| 12  ENTER HEAT CAPACITIES: ROCK, OIL, WATER, GAS:/ | (A50) |
| CROCK, COIL, CWATER,,,,,CGAS | (8F6.3) |
| 13  ENTER TYPE OF DATA INPUT FOR CONDUCTIVITY ARRAY:/ | (A50) |
| MINP | (I5) |
| 14  ENTER CONDUCTIVITY ARRAY:/ | (A50) |
| UI OR U(I) | (5F6.3) |
| 15  ENTER SURFACE TEMPERATURE:/ | (A50) |
| TSURF | (F10.3) |
| 16  ENTER BOTTOM BOUNDARY TEMPERATURE:/ | (A50) |
| TDEEP | (F10.3) |
| 17  ENTER CONSTANT SURFACE FLUX VALUE:/ | (A50) |
| FLUX | (F10.3) |
| 18  ENTER INITIAL, MINIMUM, AND MAXIMUM TIMESTEP:/ | (A50) |
| DT DTMIN DTMAX | (5F10.3) |
| 19  ENTER DESIRED OUTPUT INCREMENT:/ | (A50) |
| MCOUNT | (5I6) |
| 20  ENTER MAXIMUM NUMBER OF TIMESTEPS ALLOWED:/ | (A50) |
| MSTEP | (5I6) |
| 21  ENTER DESIRED OUTPUT SECTIONS: 0 = VERTICAL, 1 = HORIZONTAL:/ | (A50) |
| OUT | (I5) |
| 22  ENTER DESIRED TIMESTEP INCREMENT FOR MODS:/ | (A50) |
| MKCNT | (5I6) |
| 23  ENTER KEY MATRIX ELEMENTS FOR MODIFICATIONS: 1-MODIFY:/ | (A50) |
| I J K IFLAG | (I3, 5X, I3, |
| (A data entry as above is required for each cell where a | (6X, . . .) |
| hydrocarbon zone is detected. At the end of this data | (I3, 5X, . . .) |
| sequence a 999 trailer record is inserted as below.) | |
| 999 | |
| 24  ENTER BETA FACTOR FOR KX AND KY MODIFICATIONS:/ | (A50) |
| BETA | (F10.3) |
| 25  ENTER OVER-RELAXATION FACTOR:/ | (A50) |
| OMEGA | (F10.3) |
| 26  ENTER PROBLEM TYPE: 0-ELLIPTIC, 1-PARABOLIC:/ | (A50) |
| CHOIC | (F10.3) |
| 27  ENTER CONVERGENCE CRITERIA:/ | (A50) |
| CONV | (F10.3) |
| 28  MAXIMUM NUMBER OF SWEEPS PER TIMESTEP:/ | (A50) |
| IMXSWP | (I5) |
| 29  ECHO OPTION - 1 FOR YES, 0 FOR NO:/ | (A50) |
| IECHO | (I5) |

Each data item from the above Table I may be defined according to the appropriate FORTRAN symbol(s) as follows:

DATA ITEM 1, NX, NY, NZ: The number of X,Y and Z direction nodes respectively. The number of nodes in a horizontal plane is:

$$NXY = NX*NY$$

These data items are read with the format 5I3, A40. In the A40 part of this format, a problem title can be inserted if desired.

DATA ITEM 2, MINP: Specifies the type of data that immediately follows:

MINP=0, (IMULT) is a unique data value for each element of the vector or array that follows.

MINP=1, (ISING) the entire vector or array will be set to a constant value.

MINP=2, (ICALC) means that values for the vector or array will be calculated. There is an MINP data entry before each vector or array data input. These data are entered numerically as 0, 1, 2, and a data statement in subroutine INPUT converts MINP into the alpha equivalent:

MINP=0 is set to IMULT in the data statement.

MINP=1 is set to ISING in the data statement.

MINP=2 is set to ICALC in the data statement.

DATA ITEM 3, DX(I): A vector representing the X direction cell sizes in feet. The vector length is NX.

DATA ITEM 4, DY(J): A vector of length NY representing the Y direction cell sizes in feet.

DATA ITEM 5, DZ(K): A vector of length NZ representing the Z direction cell sizes in feet.

DATA ITEM 6, MINP: Type of data for porosity array.

DATA ITEM 7, PHII or PHI(I): Porosity data, a fraction, entire array or single fixed value depending upon value of MINP.

DATA ITEM 8, MINP: Type of data for oil saturation array.

DATA ITEM 9, SOI or SO(I): Oil saturation data, a fraction, entire array or single fixed value depending upon MINP.

DATA ITEM 10, MINP: Type of data for water saturation array.

DATA ITEM 11, SWI or SWI(I): Water saturation data, a fraction. An array or a single value depending upon MINP.

DATA ITEM 12, CROCK, COIL CWATER, CGAS: Heat capacity data of rock, oil, water and gas in BTU/lb/°F. Four blank fields between CWATER and CGAS are required in the program version.

DATA ITEM 13, MINP: Type of data for conductivity array.

DATA ITEM 14, U1 or U(I): Conductivity data in BTU/°F./day.

DATA ITEM 15, TSURF: Temperature in °F. at first node in the Z direction (shallowest node grid).

DATA ITEM 16, TDEEP: Temperature in °F. of deep boundary of the grid. If conductivities are calculated, TDEEP is calculated.

DATA ITEM 17, FLUX: Heat flows out of the surface of the earth in BTU/ft$^2$/day.

DATA ITEM 18, DT, DTMIN, DTMAX: Initial, minimum, and maximum time step used in the calculation. In the program version DTMIN and DTMAX are not used, but are available for use. The program uses the initial time step DT, expressed in days.

DATA ITEM 19, MCOUNT: Time between outputs in days. Used only in the parabolic case.

DATA ITEM 20, MSTEP: Maximum number of time steps for the calculations.

DATA ITEM 21, OUT: This variable determines how three-dimensional data is printed out:

If OUT=0, arrays are output by vertical sections, i.e. X-Z planes, for Y=1,2,3 ... NY If OUT=1, arrays are printed out by horizontal planes, i.e. X-Y planes, X=1,2,3 ... NZ DATA ITEM 22, MKCNT: Desired time step increment for MODS; if not used, a blank field should be provided.

DATA ITEM 23, I, J, K, IFLAG: These designate locations in the three-dimensional grid where reservoirs are located. There is a line item entry for each cell treated as a hydrocarbon filled cell. A trailer record of 999 in the first three columns is necessary to signal the end of this data, i.e. set I=999.

DATA ITEM 24, BETA: This variable is used when modifying the horizontal transmissibilities, i.e. AKX and AKY. If no modification is wished, then BETA=1. The BETA factor was introduced for the purpose of handling heat flow in cases where the Peclet number is nonunity (Peclet number is the ratio of convective heat flow to conductive heat flow).

DATA ITEM 25, OMEGA: This the over-relaxation factor used in the LSOR algorithm. The data included preferably indicates that:

OMEGA=1.65 for the elliptic case and

OMEGA=1.08 for the parabolic case

DATA ITEM 26, CHOIC: This designates which differential equation is solved in this run:

If CHOIC=0, the steady state equation is solved elliptic case)

If CHOIC=1, the unsteady state equation is solved (Parabolic case)

DATA ITEM 27, CONV: This is the convergence criteria for the run(s) and is the maximum allowable temperature change between solution steps (should be on the order of $10^{-5}$).

DATA ITEM 28, IMXSWP: This is the maximum number of iterations allowed before aborting (should be on the order of 50 to 100 iterations).

DATA ITEM 29, IECHO: This option determines if input data to be echoed back out before the run commences:

If IECHO =0, no input is recorded

If IECHO=1, input data is recorded

After a hypothetical hydrocarbon reservoir 18 has been subsequently introduced or otherwise disposed in the geologic volume 10 and the heat flow equations (1) and (2) have been solved for x, y, z temperatures for each volumetric cell 12 at reestablished steady-state conditions, the x, y, z temperatures for each volumetric cell 12 having a certain i, j, k locator number are compared with the observed and/or measured temperature of the same each volumetric cell 12 having the same i, j, k locator number. The greater the number of observed and/or measured temperatures that are available, the more accurate the determination will be as to whether or not the hypothetical hydrocarbon reservoir 18 was disposed at a location were a true hydrocarbon reservoir exists. Preferably, at least one observed and/or measured temperature is available for at least one cell 12. Thus, by way of example only, if a cell 12 having an i, j, k locator number of 432 has an observed or measured temperature of 300° F. in a selective geologic volume or area and the same cell 12 with the same i, j, k locator number of 432 in the geologic volume 10 has a calculated steady state temperature of 400° F. after the hypothetical hydrocarbon reservoir 18 has been introduced into the geologic volume 10, the 100° F. temperature differential (i.e. 400° F.-300° F.) would indicate that the hypothetical hydrocarbon reservoir 18 was not positioned at a correct location in the geologic volume 10. Typically an acceptably margin of error is employed in the determination of whether or not any temperature differential is small enough to indicate a correctly disposed hypothetical hydrocarbon reservoir 18. The margin of error ($e_i$) would equal $T_{observed}-T_{calculated}$; and the closer that $$\sum_{i=1}^{N} (T_{obs} - calc)^2$$

(N is number of cells 12 with a $T_{obs}$ temperatures available) minimizes the least square error and approaches zero, the more accurate has been the disposition of the hypothetical hydrocarbon reservoir 18. The margin of error is detected by the user but is typically from about 0.5 to about 20 with a lower number being preferred.

Figure 33:
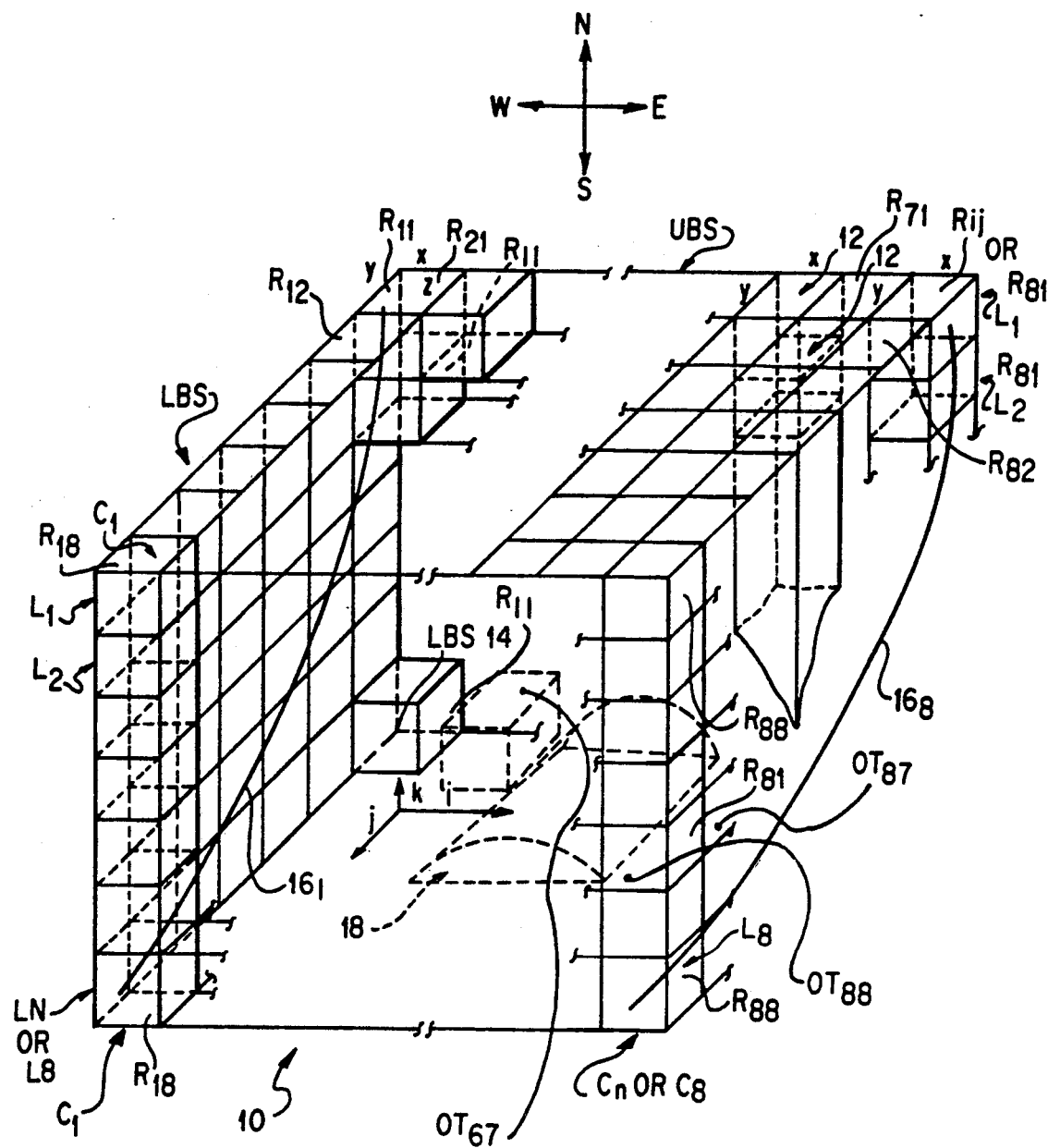
FIG. 33 is another perspective view of the geologic volume with an upper bounding surface and a left bounding surface.

As previously stated, the more observed temperatures available to the user the better any determination will be as to an accurate disposition of any hypothetical hydrocarbon reservoir 18. Ideally, it would be desirable to have a measured and/or observed temperature for each and every cell 12. If such temperatures were available, there would be no need for the present invention. Such temperature desirabilities are not the real world for obvious reasons (e.g. cost to obtain temperature information, etc.); and thus the goals or objects are to discover the correct location of a hydrocarbon reservoir with the minimum number of measured and/or observed temperatures. Preferably, there are enough observed and/or measured temperatures to generate one or more column measured temperature versus depth curve $16_n$ in accordance with the procedure previously mentioned where n equals the number of column. Thus, curve $16_1$ in FIG. 33 would represent the normal measured temperature vs. depth curve for all cells 12 in $C_1$ and curve $16_8$ would represent the normal measured temperature vs. depth curve for all cells 12 in $C_8$. Curves $16_{2\ through\ 7}$ may be constructed similarly. The computed steady state x, y, z temperature(s) for each volumetric cell 12 at a given depth or cell depth/layer in each column $C_n$ is compared with the observed temperature from the measured temperature vs. depth curve $16_n$ of each column $C_n$. If the temperature differentials between the computed steady state x, y, z temperature(s) for each volumetric cell 12 at a given depth or cell depth/layer in each column $C_n$ and the observed temperature(s) from the observed temperature vs. depth curve $16_n$ are within the temperature margin of error, there is a "good fit" and the hypothetical hydrocarbon reservoir 18 was positioned correctly. If the temperature differentials are outside the temperature margin of error, there is a "bad fit" and the hypothetical hydrocarbon reservoir 18 has to be repositioned.

In a more preferred embodiment of the present invention there are enough measured and/or observed temperatures in or available from the selected geologic volume such that an accurate, single normal observed/measured temperature vs. depth curve 16 could be constructed. The curve 16 would be accurate to the extent that any temperature for any cell depth taken from the curve 16 would the same temperature (or the same temperature within a least square margin of error) as the measured and/or observed temperature for any cell 12 at the same cell depth or layer. For purposes of further illustrating the present invention, it will be assumed that there are a sufficient number of measured and/or observed temperatures from the selected geologic volume to produce an accurate, single normal observed/measured temperature vs. depth curve 16. For this more preferred embodiment, the computed steady-state x, y, z temperatures for each volumetric cell 12 are compared with the normal temperature vs. depth curve 16 obtained from the selected geologic volume to determine if the hypothetical hydrocarbon reservoir 18 was disposed at the correct location and depth in the geologic volume 10. Such comparison may be done by comparing the computed x, y, z temperatures for each cell 12 at a particular depth (or cell layer $L_n$) with the observed or measured temperature at the same particular depth (or cell layer $L_n$) taken from the normal temperature vs. depth curve 16. If the comparison determines that a temperature differential between the computed x, y, z temperatures for each cell 12 at a particular depth and the observed temperature from the normal observed temperature vs. depth curve 16 at the same particular depth is small enough to be within a temperature margin of erro (e.g. 0.1 to 20 or higher), then the hypothetical hydrocarbon reservoir 18 was positioned at an accurate location. If the temperature differential falls outside the temperature margin of errror, the hypothetical hydrocarbon reservoir 18 has to be repositioned and the process repeated as many times as necessary until the temperature differential falls within a given temperature margin of error.

Such comparison may also be done in any other suitable manner such as by generating one or more temperature vs. cell depth curve(s), generally illustrated as 30 in FIG. 18, from th obtained x, y, z temperatures for each volumetric cell 12. If one temperature vs. cell depth curve (See 30a or 30d in FIG. 34) is generated, then each temperature employed is the average temperature of all of the cells 12 in a particular layer. The number of cell layers depends on the height of each cell 12 and the depth D of the geologic volume. If two or more temperature gradient vs. cell depth curves (see 30b and 30c in FIG. 34) are employed, then each temperature on a particular curve could represent the average temperature of part or some of the cells 12 in a particular layer, such as the average temperature for each row of cells 12 in a particular layer. Thus, in FIG. 8 there are five (5) rows of cells 12 in each layer, and five (5) temperature gradient vs. cell depth curves could be generated. Another manner of comparing x, y, z temperatures for each volumetric cell 12 with the normal temperature vs. depth curve 16 is by generating temperature contours for a given cell depth (i.e. for a given cell layer), with each temperature contour being conventionally known as an "isotherm". Thus, in FIG. 8, there are sixteen (16) cell layers and sixteen (16) temperature contours vs. depth could be generated with any particular isotherm representing the same temperature for the given cell depth or layer. FIG. 15 illustrates a temperature contour at 6,000 feet for the Example problem below with each isotherm representing the same temperature at 6,000 feet.

Regardless of the manner of making the comparison, if it is readily discernible that the x, y, z temperature(s) for each volumetric cell 12 at a given depth or cell depth/layer is essentially identical to the temperature on the normal observed/measured vs. depth curve 16 for the same given depth or cell depth/layer, then the hypothetical hydrocarbon reservoir 34 was initially situated at the correct location and depth in the geologic volume 10. Thus in FIG. 34, the temperature vs. cell depth curve 30d is essentially identical to the normal vs. depth curve 16, implying and/or representing that the hypothetical hydrocarbon reservoir 34 was initially disposed correctly. Further referencing FIG. 18, temperature gradient vs. cell depth curve 30a is skewed to the left of normal gradient vs. depth curve 16 reflecting that the hypothetical hydrocarbon reservoir 18 was initially disposed too deep within the geologic volume 10. In such a situation, the hypothetical hydrocarbon reservoir 18 is to be repositioned within the geologic volume 10 at a more shallow depth and the heat flow equations (1) and (2) are to be re-solved for x, y, z temperature for each volumetric cell 12 at reestablished steady-state conditions. The resulting and obtained x, y, z temperatures are subsequently compared with the normal temperature vs. depth curve 16 obtained from the selected geologic volume to determine if the hypothetical hydrocarbon reservoir 18 was redisposed at the correct location and depth within the geologic volume 10. Continuing to reference FIG. 34, the temperature gradient vs. cell depth curves 30b and 30c are skewed to the right of the normal vs. depth curve 16 reflecting that the hypothetical hydrocarbon reservoir 18 was initially disposed too shallow within the geologic volume 10. In such situations, the hypothetical hydrocarbon reservoir 18 is to be redisposed within the geologic volume 10 at a deeper depth and the heat flow equations (1) and (2) are to be solved again for x, y, z temperatures for each volumetric cell 12 at reestablished steady-state conditions. Subsequently, the resulting x, y, z temperatures solution(s) to the equations (1) and (2) for each volumetric cell 12 are compared with the normal temperature vs. depth curve 16 to determine if the hypothetical hydrocarbon reservoir 18 has properly situated within the geologic volume 10. The procedure(s) can be repeated as many times as necessary for one or more hypothetical hydrocarbon reservoir(s) 18 until it is determined that the one or more hypothetical hydrocarbon reservoir(s) 18 has or have been properly disposed within the geologic volume 10 to reflect that the modified geologic volume 10 (i.e. one containing one or more hypothetical hydrocarbon reservoir(s) 18) is a replica or duplicate of a selected geologic volume.

Temperature contour(s) for a given depth or cell depth/layer (such as the one illustrated in FIG. 15) can be employed to determine where the cold and hot spots are situated. An isotherm for a given depth possessing a larger temperature than the temperature from the normal gradient temperature vs depth curve 16 for the same given depth is a hot spot, reflecting perhaps the periphery of hydrocarbon reservoir or a hydrocarbon reservoir itself. Similarly, an isotherm for a given depth possessing a smaller temperature than the temperature from the normal gradient temperature vs depth curve 16 for the same given depth is a cold spot, reflecting perhaps a hydrocarbon reservoir or one immediately thereunder from the same given depth. Two or more temperature contour(s) for various depths or cell depth/layers can be utilized as necessary to determine and generate the cold and hot spots within the modified geologic volume 10 containing one or more hydrocarbon reservoir(s) 18.

The invention will be illustrated by the following set forth example which is given by way of illustration and not by any limitation. All parameters such as number of nodes or volumetric cells 12, temperatures, time(s), etc. submitted in this example are not to be construed to unduly limit the scope of the invention.

EXAMPLE

The selected geologic volume is the Lasso area in Jackson County, Tex. This selected area has numerous observed/measured bottom hole temperatures available at varous depths ranging from about 1,000 feet to about 20,000 feet. The bottom hole temperatures range from about 50° F. (for a depth of about 500 feet) to about 440° F. (for a depth of about 20,000 feet). The available bottom hole temperatures were plotted against depth; and a "best fit" polymonial normal observed temperature vs depth curve is found by any suitable means, such as the method of least squares. FIG. 6 is representative of the plotted points of bottom hole temperature (or observed temperature) vs depth with the "best fit" polymonial normal observed temperature vs depth curve extending through the plotted routes and being identified as "16". Alternatively, the formula $T=10^{(A+BZ)}$ is used to find the normal gradient temperature for the selected geologic volume with T equaling temperature in °F.; A equaling 1.75, B equaling $3.5 \times 10^{-5}$; and z being depth in feet to the center of any cell 12. The value for the constants A and B were derived from field measurements of the selected geologic volume in accordance with procedures well known to those posessing the ordinary skill in the art.

A thermal conductivity vs depth curve is developed for the selected geologic volume, preferably by dividing the normal gradient temperature by measured vertical heat flux [in BTU/(ft.$^2$ Day)] of the selected geologic volume which is measured at the selected geologic volume in accordance with procedure also well known to those possessing the ordinary skill in the art; or preferably by $U=T \log_{10}B$ where U equals heat flux in BTU/(ft$^2$Day), T is temperature in °F., and B is the same constant in the formula $T=10^{(A+BZ)}$ and equals $3.5 \times 10^{-5}$. The measured vertical heat flux for the selected geologic volume is 1.0 BTU/(ft$^2$ Day).

A homogeneous geologic volume 10 is selected, having the same approximate width, length and height as the selected geologic volume. The homogeneous geologic volume 10 is subdivided into 17,325 cells 12 with 21 cells 12 bordering the x-direction, 15 cells 12 bordering the y-direction, and 55 cells 12 bordering the z-direction. Thus N×YZ equals 21×15×55 or 17,325.

Each cell 12 receives an x,y,z dimension in feet from the user or operator of the process of the present invention. The dimensions may be any suitable dimensions and may be fixed in any particular direction (i.e. the x-direction, the y-direction, or the z-direction) or vary in the same particular direction. The x-direction dimension is assigned a value of 3960 feet for the first and last of the cells 12 bordering the x-direction and 1320 feet for the intermediate cells 12 bordering the x-direction. The y-direction dimension is also assigned a value of 3960 feet for the first and last of the cells 12 bordering the y-direction and 1320 feet for the intermediate cells 12 bordering the y-direction. The z-direction dimension is assigned a dimension in feet selected from the group values consisting of 20, 40, 50, 80, 90, 100, 130, 160, 200, 400, 800, 1000, 1100, 2000, 2400, 2900, and 6000. The z-direction location of these z-direction values is identified below in the Sample Date entry for the computer.

Geologic properties are assigned for each of the volumetric cells 12 in the homogeneous geologic volume 10. The geologic properties assigned are: porosity ($\phi$), rock heat capacity or $C_{rock}$), thermal conductivity (k), and water saturation ($S_w$), and water heat capacity ($C_{wtr}$). The values for each of these geologic properties are as follows: 20% for porosity; 36 BTU/(ft$^3$°F.) for rock heat capacity (Crock); 30% water saturation ($S_w$); 1.0 BTU/(ft$^3$ °F.) for water heat capacity ($C_{wtr}$); and a varying thermal conductivity (k) value for each volumetric cell 12 in the homogeneous geologic volume 10. Thermal conductivity (k) values for each cell 12 of the homogeneous geologic volume 10 will depend on the z-length of each of the volumetric cells 12 because the thermal conductivity (k) for each volumetric cell 12 is obtained from or at the depth of the midpoint of each cell 12. The temperature gradient for the homogeneous geologic volume 10 is preferably computed by the formula $T=10^{(A+BZ)}$ where measured constants A and B are derived from field measurements on the selected geologic volume in accordance with well known procedures and z is depth in feet to the cneter of a cell 12. The gradient thermal conductivities are preferably computed by the formula $U = T \log_{10} B$ where B is the same constant from the temperature formula $T = 10^{(A+BZ)}$. Alternately, thermal conductivities for the initially assumed homogeneous volume 10 are determined by dividing the temperature gradient from the formula $T = 10^{(A+BZ)}$ by the constant vertical heat flux [i.e. 1.0 BTU/(ft$^2$ Day)] for the selected geologic volume. The constants A and B are hard-coded into the computer program subroutine. Initially it is assumed that the initially assumed geologic volume 10 has no oil and/or gas; thus, no oil heat capacity ($C_{oil}$), no oil saturation ($S_o$), no gas heat capacity ($C_{gas}$), and no gas saturation ($S_g$) are assigned to the homogeneous geologic volume 10.

The volumetrically weighted effective cell heat capacity ($C_{eff}$) for the initally assumed homogeneous geologic volume 10 is equal to $[C_{rock}^{(1+\phi)} + C_{wtr} S_w]$.

A hypothetical hydrocarbon reservoir is now introduced into the initially assumed homogeneous geologic volume 10. This is accomplished by varying the geologic properties of any cells 12 (identified by i, j, k locator number) that would contain the hydrocarbon reservoir. Varying of the geologic properties of any such cells 12 can be done in any suitable manner such as by reducing and/or adding to the values of the geologic properties (e.g. $S_{wtr}$, $\phi$, etc.) initially assigned to the such any cells 12 that would contain the hydrocarbon reservoir and/or adding additional geologic properties (e.g. $S_o$, $S_g$, $C_{oil}$, $C_g$, etc.) to those geologic properties that were already initially assigned to the such any cells 12 that would contain the hydrocarbon reservoir. Thus, by way of example only, porosity and/or $S_w$ may be increased, decreased, or remained the same; and $C_{wtr}$ and/or Crock may also be increased, decreased, or remained the same. In this Example, the values for the initially assigned geologic properties are to remain unaltered and oil saturation ($S_o$) and oil heat capacity ($C_{oil}$) are added to those geologic properties that were already assigned to those cells 12 that would contain the hypothetical hydrocarbon reservoir. No gas saturation ($S_g$) and no gas heat capacity ($C_g$) will be added. Thus $C_{eff}$ would equal $[C_{rock}^{(1-\phi)} + C_{oil} S_o + C_{wtr} S_w]$.

Approximately 578 cells 12 are selected to have their geologic properties modified. These approximate 578 cells 12 are identified under entry 24 in the following SAMPLE DATA imput to the computer program with the first three numbers in each line under entry 24 being i, j, k locator numbers and identifying a cell 12 to be modified by the i,j,k locator number and the last number being 1 which instructs the computer to modify accorrdingly:

SAMPLE DATA

1. ENTER GRID SIZE: X Y Z
21 15 55
2. ENTER TYPE OF DATA INPUT FOR GRIDBLOCK SIZE: 0 OR 1
0
3. ENTER X-DIRECTION GRIDBLOCK DIMENSION(S):

| | | | | |
|---|---|---|---|---|
| 3960. | 1320. | 1320. | 1320. | 1320. |
| 1320. | 1320. | 1320. | 1320. | 1320. |
| 1320. | 1320. | 1320. | 1320. | 1320. |
| 1320. | 1320. | 1320. | 1320. | 1320. |
| 3960. | | | | |

4. ENTER Y-DIRECTION GRIDBLOCK DIMENSION(S):

| | | | | |
|---|---|---|---|---|
| 3960. | 1320. | 1320. | 1320. | 1320. |
| 1320. | 1320. | 1320. | 1320. | 1320. |
| 1320. | 1320. | 1320. | 3960. | 3960. |

5. ENTER Z-DIRECTION GRIDBLOCK DIMENSION(S):

| | | | | |
|---|---|---|---|---|
| 100. | 100. | 800. | 2900. | 1100. |
| 90. | 20. | 90. | 90. | 20. |
| 90. | 90. | 20. | 90. | 40. |
| 90. | 20. | 80. | 20. | 80. |
| 50. | 40. | 90. | 130. | 160. |
| 90. | 20. | 90. | 200. | 400. |
| 400. | 800. | 400. | 100. | 90. |
| 20. | 90. | 100. | 400. | 100. |
| 50. | 20. | 20. | 20. | 20. |
| 20. | 50. | 100. | 400. | 400. |
| 800. | 1000. | 2000. | 2400. | 6000. |

6. ENTER TYPE OF DATA INPUT FOR POROSITY ARRAY: 0 OR 1
1
7. ENTER POROSITY ARRAY:
.200
8. ENTER TYPE OF DATA INPUT FOR OIL SATURATION ARRAY: 0 OR 1
1
9. ENTER OIL SATURATION ARRAY:
.7
10. ENTER TYPE OF DATA INPUT FOR WATER SATURATION ARRAY: 0 OR 1
1
11. ENTER WATER SATURATION ARRAY:
.3
12. ENTER HEAT CAPACITIES: ROCK, OIL, WATER
36.0 30.0 1.0
13. ENTER TYPE OF DATA INPUT FOR CONDUCTIVITY ARRAY: 0 OR 1
1
15. ENTER SURFACE TEMPERATURE:
−4.
16 A. ENTER BOTTOM BOUNDARY TEMPERATURE(S):
838.90
17. ENTER CONSTANT SURFACE FLUX VALUE:
1.0

-continued

18. ENTER INITIAL, MINIMUM, AND MAXIMUM TIMESTEP SIZES:
100000. 10. 75.
19. ENTER DESIRED OUTPUT INCREMENT
38
20. ENTER MAXIMUM NUMBER OF TIMESTEPS ALLOWED:
38
21. ENTER DESIRED OUTPUT SECTIONS: 0 = VERTICAL, 1 = HORIZONIAL, 2 = BOTH
0
22. ENTER DESIRED TIMESTEP INCREMENT FOR CONDUCTIVITY MODIFICATIONS:
20
24. ENTER KEY MATRIX ELEMENTS FOR MODIFICATIONS: 1 = MODIFY

| | | | |
|---|---|---|---|
| 16 | 5 | 7 | 1 |
| 17 | 5 | 7 | 1 |
| 16 | 6 | 7 | 1 |
| 17 | 8 | 10 | 1 |
| 18 | 8 | 10 | 1 |
| 16 | 9 | 10 | 1 |
| 17 | 9 | 10 | 1 |
| 5 | 14 | 13 | 1 |
| 13 | 15 | 13 | 1 |
| 14 | 14 | 13 | 1 |
| 15 | 14 | 13 | 1 |
| 16 | 14 | 13 | 1 |
| 17 | 13 | 13 | 1 |
| 18 | 13 | 13 | 1 |
| 2 | 1 | 22 | 1 |
| 3 | 1 | 22 | 1 |
| 1 | 1 | 22 | 1 |
| 1 | 2 | 22 | 1 |
| 2 | 2 | 22 | 1 |
| 3 | 2 | 22 | 1 |
| 1 | 3 | 22 | 1 |
| 2 | 3 | 22 | 1 |
| 1 | 4 | 22 | 1 |
| 7 | 4 | 17 | 1 |
| 6 | 5 | 17 | 1 |
| 7 | 5 | 17 | 1 |
| 17 | 5 | 17 | 1 |
| 18 | 5 | 17 | 1 |
| 15 | 13 | 17 | 1 |
| 16 | 12 | 17 | 1 |
| 1 | 15 | 19 | 1 |
| 2 | 15 | 19 | 1 |
| 3 | 15 | 19 | 1 |
| 4 | 15 | 19 | 1 |
| 5 | 15 | 19 | 1 |
| 6 | 15 | 19 | 1 |
| 7 | 5 | 22 | 1 |
| 8 | 5 | 22 | 1 |
| 9 | 5 | 22 | 1 |
| 10 | 5 | 22 | 1 |
| 6 | 6 | 22 | 1 |
| 7 | 6 | 22 | 1 |
| 8 | 6 | 22 | 1 |
| 6 | 7 | 22 | 1 |
| 5 | 8 | 22 | 1 |
| 19 | 5 | 22 | 1 |
| 12 | 9 | 22 | 1 |
| 13 | 9 | 22 | 1 |
| 12 | 10 | 22 | 1 |
| 11 | 10 | 22 | 1 |
| 11 | 11 | 22 | 1 |
| 10 | 11 | 22 | 1 |
| 17 | 14 | 22 | 1 |
| 9 | 14 | 22 | 1 |
| 10 | 14 | 22 | 1 |
| 3 | 15 | 22 | 1 |
| 4 | 15 | 22 | 1 |
| 5 | 15 | 22 | 1 |
| 18 | 6 | 27 | 1 |
| 19 | 6 | 27 | 1 |
| 16 | 7 | 27 | 1 |
| 17 | 7 | 27 | 1 |
| 15 | 8 | 27 | 1 |
| 16 | 8 | 27 | 1 |
| 3 | 15 | 27 | 1 |
| 4 | 15 | 27 | 1 |
| 5 | 15 | 27 | 1 |
| 6 | 15 | 27 | 1 |
| 7 | 15 | 27 | 1 |
| 1 | 2 | 36 | 1 |
| 2 | 1 | 36 | 1 |

-continued

| | | | |
|---|---|---|---|
| 1 | 4 | 36 | 1 |
| 16 | 4 | 36 | 1 |
| 16 | 4 | 37 | 1 |
| 16 | 4 | 38 | 1 |
| 16 | 4 | 39 | 1 |
| 16 | 4 | 40 | 1 |
| 16 | 4 | 41 | 1 |
| 16 | 4 | 42 | 1 |
| 16 | 4 | 43 | 1 |
| 16 | 4 | 44 | 1 |
| 16 | 4 | 45 | 1 |
| 16 | 4 | 46 | 1 |
| 17 | 4 | 36 | 1 |
| 17 | 4 | 37 | 1 |
| 17 | 4 | 38 | 1 |
| 17 | 4 | 39 | 1 |
| 17 | 4 | 40 | 1 |
| 17 | 4 | 41 | 1 |
| 17 | 4 | 42 | 1 |
| 17 | 4 | 43 | 1 |
| 17 | 4 | 44 | 1 |
| 17 | 4 | 45 | 1 |
| 17 | 4 | 46 | 1 |
| 18 | 4 | 36 | 1 |
| 18 | 4 | 37 | 1 |
| 18 | 4 | 38 | 1 |
| 18 | 4 | 39 | 1 |
| 18 | 4 | 40 | 1 |
| 18 | 4 | 41 | 1 |
| 18 | 4 | 42 | 1 |
| 18 | 4 | 43 | 1 |
| 18 | 4 | 44 | 1 |
| 18 | 4 | 45 | 1 |
| 18 | 4 | 46 | 1 |
| 15 | 5 | 36 | 1 |
| 15 | 5 | 37 | 1 |
| 15 | 5 | 38 | 1 |
| 15 | 5 | 39 | 1 |
| 15 | 5 | 40 | 1 |
| 15 | 5 | 41 | 1 |
| 15 | 5 | 42 | 1 |
| 15 | 5 | 43 | 1 |
| 15 | 5 | 44 | 1 |
| 15 | | 45 | 1 |
| 15 | 5 | 46 | 1 |
| 16 | 5 | 36 | 1 |
| 16 | 5 | 37 | 1 |
| 16 | 5 | 38 | 1 |
| 16 | 5 | 39 | 1 |
| 16 | 5 | 40 | 1 |
| 16 | 5 | 42 | 1 |
| 16 | 5 | 41 | 1 |
| 16 | 5 | 42 | 1 |
| 16 | 5 | 43 | 1 |
| 16 | 5 | 44 | 1 |
| 16 | 5 | 45 | 1 |
| 16 | 5 | 46 | 1 |
| 17 | 5 | 36 | 1 |
| 17 | 5 | 37 | 1 |
| 17 | 5 | 38 | 1 |
| 17 | 5 | 39 | 1 |
| 17 | 5 | 40 | 1 |
| 17 | 5 | 41 | 1 |
| 17 | 5 | 42 | 1 |
| 17 | 5 | 43 | 1 |
| 17 | 5 | 44 | 1 |
| 17 | 5 | 45 | 1 |
| 17 | 5 | 46 | 1 |
| 18 | 5 | 36 | 1 |
| 18 | 5 | 37 | 1 |
| 18 | 5 | 38 | 1 |
| 18 | 5 | 39 | 1 |
| 18 | 5 | 40 | 1 |
| 18 | 5 | 41 | 1 |
| 18 | 5 | 42 | 1 |
| 18 | 5 | 43 | 1 |
| 18 | 5 | 44 | 1 |
| 18 | 5 | 45 | 1 |
| 18 | 5 | 46 | 1 |
| 19 | 5 | 36 | 1 |
| 19 | 5 | 37 | 1 |
| 19 | 5 | 38 | 1 |

-continued

| | | | |
|---|---|---|---|
| 19 | 5 | 39 | 1 |
| 19 | 5 | 40 | 1 |
| 19 | 5 | 41 | 1 |
| 19 | 5 | 42 | 1 |
| 19 | 5 | 43 | 1 |
| 19 | 5 | 44 | 1 |
| 19 | 5 | 45 | 1 |
| 19 | 5 | 46 | 1 |
| 13 | 5 | 36 | 1 |
| 13 | 5 | 37 | 1 |
| 13 | 5 | 38 | 1 |
| 13 | 5 | 39 | 1 |
| 13 | 5 | 40 | 1 |
| 13 | 5 | 41 | 1 |
| 13 | 5 | 42 | 1 |
| 13 | 5 | 43 | 1 |
| 13 | 5 | 44 | 1 |
| 13 | 5 | 45 | 1 |
| 13 | 5 | 46 | 1 |
| 11 | 6 | 36 | 1 |
| 11 | 6 | 37 | 1 |
| 11 | 6 | 38 | 1 |
| 11 | 6 | 39 | 1 |
| 11 | 6 | 40 | 1 |
| 11 | 6 | 41 | 1 |
| 11 | 6 | 42 | 1 |
| 11 | 6 | 43 | 1 |
| 11 | 6 | 44 | 1 |
| 11 | 6 | 45 | 1 |
| 11 | 6 | 46 | 1 |
| 12 | 6 | 36 | 1 |
| 12 | 6 | 37 | 1 |
| 12 | 6 | 38 | 1 |
| 12 | 6 | 39 | 1 |
| 12 | 6 | 40 | 1 |
| 12 | 6 | 41 | 1 |
| 12 | 6 | 42 | 1 |
| 12 | 6 | 43 | 1 |
| 12 | 6 | 44 | 1 |
| 12 | 6 | 45 | 1 |
| 12 | 6 | 46 | 1 |
| 13 | 6 | 36 | 1 |
| 13 | 6 | 37 | 1 |
| 13 | 6 | 38 | 1 |
| 13 | 6 | 39 | 1 |
| 13 | 6 | 40 | 1 |
| 13 | 6 | 41 | 1 |
| 13 | 6 | 42 | 1 |
| 13 | 6 | 43 | 1 |
| 13 | 6 | 44 | 1 |
| 13 | 6 | 45 | 1 |
| 13 | 6 | 46 | 1 |
| 15 | 6 | 32 | 1 |
| 15 | 6 | 33 | 1 |
| 15 | 6 | 34 | 1 |
| 15 | 6 | 34 | 1 |
| 15 | 6 | 35 | 1 |
| 15 | 6 | 36 | 1 |
| 15 | 6 | 37 | 1 |
| 15 | 6 | 38 | 1 |
| 15 | 6 | 39 | 1 |
| 15 | 6 | 40 | 1 |
| 15 | 6 | 41 | 1 |
| 15 | 6 | 42 | 1 |
| 15 | 6 | 43 | 1 |
| 15 | 6 | 44 | 1 |
| 15 | 6 | 45 | 1 |
| 15 | 6 | 46 | 1 |
| 16 | 6 | 32 | 1 |
| 16 | 6 | 33 | 1 |
| 16 | 6 | 34 | 1 |
| 16 | 6 | 35 | 1 |
| 16 | 6 | 36 | 1 |
| 16 | 6 | 37 | 1 |
| 16 | 6 | 38 | 1 |
| 16 | 6 | 39 | 1 |
| 16 | 6 | 40 | 1 |
| 16 | 6 | 41 | 1 |
| 16 | 6 | 42 | 1 |
| 16 | 6 | 43 | 1 |
| 16 | 6 | 44 | 1 |
| 16 | 6 | 45 | 1 |

-continued

| | | | |
|---|---|---|---|
| 16 | 6 | 46 | 1 |
| 17 | 6 | 32 | 1 |
| 17 | 6 | 33 | 1 |
| 17 | 6 | 34 | 1 |
| 17 | 6 | 35 | 1 |
| 17 | 6 | 36 | 1 |
| 17 | 6 | 37 | 1 |
| 17 | 6 | 38 | 1 |
| 17 | 6 | 39 | 1 |
| 17 | 6 | 40 | 1 |
| 18 | 6 | 41 | 1 |
| 17 | 6 | 42 | 1 |
| 17 | 6 | 43 | 1 |
| 17 | 6 | 44 | 1 |
| 17 | 6 | 45 | 1 |
| 17 | 6 | 46 | 1 |
| 18 | 6 | 32 | 1 |
| 18 | 6 | 33 | 1 |
| 18 | 6 | 34 | 1 |
| 18 | 6 | 35 | 1 |
| 18 | 6 | 36 | 1 |
| 18 | 6 | 37 | 1 |
| 18 | 6 | 38 | 1 |
| 18 | 6 | 39 | 1 |
| 18 | 6 | 40 | 1 |
| 18 | 6 | 41 | 1 |
| 18 | 6 | 42 | 1 |
| 18 | 6 | 43 | 1 |
| 18 | 6 | 44 | 1 |
| 18 | 6 | 45 | 1 |
| 18 | 6 | 46 | 1 |
| 10 | 7 | 36 | 1 |
| 10 | 7 | 37 | 1 |
| 10 | 7 | 38 | 1 |
| 10 | 7 | 39 | 1 |
| 10 | 7 | 40 | 1 |
| 10 | 7 | 41 | 1 |
| 10 | 7 | 42 | 1 |
| 10 | 7 | 43 | 1 |
| 10 | 7 | 44 | 1 |
| 10 | 7 | 45 | 1 |
| 10 | 7 | 46 | 1 |
| 11 | 7 | 36 | 1 |
| 11 | 7 | 37 | 1 |
| 11 | 7 | 38 | 1 |
| 11 | 7 | 39 | 1 |
| 11 | 7 | 40 | 1 |
| 11 | 7 | 41 | 1 |
| 11 | 7 | 42 | 1 |
| 11 | 7 | 43 | 1 |
| 11 | 7 | 44 | 1 |
| 11 | 7 | 45 | 1 |
| 11 | 7 | 46 | 1 |
| 12 | 7 | 36 | 1 |
| 12 | 7 | 37 | 1 |
| 12 | 7 | 38 | 1 |
| 12 | 7 | 39 | 1 |
| 12 | 7 | 40 | 1 |
| 12 | 7 | 41 | 1 |
| 12 | 7 | 42 | 1 |
| 12 | 7 | 43 | 1 |
| 12 | 7 | 44 | 1 |
| 12 | 7 | 45 | 1 |
| 12 | 7 | 46 | 1 |
| 13 | 7 | 32 | 1 |
| 13 | 7 | 33 | 1 |
| 13 | 7 | 34 | 1 |
| 13 | 7 | 35 | 1 |
| 13 | 7 | 36 | 1 |
| 13 | 7 | 37 | 1 |
| 13 | 7 | 38 | 1 |
| 13 | 7 | 39 | 1 |
| 13 | 7 | 40 | 1 |
| 13 | 7 | 41 | 1 |
| 13 | 7 | 42 | 1 |
| 13 | 7 | 43 | 1 |
| 13 | 7 | 44 | 1 |
| 13 | 7 | 45 | 1 |
| 13 | 7 | 46 | 1 |
| 14 | 7 | 32 | 1 |
| 14 | 7 | 33 | 1 |
| 14 | 7 | 34 | 1 |

| | | | |
|---|---|---|---|
| 14 | 7 | 35 | 1 |
| 14 | 7 | 36 | 1 |
| 14 | 7 | 37 | 1 |
| 14 | 7 | 38 | 1 |
| 14 | 7 | 39 | 1 |
| 14 | 7 | 40 | 1 |
| 14 | 7 | 41 | 1 |
| 14 | 7 | 42 | 1 |
| 14 | 7 | 43 | 1 |
| 14 | 7 | 44 | 1 |
| 14 | 7 | 45 | 1 |
| 14 | 7 | 46 | 1 |
| 15 | 7 | 32 | 1 |
| 15 | 7 | 33 | 1 |
| 15 | 7 | 34 | 1 |
| 15 | 7 | 35 | 1 |
| 15 | 7 | 36 | 1 |
| 15 | 7 | 37 | 1 |
| 15 | 7 | 38 | 1 |
| 15 | 7 | 39 | 1 |
| 15 | 7 | 40 | 1 |
| 15 | 7 | 41 | 1 |
| 15 | 7 | 42 | 1 |
| 15 | 7 | 43 | 1 |
| 15 | 7 | 44 | 1 |
| 15 | 7 | 45 | 1 |
| 15 | 7 | 46 | 1 |
| 16 | 7 | 32 | 1 |
| 16 | 7 | 33 | 1 |
| 16 | 7 | 34 | 1 |
| 16 | 7 | 35 | 1 |
| 16 | 7 | 36 | 1 |
| 16 | 7 | 37 | 1 |
| 16 | 7 | 38 | 1 |
| 16 | 7 | 39 | 1 |
| 16 | 7 | 40 | 1 |
| 17 | 7 | 41 | 1 |
| 17 | 7 | 42 | 1 |
| 16 | 7 | 43 | 1 |
| 16 | 7 | 44 | 1 |
| 16 | 7 | 45 | 1 |
| 16 | 7 | 46 | 1 |
| 17 | 7 | 32 | 1 |
| 17 | 7 | 33 | 1 |
| 17 | 7 | 34 | 1 |
| 17 | 7 | 35 | 1 |
| 17 | 7 | 36 | 1 |
| 17 | 7 | 37 | 1 |
| 17 | 7 | 38 | 1 |
| 17 | 7 | 39 | 1 |
| 17 | 7 | 40 | 1 |
| 17 | 7 | 41 | 1 |
| 17 | 7 | 42 | 1 |
| 17 | 7 | 43 | 1 |
| 17 | 7 | 44 | 1 |
| 17 | 7 | 45 | 1 |
| 17 | 7 | 46 | 1 |
| 9 | 8 | 36 | 1 |
| 9 | 8 | 37 | 1 |
| 9 | 8 | 38 | 1 |
| 9 | 8 | 39 | 1 |
| 9 | 8 | 40 | 1 |
| 9 | 8 | 41 | 1 |
| 9 | 8 | 42 | 1 |
| 9 | 8 | 43 | 1 |
| 9 | 8 | 44 | 1 |
| 9 | 8 | 45 | 1 |
| 9 | 8 | 46 | 1 |
| 10 | 8 | 36 | 1 |
| 10 | 8 | 37 | 1 |
| 10 | 8 | 38 | 1 |
| 10 | 8 | 39 | 1 |
| 10 | 8 | 40 | 1 |
| 10 | 8 | 41 | 1 |
| 10 | 8 | 42 | 1 |
| 10 | 8 | 43 | 1 |
| 10 | 8 | 44 | 1 |
| 10 | 8 | 45 | 1 |
| 10 | 8 | 46 | 1 |
| 11 | 8 | 36 | 1 |
| 11 | 8 | 37 | 1 |
| 11 | 8 | 38 | 1 |

-continued

| | | | |
|---|---|---|---|
| 11 | 8 | 39 | 1 |
| 11 | 8 | 40 | 1 |
| 11 | 8 | 41 | 1 |
| 11 | 8 | 42 | 1 |
| 11 | 8 | 43 | 1 |
| 11 | 8 | 44 | 1 |
| 11 | 8 | 45 | 1 |
| 11 | 8 | 46 | 1 |
| 12 | 8 | 32 | 1 |
| 12 | 8 | 33 | 1 |
| 12 | 8 | 34 | 1 |
| 12 | 8 | 35 | 1 |
| 12 | 8 | 36 | 1 |
| 12 | 8 | 37 | 1 |
| 12 | 8 | 38 | 1 |
| 12 | 8 | 39 | 1 |
| 12 | 8 | 40 | 1 |
| 12 | 8 | 41 | 1 |
| 12 | 8 | 42 | 1 |
| 12 | 8 | 43 | 1 |
| 12 | 8 | 44 | 1 |
| 12 | 8 | 45 | 1 |
| 13 | 8 | 46 | 1 |
| 13 | 8 | 32 | 1 |
| 13 | 8 | 33 | 1 |
| 13 | 8 | 34 | 1 |
| 13 | 8 | 35 | 1 |
| 13 | 8 | 36 | 1 |
| 13 | 8 | 37 | 1 |
| 13 | 8 | 38 | 1 |
| 13 | 8 | 39 | 1 |
| 13 | 8 | 40 | 1 |
| 13 | 8 | 41 | 1 |
| 13 | 8 | 42 | 1 |
| 13 | 8 | 43 | 1 |
| 13 | 8 | 44 | 1 |
| 13 | 8 | 45 | 1 |
| 13 | 8 | 46 | 1 |
| 14 | 8 | 32 | 1 |
| 14 | 8 | 33 | 1 |
| 14 | 8 | 34 | 1 |
| 14 | 8 | 35 | 1 |
| 14 | 8 | 36 | 1 |
| 14 | 8 | 37 | 1 |
| 14 | 8 | 38 | 1 |
| 14 | 8 | 39 | 1 |
| 14 | 8 | 40 | 1 |
| 14 | 8 | 41 | 1 |
| 14 | 8 | 42 | 1 |
| 14 | 8 | 43 | 1 |
| 14 | 8 | 44 | 1 |
| 14 | 8 | 45 | 1 |
| 14 | 8 | 46 | 1 |
| 15 | 8 | 32 | 1 |
| 15 | 8 | 33 | 1 |
| 15 | 8 | 34 | 1 |
| 15 | 8 | 35 | 1 |
| 15 | 8 | 36 | 1 |
| 15 | 8 | 37 | 1 |
| 15 | 8 | 38 | 1 |
| 15 | 8 | 39 | 1 |
| 15 | 8 | 40 | 1 |
| 15 | 8 | 41 | 1 |
| 15 | 8 | 42 | 1 |
| 15 | 8 | 43 | 1 |
| 15 | 8 | 44 | 1 |
| 15 | 8 | 45 | 1 |
| 15 | 8 | 46 | 1 |
| 9 | 9 | 36 | 1 |
| 9 | 9 | 37 | 1 |
| 9 | 9 | 38 | 1 |
| 9 | 9 | 39 | 1 |
| 9 | 9 | 40 | 1 |
| 9 | 9 | 41 | 1 |
| 9 | 9 | 42 | 1 |
| 9 | 9 | 43 | 1 |
| 9 | 9 | 44 | 1 |
| 9 | 9 | 45 | 1 |
| 9 | 9 | 46 | 1 |
| 10 | 9 | 36 | 1 |
| 10 | 9 | 37 | 1 |
| 10 | 9 | 38 | 1 |

| | | | |
|---|---|---|---|
| 10 | 9 | 39 | 1 |
| 10 | 9 | 40 | 1 |
| 10 | 9 | 41 | 1 |
| 10 | 9 | 42 | 1 |
| 10 | 9 | 43 | 1 |
| 10 | 9 | 44 | 1 |
| 10 | 9 | 45 | 1 |
| 10 | 9 | 46 | 1 |
| 11 | 9 | 32 | 1 |
| 11 | 9 | 33 | 1 |
| 11 | 9 | 34 | 1 |
| 11 | 9 | 35 | 1 |
| 11 | 9 | 36 | 1 |
| 11 | 9 | 37 | 1 |
| 11 | 9 | 38 | 1 |
| 11 | 9 | 39 | 1 |
| 11 | 9 | 40 | 1 |
| 11 | 9 | 41 | 1 |
| 11 | 9 | 42 | 1 |
| 11 | 9 | 43 | 1 |
| 11 | 9 | 44 | 1 |
| 11 | 9 | 45 | 1 |
| 11 | 9 | 46 | 1 |
| 12 | 9 | 32 | 1 |
| 12 | 9 | 33 | 1 |
| 12 | 9 | 34 | 1 |
| 12 | 9 | 35 | 1 |
| 12 | 9 | 36 | 1 |
| 12 | 9 | 37 | 1 |
| 12 | 9 | 38 | 1 |
| 12 | 9 | 39 | 1 |
| 12 | 9 | 40 | 1 |
| 12 | 9 | 41 | 1 |
| 12 | 9 | 42 | 1 |
| 12 | 9 | 43 | 1 |
| 12 | 9 | 44 | 1 |
| 12 | 9 | 45 | 1 |
| 12 | 9 | 46 | 1 |
| 9 | 10 | 36 | 1 |
| 9 | 10 | 37 | 1 |
| 9 | 10 | 38 | 1 |
| 9 | 10 | 39 | 1 |
| 9 | 10 | 40 | 1 |
| 9 | 10 | 41 | 1 |
| 9 | 10 | 42 | 1 |
| 9 | 10 | 43 | 1 |
| 9 | 10 | 44 | 1 |
| 9 | 10 | 45 | 1 |
| 9 | 10 | 46 | 1 |
| 10 | 10 | 36 | 1 |
| 10 | 10 | 37 | 1 |
| 10 | 10 | 38 | 1 |
| 10 | 10 | 39 | 1 |
| 10 | 10 | 40 | 1 |
| 10 | 10 | 41 | 1 |
| 10 | 10 | 42 | 1 |
| 10 | 10 | 43 | 1 |
| 10 | 10 | 44 | 1 |
| 10 | 10 | 45 | 1 |
| 10 | 10 | 46 | 1 |
| 11 | 10 | 32 | 1 |
| 11 | 10 | 33 | 1 |
| 11 | 10 | 34 | 1 |
| 11 | 10 | 35 | 1 |
| 11 | 10 | 36 | 1 |
| 11 | 10 | 37 | 1 |
| 11 | 10 | 38 | 1 |
| 11 | 10 | 39 | 1 |
| 11 | 10 | 40 | 1 |
| 11 | 10 | 41 | 1 |
| 11 | 10 | 42 | 1 |
| 11 | 10 | 43 | 1 |
| 11 | 10 | 44 | 1 |
| 11 | 10 | 45 | 1 |
| 11 | 10 | 46 | 1 |
| 9 | 11 | 36 | 1 |
| 9 | 11 | 37 | 1 |
| 9 | 11 | 38 | 1 |
| 9 | 11 | 39 | 1 |
| 9 | 11 | 40 | 1 |
| 9 | 11 | 41 | 1 |
| 9 | 11 | 42 | 1 |

-continued

| | | | |
|---|---|---|---|
| 9 | 11 | 43 | 1 |
| 9 | 11 | 44 | 1 |
| 9 | 11 | 45 | 1 |
| 9 | 11 | 46 | 1 |
| 14 | 5 | 36 | 1 |
| 14 | 5 | 37 | 1 |
| 14 | 5 | 38 | 1 |
| 14 | 5 | 39 | 1 |
| 14 | 5 | 40 | 1 |
| 14 | 5 | 41 | 1 |
| 14 | 5 | 42 | 1 |
| 14 | 5 | 43 | 1 |
| 14 | 5 | 44 | 1 |
| 14 | 5 | 45 | 1 |
| 14 | 5 | 46 | 1 |

999
25. ENTER BETA FACTOR FOR KX AND KY MODIFICATIONS:
1.000
26. ENTER OVERRELAXATION FACTOR.
1.08
27. ENTER PROBLEM TYPE: 0 - ELLIPTIC, 1 - PARABOLIC
1.0
28. CONVERGENCE CRITERIA:
0.00001
29. MAXIMUM NUMBER OF SWEEPS
20
30. ECHO OPTION - 1 FOR YES, 0 FOR NO
0

The entries in the immediate foregoing SAMPLE DATA are those identified in Table I above. Entry 1 is the x, y, z grid size of 21, 15 and 55 respectively. Entry 2 is the type of data for gridblock size, "O" indicating a unique data value for each element of the vector or array that follows. Entry 3 is the previously mentioned x-direction gridblock dimension(s). Entry 4 is the previously mentioned y-direction gridblock dimension(s). Entry 5 is the previously mentioned z-direction gridblock dimension(s). Entry 6 is the type of data imput for porosity array with "1" indicating that porosity is to be taken into account (a "O" would tell the computer program not to account for porosity). Entry 7 is porosity array with 0.200 indicating a porosity of 20% through the entire geologic volume 10. Entry 8 is the type of data imput for oil saturation array with "1" indicating that oil saturation is to be taken into account by the computer program (a "O" entry would tell the computer program not to account for oil saturation). Entry 9 is oil saturation array with 0.7 representing a 70% oil saturation for those cells 12 containing the hypothetical hydorcarbon reservoir. Entry 10 is type of data imput water saturation array with "1" indicating that water saturation is to be taken into account in the computer program (a "O" entry would tell the computer program not to account for water saturation). Entry 11 is water saturation array with 0.3 indicating a water saturation of 30% through the entire geologic volume 19. Entry 12 is heat capacities of rock, oil, and water, with 36.0 indicating a rock heat capacity of 36 BTU/°F. throughout the entire geologic volume 10; 30.0 indicating an oil heat capacity of 30 BTU/°F. for those cells 12 containing the hypothetical hydorcarbon reservoir; and 1.0 indicating a water heat capacity of 1BTU/°F. throughout the entire geographic volume 10. Entry 13 is type of data imput for conductivity array with "1" indicating that conductivity is to be taken into account by the computer program. Entry 14 is conductivity array with conductivity in BTU/(°F.Day) calculated from the formula $U=T \log_{10} B$ and decreasing with depth (and decreasing with increase of temperature). Entry 15 is surface temperature with "−4." indicating that the heat flux entry of entry 17 is to be used (note: either heat flux or surface temperature is employed). Entry 16 is bottom boundary temperature with 838.9° indicating a bottom boundary temperature of 838.9° F. Entry 17 is constant surface heat flux with 1.0 indicating a constant heat flux of 1.0 BTU/(ft$^2$ Day). Entry 18 is initial, minimum, and maximum timestep sizes respectively indicated as 100,000 days, 10 days, and 75 days. Entry 19 is desired output increment with "38" representing 38 sweeps or iterations. Entry 20 is maximum number of timesteps allowed with "38" representing 38 sweeps or iterations. Entry 21 is desired output sections with "0" indicating that arrays are output by vertical sections (a "1" would indicate arrays are printed out by horizontal planes). Entry 22 is desired timestep increment for conductivity modifications with "20" representing 20 sweeps or iterations. Entry 24 is key matrix elements for modification (the numbers under this entry are i, j, k locator numbers identifying the cells 12 in the geologic volume 10 which are to be modified to contain the hypothetical hydrocarbon reservoir). Entry 25 is Beta factor for KX and KY modifications with 1.0 representing no desired modification (any other number would indicate more or less heat flow in the vertical or z-direction by a factor having the value of the number). Entry 26 is the overrelaxation factor or omega (w) and "1.08" represents the factor. Entry 27 is problem type with "1.0" indicating parabolic. Entry 28 is the convergence criteria and "0.00001" represents a differential in temperature number representing a maximum allowable temperature change between solution steps (i.e. when the difference in temperatures is 0.00001 or less, steady-state conditions are reached). Entry 29 is maximum number of sweeps with "20" representing 20 iterations. Entry 30 is echo option with "0" indicating no imput data is printed (a "1" would indicate imput data is recorded).

The normal gradient temperatures from $T=10^{(A+BZ)}$, the thermal conductivity from $U=T \log_{10} B$, and the initially assigned geologic properties for the homogeneous geologic volume 10 are used in equations (1) and (2) above for the computer to solve for initial steady-state conditions (e.g. steady-state temperatures, etc.) for each cell 12 since the values of the initially assigned geologic properties along with the values of the normal gradient temperatures and thermal conductivities may not be steady-state values. Once these stable initial conditions are established, the computer will automatically, subsequently vary the geologic properties of the selected cells 12 where it is believed that there exist a hydrocarbon reservoir. Equations (1) and (2) are again solved numerically on the computer by the heat flow model of the present invention in the initially assumed homogeneous geologic volume 10 domain in order to discover a more true (or more accurate) x, y, z temperature for each volumetric cell 12. As previously indicated, the x, y, z temperature from the formula $T = 10^{(A+BZ)}$ and the thermal conductivity from the thermal conductivity formula $U = T \log_{10} B$ for each volumetric cell 12 in the geologic volume 10 is subsequently used in the diffusivity heat flow equations (i.e. equations (1) and (2)) to find a more true steady-state x, y, z temperature for each volumetric cell 12 in the initially assumed homogeneous geologic volume 10 after the hypothetical reservoir was introduced by varying the geologic properties of the cells 12 where it is believed that a hydrocarbon reservoir is located.

After the heat flow equations (1) and (2) are solved for x, y, z temperatures, for each volumetric cell 12 at reestablished steady-state condition, the x, y, z temperature for each volumetric cell 12 at known depths and with known i, j, k locator numbers is compared with the normal gradient temperature for the selected geologic volume from $T = 10^{(A+BZ)}$ at the same known depths. Stated alternatively, the x, y, z temperatures for each volumetric cell 12 having a certain i, j, k locator number are compared with the observed and/or measured temperature of the same each volumetric cell 12 in the selected geologic volume having the same i, j, k locator number. If the computed steady-state x, y, z temperature for each volumetric cell 12 found after the introduction of the hypothetical hydrocarbon reservoir 18 equals or is the same as the measured normal temperature for the corresponding same each volumetric cell 12 (i.e. same i, j, k locator numbers) in the selected geologic volume, then the hydrocarbon reservoir 18 was introduced at a correct location within the geologic volume 10; and hydrocarbon reservoir 18 is a true (or real) hydrocarbon reservoir in the selected geologic volume at the same i, j, k location as in the geologic volume 10 and having the same approximate size, shape and geologic properties that were utilized in disposing the hypothetical hydrocarbon reservoir 18 in the geologic volume 10. The computed steady state x, y, z temperatures are the same as the measured normal temperatures if the two temperatures equal each other plus or minus a margin of error, say 5° F. for this Example. If the computed steady-state x, y, z temperature for each volumetric cell 12 having a certain i, j, k locator number do not equal (plus or minus a margin of error) the measured temperature of the same each volumetric cell 12 having the same i, j, k locator number in the selected geologic volume, the hypothetical hydrocarbon reservoir 18 is then redisposed in the geologic volume 10 and the entire computation process is repeated. The entire process is repeated as many times as necessary until the computed x, y, z temperatures equal (within a margin of error) the measured temperatures. Redisposition of the hypothetical hydorcarbon reservoir 18 in the geologic volume 10 may be done by increasing or decreasing the number of volumetric cells 12 whose geologic properties were varied or changed to contain the hydrocarbon reservoir, and/or by varying the initially assigned geologic properties of the volumetric cells 12 that contain the hydrocarbon reservoir 18 and/or by changing the location of the volumetric cells 12 by changing the i, j, k locator numbers. Thus, in the present Example, approximately 578 cells 12 are selected to have their geologic properties modified. The hypothetical hydrocarbon reservoir 18 may be redispositioned by increasing the number 578 of cells 12 and/or by changing the location of the 578 cells 12 by changing the i, j, k locator numbers and/or by changing the geologic properties (including thermal conductivity values) of the 578 cells 12. Changing of the geologic properties would include inter alia adding a gas saturation ($S_g$), adding a gas heat capacity ($C_g$), and/or removing or increasing or decreasing the values of the oil saturation ($S_o$) and/or the oil heat capacity ($C_{oil}$) and/or the porosity and/or thermal conductivities (k) and/or water saturation ($S_w$) and/or water heat capacity ($C_{wtr}$) and/or rock heat capacity ($C_{rock}$) and/or any combination of the foregoing gelogic properties, including altering the other variables such as any x, y, z dimensions for the cells 12, the vertical heat flux, etc. Changing of geologic properties could also include entire removing oil saturation ($S_o$), oil heat capacity ($C_{oil}$) and replacing same with gas saturation ($S_g$) and gas heat capacity ($C_g$).

The computer program for the present Example prints out the following information inter alia: sweeps, max temp change and distance to converge and i, j, k location for each cell 12; current conductivity, matrix, UDEEP conductivity; computed steady-state x, y, z temperatures for each cell 12 including the 578 cells 12 containing the hydrocarbon reservoir; TDEEP; TDIFF calculated minus normal temperature for each cell 12; calculated values of AKX, of AKY and of AKZ. The computed steady-state x, y, z temperatures for each cell 12 is found to be equal (within a 5° temperature margin of error) to the measured x, y, z temperature for each cell 12. Thus, the hypothetical hydrocarbon reservoir is disposed at the correct location in the geologic volume 10. Obviously, one or more wells may be drilled in the selected geologic volume in accordance to where the hydrocarbon reservoir resides.

Thus by the practice of the present invention, there is provided a method for exploring and finding a subterranean hydrocarbon reservoir by modeling of temperature and/or thermal anomalies within a geologic volume within the earth's crust. Investigation of the thermal characteristics of subsurface materials concentrated on heat flow by conduction, rather than convection or radiation, since the varying conductivities of the materials provides the primary mechanism for subsurface temperature anomalies. In porous formations, the thermal conductivity of the fluid filling the rock has the dominant effect upon the thermal conductivity of the system as a whole. Both crude oil and natural gas have significantly lower thermal conductivities than salt water. Consequently, the presence or absence of hydrocarbons has a profound effect upon the thermal conductivity of materials within a particular geologic formation. Using a computer simulation technique, the relationship between the radius of pore space and normalized apparent conductivity has been analyzed for a quartz-gas model and found that increasing pore radius had a profound effect on the conductivity of the system as a whole. The computer simulation suggests that as hydrocarbon pore volume increases, the conductivity of the gas begins to predominate.

Once the expected conductivities of the subsurface materials are determined, information about actual temperature differences below the surface can be combined with these conductivities of develop a picture of subsurface anomalies that might be caused by the presence of hydrocarbon. The required temperature information was obtained primarily through the use of bottomhole temperatures, which provided an attractive source of data because of their widespread availability. As previously mentioned, a potential drawback of bottomhole temperatures is the inaccuracies that can be caused by the circulation of drilling fluids during the drilling process. If one is concerned with relative differences between many wells, however, inaccuracies caused by this drilling process tend to cancel each other out, and where applicable, a correction method can be employed to adjust bottomhole temperatures for some of these effects.

A large digital database of measured temperatures was created in the practice of the present invention for various areas of interest that is being investigated as part of a exploratory effort. Normal temperature gradients has been established and areas have been identified where temperatures deviate from the norm. The initial product developed through the application of the process includes maps showing heat flux at different depth horizons where $Q=k(dT/dx)$ [Q representing the heat flux in BTU/day-ft-°F., and $dT/dx$ representing the temperature differential in °F. divided by the distance between the datums in feet]. Areas with low flux rates can be indicators of the presence of hydrocarbons at deeper horizons while areas with high flux rates can suggest adjacent hydrocarbon accumulations at the same horizon. In addition to using heat flux maps to identify possible hydrocarbon deposits, vertical cross-sections have been developed showing areas where heat flows deviate from the norm. The usefulness of thermal lead tools employed in the present invention have been verified by undertaking a three-pronged investigation of the technology. This three-pronged approach included: 1) statistical studies; 2) field studies; and 3) individual well studies.

Initially, the effectiveness of the process of the present invention versus conventional technology for a portion of the Gulf Coast Basin was investigated. Subsequent drilling success rates in areas that, according to thermal database, would have been thermal leads were compared to overall success rates for the study area as a whole. The success rates for wells drilled in the practice of the present invention were more that double industry rates using traditional technology alone. The geo-thermal information was clearly correlated to the existence of hydrocarbon deposits. The correlation was not duplicated by geo-pressure data.

Subsequently, information was obtained about eight major fields in Texas, Louisiana, Kansas, and Missouri which compared the field location with the locations of associated temperature anomalies. These fields were primarily associated stratigraphic or combination traps. In every case but one, the entire field was located within the temperature anomaly. In the one exception, the majority of the field resided within what would have been a thermal lead.

Finally, temperature versus depth profiles were studied for particular wells in the Gulf Coast Basin. In the area in question, temperature increases with depth at an average of 1.6 degrees per 100 feet. The temperature gradient in any given area is directly proportional to the heat flux and inversely proportional to the conductivity of the system. One would expect that, because oil and gas are insulators, the temperature gradient across the pay zone of producing wells would be much greater than average. This was indeed the case for the wells investigated. For example, the temperature gradient across pay zones varied from 5 to 8 degrees per 100 feet. Thus, the individual well studies reinforced the findings of the field studies and the statistical investigation. The results of the three-pronged approach indicates that the process of the present invention can identify new exploratory leads or build confidence in existing exploratory prospects.

The thermal technology of the present invention is employed early in the exploration process to focus more traditional exploratory techniques, as well as advanced seismic processing, on areas that have a higher than average probability of yielding hydrocarbon. As soon as a structural area of interest is identified, the user or operator of the process examines and evaluates the heat flow maps of the appropriate horizons. If thermal technology suggests that the area looks promising, additional geologic control is developed and, if necessary, additional seismic data are shot or reprocessed. Because seismic investigations, leasehold acquisitions, and exploratory drilling make up the vast majority of the finding costs associated with the discovery of oil and gas, the development of relatively inexpensive thermal leads has the potential of greatly reducing the cost of exploration. The more expensive elements of the exploratory process can be focused on areas where hydrocarbon is more likely to reside.

By lowering finding costs, thermal technology of the present invention may also open up new areas of exploration that were previously uneconomical. For example, thermal leads may prove particularly useful for exploring stratigraphic traps. Because stratigraphic traps are caused by gradual changes in the permeability or deposition of sedimentary layers rather than abrupt shifts or deformations in structure, they have historically proved more subtle and difficult to identify than other trapping mechanisms. This suggests that a significant potential exists for the future discovery of oil and gas resources in stratigraphic areas because the difficulty in identifying these traps means that many of them remain unexplored. By indicating the presence of hydrocarbon, thermal technology of the present invention may facilitate the discovery of oil and gas accumulations in stratigraphic traps, making new resources available for economical exploration.

While the process of the present invention provides the prospecting process with a direct hydrocarbon indicator and can open up new areas to economical exploration, it is to be understood that the process is not a panacea. Organic shales, salt domes, granite basement features, and other geologic conditions also alter thermal signatures. These complications could potentially confuse the explorationist; however, the proper integration of the process of the present invention with stat-of-the-art seismic methods should improve the quality of the exploratory prospect and lower overall prospecting costs.

In conclusion, it is believed that the thermal technology of the present invention has wide applicability in a variety of geologic environments. This process provides an inexpensive means of focusing exploratory investigations on areas that have a significantly higher probability of containing oil and gas than areas identified using conventional technology alone. It is expected that the process of the present invention will play an important role, along with other innovative exploration technologies, in implementing its strategy of using technological advances to lower the finding costs associated with the discovery of new oil and gas resources in the United States. The economical exploration and development of domestic reserves is crucial to the security not only of the United States but of all of the major oil consuming nations. Given the dangers inherent in reliance on imports from the Middle East, all of the technological tools available to lower the cost of exploration should be devoted to finding new oil and gas resources in the U.S. and other parts of the world. It is believed that the present invention can make a significant contribution to that effort.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A computer-implemented process for exploring for hydrocarbons which utilizes temperatures determined in a geologic volume comprising the steps of:
   (a) providing a geologic volume to a computer means;
   (b) subdividing the geologic volume in the computer means into a plurality of laterally disposed, laterally aligned and vertically disposed, vertically aligned volumetric cells;
   (c) assigning geologic properties for each of the volumetric cells;
   (d) determining a normal gradient temperature for the geological volume;
   (e) assigning an x, y, z temperature for each volumetric cell based on the normal gradient temperature of the geologic volume;
   (f) disposing a hypothetical hydrocarbon reservoir in the geologic volume;
   (g) computing with the computer means a true x, y, z temperature for each volumetric cell caused by disposing the hypothetical hydrocarbon reservoir in the geologic volume; and
   (h) determining a true hydrocarbon reservoir in the geologic volume from the true x, y, z temperature of each volumetric cell.

2. The process of claim 1 additionally comprising determining a thermal conductivity value for each volumetric cell prior to said disposing step (f).

3. The process of claim 2 additionally comprising assigning the heat flux value to each volumetric cell prior to determining a thermal conductivity value for each volumetric cell.

4. The process of claim 3 wherein said determining a thermal conductivity value for each volumetric cell comprises determining a normal gradient temperature for each volumetric cell from the normal gradient temperature for the geologic volume, and dividing the heat flux of each volumetric cell by the normal gradient temperature for each volumetric cell.

5. The process of claim 1 wherein said disposing of a hypothetical hydrocarbon reservoir in the geologic volume comprises varying at least one geologic property of some of the plurality of volumetric cells.

6. The process of claim 5 wherein said at least one geologic property varied is selected from a group consisting of thermal conductivity, oil saturation, heat capacity of oil, gas saturation, heat capacity of gas, and mixtures thereof.

7. The process of claim 1 additionally comprising assigning a heat flux value to each volumetric cell.

8. The process of claim 1 additionally comprising determining an observed temperature for at least one volumetric cell prior to said determining step (h).

9. The process of claim 8 wherein said determining step (h) comprises comparing the true z temperature for at least one volumetric cell with said observed temperature for at least one volumetric cell.

10. In an improved computer-implemented process for exploring for hydrocarbons in a geologic volume which has been subdivided into a plurality of volumetric cells and wherein geologic properties have been assigned for each of the volumetric cells, the improvement comprising the steps of:
    (a) determining a normal gradient temperature for the geologic volume;
    (b) assigning an x, y, z temperature for each volumetric cell based on the normal gradient temperature of the geologic volume;
    (c) disposing a hypothetical hydrocarbon reservoir in the geologic volume;
    (d) with a computer means computing a true x, y, z temperature for each volumetric cell caused by disposing the hypothetical hydrocarbon reservoir in the geologic volume; and
    (e) determining a true hydorcarbon reservoir in the geologic volume from the true x, y, z temperature of each volumetric cell.

11. A computer-implemented process for exploring for hydrocarbons comprising the steps of:
    (a) providing a geologic volume to a computer means from a geographic area that is to be investigated and where thermal anomalies are to be modeled for determining if a subterranean hydrocarbon reservoir exist underneath the geographic area;
    (b) subdividing the geologic volume into a plurality volumetric cells;
    (c) assigning geologic properties for each of the volumetric cells;
    (d) determining a gradient temperature for the geologic volume;
    (e) assigning an x, y, z temperature for each volumetric cell based on the normal gradient temperature of the geologic volume;
    (f) disposing a hypothetical hydrocarbon reservoir in the geologic volume;
    (g) computing with the computer means a true x, y, z temperature for each volumetric cell caused by disposing the hypothetical hydrocarbon reservoir in the geological volume; and
    (h) determining a subterranean hydrocarbon reservoir in the geologic volume from the true x, y, z temperature of each volumetric cell.

12. The process of claim 11 wherein each of said volumetric cells initially comprises geologic properties which include generally identical geologic properties with no oil and gas in any of said volumetric cells.

13. The process of claim 11 wherein said determining step (d) of said normal gradient temperature for said geologic volume comprises providing a second geologic volume having known temperature data versus depth and containing no oil and gas; and forming a graph by plotting said known temperature data versus depth.

14. The process of claim 13 wherein said determining step (h) of a subterranean hydrocarbon reservoir in the geologic volume from the true x, y, z temperature of each volumetric cell comprises comparing at least one temperature at a given depth from the plotted temperature versus cell depth curve with at least one temperature at said given depth from said normal gradient temperature of step (d) and determining if said at least one temperature from said plotted temperature versus cell depth curve equals said at least one temperature from said normal gradient temperature of step (d) within a margin of error.

15. The process of claim 14 wherein said determining step (h) of said subterranean hydrocarbon reservoir in the geologic volume from the true x, y, z temperature of each volumetric cell comprises redisposing said hypothetical hydrocarbon in said geologic volume and computing a true x, y, z temperature for each volumetric cell caused by redisposing the hypothetical hydrocarbon reservoir in the geologic volume.

16. The process of claim 11 wherein said determining step (d) of said normal gradient temperature for said geologic volume comprises obtaining temperature data versus known depths for said geologic volume; and forming a graph by plotting said temperature data against said known depths.

17. The process of claim 16 wherein said obtaining temperature data versus known depth for said geologic volume comprises measuring temperatures versus depths in the geologic volume.

18. The process of claim 17 where said measuring temperatures versus known depths in the geologic volume comprises drilling at least one well into the geologic volume and measuring a bottom hole temperature for said at least one well.

19. The process of claim 16 wherein said determining step (h) of a subterranean hydrocarbon reservoir in the geologic volume from the true x, y, z temperature of each volumetric cell comprises comparing at least one temperature at a given depth from the plotted temperature versus cell depth curve with at least one temperature at said given depth from said normal gradient temperature of step (d) and determining if said at least one temperature from said plotted temperature versus cell depth curve equals said at least one temperature from said normal gradient temperature of step (d) within a margin or error.

20. The process of claim 19 wherein said determining step (h) of said subterranean hydrocarbon reservoir in the geologic volume from the true x, y, z temperature of each volumetric cell comprises redisposing said hypothetical hydrocarbon in said geologic volume and computing a true x, y, z temperature for each volumetric cell caused by redisposing the hypothetical hydrocarbon reservoir in the geologic volume.

21. The process of claim 11 wherein said geologic volume comprises known thermal conductivity data versus depths in the geologic volume; and said process additionally comprises prior to said disposing step (f) forming a graph by plotting said known thermal conductivity data versus depths in the geologic volume to determine a thermal conductivity for each of said volumetric cells.

22. The process of claim 11 additionally comprising determining a thermal conductivity value for each of said volumetric cells prior to the said disposing step (f).

23. The process of claim 22 wherein said determining of said thermal conductivity value for each of said volumetric cells prior to said disposing step (f) comprises providing a second geologic volume having known thermal conductivity data versus depths and containing no oil and gas; and forming a graph by plotting said known thermal conductivity data versus depths.

24. The process of claim 22 wherein said determining said thermal conductivity value for each of said volumetric cells prior to said disposing step (f) comprises drilling at least one well into the geologic volume and obtaining drill cuttings from the at least one well.

25. The process of claim 11 additionally comprising after said computer step (g) forming a temperature versus cell depth curve from said true x, y, z temperature for each of said volumetric cells by plotting said true x, y, z temperature for each of said volumetric cells against cell depth of each of said volumetric cells.

26. The process of claim 25 wherein said determining step (h) of a subterranean hydrocarbon reservoir in the geologic volume from the true x, y, z temperature of each volumetric cell comprises comparing at least one temperature at a given depth from said plotted temperature versus cell depth curve with at least one temperature at said given depth from said normal gradient temperature of step (d) and determining if said at least one temperature from said plotted temperature versus cell depth curve equals said at least one temperature from said normal gradient temperature of step (d) within a margin of error.

27. The process of claim 26 wherein said determining step (h) of said subterranean hydrocarbon reservoir in the geologic volume from the true x, y, z temperature of each volumetric cell comprises redisposing said hypothetical hydrocarbon in said geologic volume and computing a true x, y, z temperature for each volumetric cell caused by redisposing the hypothetical hydrocarbon reservoir in the geologic volume.

28. The process of claim 11 wherein said determining step (h) of said subterranean hydrocarbon reservoir in the geologic volume from the true x, y, z temperature of each volumetric cell comprises redisposing said hypothetical hydrocarbon in said geologic volume and computing a true x, y, z temperature for each volumetric cell caused by redisposing the hypothetical hydrocarbon reservoir in the geological volume.

29. A computer-implemented process for collecting and processing data relating to exploring for hydrocarbons comprising the steps of:
(a) providing a geologic volume to a computer means;
(b) subdividing the geologic volume in the computer means into a plurality volumetric cells;
(c) assigning geologic properties for each of the volumetric cells;
(d) determining a normal gradient temperature for the geologic volume;
(e) assigning an x, y, z temperature for each volumetric cell based on the normal gradient temperature for the geologic volume;
(f) disposing a hypothetical hydrocarbon reservoir in the geologic volume;
(g) computing with the computer means a true x, y, z temperature for each volumetric cell caused by disposing the hypothetical hydrocarbon reservoir in the geological volume; and
(h) determining a subterranean hydrocarbon reservoir in the geologic volume from the true x, y, z temperature of each volumetric cell.

* * * * *